US008674544B2

(12) United States Patent
Rada et al.

(10) Patent No.: US 8,674,544 B2
(45) Date of Patent: Mar. 18, 2014

(54) METHODS AND APPARATUS FOR POWER FACTOR CORRECTION AND REDUCTION OF DISTORTION IN AND NOISE IN A POWER SUPPLY DELIVERY NETWORK

(75) Inventors: Patrick A. Rada, San Jose, CA (US); John H. Magnasco, San Jose, CA (US)

(73) Assignee: Geneva Cleantech, Inc., San Jose, CA (US)

( * ) Notice: Subject to any disclaimer, the term of this patent is extended or adjusted under 35 U.S.C. 154(b) by 519 days.

(21) Appl. No.: 13/013,737

(22) Filed: Jan. 25, 2011

(65) Prior Publication Data

US 2011/0148202 A1 Jun. 23, 2011

Related U.S. Application Data

(63) Continuation-in-part of application No. 12/694,153, filed on Jan. 26, 2010, now Pat. No. 8,450,878, and a continuation-in-part of application No. 12/694,171, filed on Jan. 26, 2010.

(60) Provisional application No. 61/435,921, filed on Jan. 25, 2011, provisional application No. 61/435,658, filed on Jan. 24, 2011, provisional application No. 61/434,250, filed on Jan. 19, 2011, provisional application No. 61/298,112, filed on Jan. 25, 2010, provisional application No. 61/298,127, filed on Jan. 25, 2010, provisional application No. 61/206,051, filed on Jan. 26, 2009, provisional application No. 61/206,072, filed on Jan. 26, 2009.

(51) Int. Cl.
*H02J 3/14* (2006.01)

(52) U.S. Cl.
USPC .......... 307/38

(58) Field of Classification Search
USPC .......... 307/38
See application file for complete search history.

(56) References Cited

U.S. PATENT DOCUMENTS

| | | | | |
|---|---|---|---|---|
| 4,013,937 A | | 3/1977 | Pelly et al. | |
| 4,056,786 A | * | 11/1977 | Morrison et al. | 330/207 A |
| 4,429,270 A | | 1/1984 | Davies et al. | 323/317 |
| 4,858,141 A | | 8/1989 | Hart et al. | 364/483 |
| 4,990,893 A | | 2/1991 | Kiluk | 340/573 |
| 5,051,685 A | | 9/1991 | Sink | 323/208 |
| 5,196,982 A | | 3/1993 | Landsberg et al. | 361/93 |
| 5,231,347 A | | 7/1993 | Voisine et al. | 324/142 |
| 5,325,051 A | | 6/1994 | Germer et al. | 324/142 |
| 5,384,712 A | | 1/1995 | Oravetz et al. | 364/550 |
| 5,465,203 A | | 11/1995 | Bhattacharya et al. | 363/40 |
| 5,477,132 A | | 12/1995 | Canter et al. | 323/282 |

(Continued)

OTHER PUBLICATIONS

Non-Final Office Action dated Nov. 6, 2012, U.S. Appl. No. 12/694,153, filed Jan. 26, 2010, Patrick A. Rada.

(Continued)

*Primary Examiner* — Robert L. Deberadinis
(74) *Attorney, Agent, or Firm* — Haverstock & Owens LLP

(57) ABSTRACT

Methods and apparatus for power factor correction include selectively coupling bit reactive loads with a load having dynamic reactive properties to dynamically correct a power factor. Methods and apparatus for reducing distortion in a power delivery system include a means for determining distortion in a power line, forming a corrective signal according to the distortion and selectively sinking and sourcing current to the power line according to the corrective signal. Furthermore, power for a solar power system is injected into a load via the same apparatus.

49 Claims, 22 Drawing Sheets

(56) References Cited

U.S. PATENT DOCUMENTS

| | | | | |
|---|---|---|---|---|
| 5,483,153 | A | 1/1996 | Leeb et al. | 324/76.12 |
| 5,499,178 | A | 3/1996 | Mohan | 363/39 |
| 5,570,006 | A | 10/1996 | Woodworth | 323/208 |
| 5,731,965 | A | 3/1998 | Cheng et al. | 363/41 |
| 5,815,416 | A | 9/1998 | Liebmann et al. | 364/578 |
| 5,890,097 | A | 3/1999 | Cox | 702/67 |
| 5,977,660 | A | 11/1999 | Mandalakas et al. | |
| 6,075,350 | A | 6/2000 | Peng | |
| 6,147,475 | A | 11/2000 | Bridgeman | 323/211 |
| 6,148,623 | A | 11/2000 | Park et al. | 62/129 |
| 6,330,516 | B1 | 12/2001 | Kammeter | 702/60 |
| 6,331,765 | B1 | 12/2001 | Yamamoto et al. | 323/210 |
| 6,483,290 | B1 | 11/2002 | Hemminger et al. | 324/142 |
| 6,507,669 | B1 | 1/2003 | Klassen | 382/170 |
| 6,531,854 | B2 | 3/2003 | Hwang | 323/285 |
| 6,577,962 | B1 | 6/2003 | Afshari | 702/61 |
| 6,618,709 | B1 | 9/2003 | Sneeringer | 705/412 |
| 6,633,823 | B2 | 10/2003 | Bartone et al. | 702/57 |
| 6,636,893 | B1 | 10/2003 | Fong | 709/223 |
| 6,728,121 | B2 | 4/2004 | Ben-Yaakov et al. | 363/89 |
| 6,853,958 | B1 | 2/2005 | Turin et al. | 702/188 |
| 6,868,293 | B1 | 3/2005 | Schurr et al. | 700/22 |
| 6,946,819 | B2 | 9/2005 | Fagnani et al. | 323/207 |
| 6,946,972 | B2 | 9/2005 | Mueller et al. | 340/870.02 |
| 6,968,295 | B1 | 11/2005 | Carr | 702/188 |
| 6,993,417 | B2 | 1/2006 | Osann, Jr. | 700/291 |
| 7,043,459 | B2 | 5/2006 | Peevey | 705/412 |
| 7,054,769 | B2 | 5/2006 | Cox | 702/60 |
| 7,135,956 | B2 | 11/2006 | Bartone et al. | 340/3.9 |
| 7,162,379 | B2 | 1/2007 | Jang et al. | |
| 7,208,697 | B2 | 4/2007 | Blankenship et al. | 219/130.21 |
| 7,230,972 | B2 | 6/2007 | Cornwall et al. | 375/134 |
| 7,250,874 | B2 | 7/2007 | Mueller et al. | 340/870.06 |
| 7,265,533 | B2 | 9/2007 | Lightbody et al. | 324/158.1 |
| 7,282,921 | B2 | 10/2007 | Sela et al. | 324/522 |
| 7,317,404 | B2 | 1/2008 | Cumeralto et al. | 340/870.02 |
| 7,321,499 | B2 | 1/2008 | Halamik et al. | 363/21.1 |
| 7,324,361 | B2 | 1/2008 | Siri | 363/95 |
| 7,349,766 | B2 | 3/2008 | Rodgers | 700/295 |
| 7,382,112 | B2 | 6/2008 | Krein | 323/207 |
| 7,451,019 | B2 | 11/2008 | Rodgers | 700/295 |
| 7,453,267 | B2 | 11/2008 | Westbrock, Jr. et al. | 324/522 |
| 7,459,864 | B2 | 12/2008 | Lys | 315/291 |
| 7,469,190 | B2 | 12/2008 | Bickel | 702/60 |
| 7,480,157 | B1 | 1/2009 | Soeng | 363/21.01 |
| 7,489,116 | B2 | 2/2009 | Lanni | 323/222 |
| 7,501,800 | B2 | 3/2009 | Kim et al. | 323/207 |
| 7,538,525 | B2 | 5/2009 | Kim et al. | 323/205 |
| 7,541,941 | B2 | 6/2009 | Bogolea et al. | 340/870.02 |
| 7,561,681 | B2 | 7/2009 | Booth et al. | 379/106.03 |
| 7,564,706 | B1 | 7/2009 | Herbert | 363/124 |
| 7,590,499 | B2 | 9/2009 | Ha et al. | 702/60 |
| 7,594,106 | B2 | 9/2009 | Smith et al. | 713/150 |
| 7,606,639 | B2 | 10/2009 | Miyaji | 700/296 |
| 7,616,455 | B2 | 11/2009 | Cameron et al. | 363/16 |
| 7,633,782 | B1 | 12/2009 | Herbert | 363/125 |
| 7,639,000 | B2 | 12/2009 | Briese et al. | 324/142 |
| 7,646,308 | B2 | 1/2010 | Paoletti et al. | 340/635 |
| 7,653,499 | B2 | 1/2010 | Corrado et al. | 702/61 |
| 7,675,280 | B2 | 3/2010 | Strijket | 323/285 |
| 8,134,346 | B1 | 3/2012 | Huta et al. | |
| 2003/0050737 | A1 | 3/2003 | Osann, Jr. | 700/276 |
| 2007/0035975 | A1 | 2/2007 | Dickerson et al. | 363/131 |
| 2007/0274115 | A1 | 11/2007 | Michaels et al. | 363/164 |
| 2008/0077336 | A1 | 3/2008 | Fernandes | 702/57 |
| 2008/0106241 | A1 | 5/2008 | Deaver et al. | 323/209 |
| 2008/0150718 | A1 | 6/2008 | Apfel | 340/568.2 |
| 2008/0262820 | A1 | 10/2008 | Nasle | 703/18 |
| 2008/0285318 | A1 | 11/2008 | Tan et al. | 363/89 |
| 2008/0306985 | A1 | 12/2008 | Murray et al. | 707/102 |
| 2008/0315685 | A1 * | 12/2008 | Mandalakas et al. | 307/46 |
| 2009/0033296 | A1 | 2/2009 | Hammerstrom | 323/207 |
| 2009/0073726 | A1 | 3/2009 | Babcock | 363/20 |
| 2009/0086520 | A1 | 4/2009 | Nishimura | 363/133 |
| 2009/0195349 | A1 | 8/2009 | Frader-Thompson et al. | 340/3.1 |
| 2009/0322301 | A1 | 12/2009 | Chang | 323/284 |
| 2010/0026096 | A1 | 2/2010 | Yeh et al. | 307/39 |
| 2010/0037189 | A1 | 2/2010 | Bickel | 716/4 |
| 2010/0052598 | A1 | 3/2010 | Hayashi et al. | 318/759 |
| 2010/0060291 | A1 | 3/2010 | Grommes | 324/537 |
| 2010/0060479 | A1 | 3/2010 | Salter | 340/870.4 |
| 2010/0067271 | A1 | 3/2010 | Garces et al. | 363/95 |
| 2010/0070213 | A1 | 3/2010 | Anklam | 702/60 |
| 2010/0070216 | A1 | 3/2010 | Murata | 702/61 |
| 2010/0070217 | A1 | 3/2010 | Shimada et al. | 702/62 |
| 2010/0070218 | A1 | 3/2010 | Hyde et al. | 702/62 |
| 2010/0070225 | A1 | 3/2010 | Hyde et al. | 702/76 |
| 2010/0070227 | A1 | 3/2010 | Hyde et al. | 702/77 |
| 2010/0070785 | A1 | 3/2010 | Fallin et al. | 713/320 |

OTHER PUBLICATIONS

"Advanced Metering Infrastructure (AMI)", Electric Power Research Institute, Feb. 2007, p. 1-2, <URL: http:www.epri.com>.

*AND8124/D-90W, Universal Input, Single Stage, PFC Converter,* Semiconductor Components Industries LLC, Dec. 2003, pp. 1-10, <URL: http://www.onsemiconductor.com/pub/Collateral/AND8124-D.pdf>.

Bibian, Stephan and Hua Jin, *Digital Control with Improved Performance for Boost Power Factor Correction Circuits,* Applied Power Electronics Conference and Exposition, 2001, IEEE vol. 1Mar. 4-8, 2001 pp. 137-143.

Chen, Jingquan, Aleksandar Prodic, Robert Erickson, and Dragan Maksimovic, *Predictive Digital Current Programmed Control,* IEEE Transactions on Power Electronics, vol. 18, No. 1, Jan. 2003, pp. 411-419.

Dixon, L., *High Power Factor Preregulator for Off-Line Power Supplies,* Unitrode Corporation (Texas Instruments) Power Supply Design Seminar Topics SEM600, 1988, pp. 6-1-6-16.

Drenker, Steven and Ab Kader, Nonintrusive Monitoring of Electric Loads, IEEE Computer Applications in Power, Oct. 1999, p. 47-51.

Erickson, R. et al., *Design of a Simple High-Power-Factor Rectifer Based on the Flyback Converter,* Proceeding of IEEE Applied Power Electronics Conference, Mar. 1990, pp. 792-801.

International Search Report and Written Opinion dated Mar. 24, 2010, PCT Application No. PCT/US2010/22141, Filed Jan. 26, 2010, Geneva CleanTech Inc.

International Search Report and Written Opinion dated Mar. 24, 2010, PCT/US2010/022140, filed Jan. 26, 2010, Geneva CleanTech Inc.

International Search Report and Written Opinion dated Mar. 31, 2011, PCT/US2011/022471, Filed Jan. 25, 2011, Geneva CleanTech Inc.

Lam, Y.Y, Fung, G.S.K., and Lee, W.K.,*A Novel Method to Construct Taxonomy Electrical Appliances Based on Load Signatures* (*Abstract*), Consumer Electronics, IEEE vol. 53, Issue 2, pp. 653-660.

Laughman, Christopher, Kwangduk Lee, Robert Cox, Steven Shaw, Steven Leeb, Les Norford, and Peter Armstrong, "Power Signature Analysis", IEEE Power & Energy Magazine, Mar./Apr. 2003, p. 56-63.

*Linear Technology LT1725 General Purpose Isolated Flyback Controller,* Linear Technology Corporation 2000, pp. 1-28 <URL: http://www.linear.com/pdf/1725fd.pdf>.

*Linear Technology LT1103/LT1105 Offline Switching Regulator,* Linear Technology Corporation, 1992, pp. 1-32, <URL: http://www.linear.com/pdf/11G35fd.pdf>.

Lisovich, Mikhail A. and Stephen B, Wicker *Privacy Concerns in Upcoming Residential and Commercial Demand-Response Systems,* IEEE Proceedings on Power Systems, vol. 1, No. 1, Mar. 2008, pp. 1-10.

LucidDesignGroup.com, *Building Dashboard, Making Building Performance Visible in Real Time.*

(56) References Cited

OTHER PUBLICATIONS

Marceau, Medgar L., *Nonintrusive Load Disaggregation Computer Program to Estimate the Energy Consumption of Major End-Uses in Residential Buildings* (*Abstract*), <URL: http://spectrum.library.concordia.ca/816/>.

Murphy, P. et al., *Digital Control of Power Factor Correction,* Department of Electrical and Computer Engineering, NC A&T State University, Virginia Tech, CPES Seminar 2003, pp. 341-347, Apr. 27-29, 2003, Blacksburg, VA.

*NCP 1651 Product Review, Single Stage Power Factor Controller,* Semiconductor Components Industries, LLC, Apr. 2002, pp. 1-28, Rev. 1.

*NCP 1651—Single Stage Power Factor Control,* Semiconductor Components Industries, LLC, Oct. 2003, pp. 1-32, Rev. 5.

Petersen, Dane, Jay Steele and Joe Wilkerson, *WattBot: A Residential Electricity Monitoring and Feedback System,* CHI 2009—Student Design Competition, Apr. 4-9, 2009, Boston, MA.

"Single Point End-use Energy Disaggregation SPEED for Energy Use Analysis", Enetics, Oct. 21, 2001, p. 1-5, <URL: http://www.enetics.com>.

Zhang, Wanfeng et al., *Analysis and Implementation of a New PFC Digital Control Method,* IEEE Power Elect. Conf., Mexico, Jun. 15, 2003, pp. 335-341.

Zhang, W. et al., *A New Power Factor Correction* (*PFC*) *Control Method Suitable for Low Cost DSP,* IEEE, International Telecommunications Energy Conference, Sep. 29-Oct. 3, 2002, pp. 407-417.

Zhang, Wanfeng, et al., *A New Predictive Control Strategy for Power Factor Correction,* 18$^{th}$ IEEE, Feb. 9, 2003, pp. 403-409.

Zhang, W. et al., *DSP Implementation of Predictive Control Strategy for Power Factor Correction* (*PFC*), IEEE, Applied Power Electronics Conference and Exposition, Feb. 22-26, 2004, pp. 67-73, vol. 1.

Zhang, Yuejun and Wu Mingguang, *Design of Wireless Remote Module in X-10 Intelligent Home* (*Abstract*), Industrial Technology, 2005, IEEE International Conference, Dec. 14-17, 2005, pp. 1349-1353.

* cited by examiner

METHODS AND APPARATUS FOR POWER FACTOR CORRECTION AND REDUCTION OF DISTORTION IN AND NOISE IN A POWER SUPPLY DELIVERY NETWORK

CROSS-REFERENCE TO RELATED APPLICATIONS

This application claims the benefit of U.S. Provisional Patent Application Ser. 61/298,112 filed Jan. 25, 2010 and titled METHODS AND APPARATUS FOR POWER FACTOR CORRECTION AND REDUCTION OF DISTORTION IN AND NOISE IN A POWER SUPPLY DELIVERY NETWORK," and U.S. Provisional Patent application Ser. 61/434,250 filed Jan. 19, 2011 and entitled "POWER FACTOR AND HARMONIC CORRECTION METHODS," and U.S. Provisional Patent Application Ser. 61/435,921 filed Jan. 25, 2011 and titled "POWER FACTOR AND HARMONIC CORRECTION METHODS," and U.S. Provisional Patent Application Ser. 61/435,658 filed Jan. 24, 2011 and titled "AUTOMATIC DETECTION OF APPLIANCES," and U.S. Provisional Patent Application Ser. 61/298,127 filed Jan. 25, 2010 and titled "AUTOMATIC DETECTION OF APPLIANCES," under 35 U.S.C. §119(e), and is a Continuation-in-Part Application of co-pending U.S. patent application Ser. No. 12/694,153, filed Jan. 26, 2010 and entitled "POWER FACTOR AND HARMONIC CORRECTION METHODS," which in turn claims priority of U.S. Provisional Patent application Ser. 61/206,051, filed Jan. 26, 2009 and entitled "POWER FACTOR AND HARMONIC CORRECTION METHODS," and is a CIP of Co Pending U.S. patent application Ser. No. 12/694,171 filed Jan. 26, 2010 and entitled "ENERGY USAGE MONITORING WITH REMOTE DISPLAY AND AUTOMATIC DETECTION OF APPLIANCE INCLUDING GRAPHICAL USER INTERFACE," which in turn claims benefit of U.S. Provisional Patent Application No. 61/206,072 filed Jan. 25, 2009 and entitled "ENERGY USAGE MONITORING WITH REMOTE DISPLAY AND AUTOMATIC DETECTION OF APPLIANCE INCLUDING GRAPHICAL USER INTERFACE," and U.S. patent application Ser. No. 13/031,764 (filed Jan. 25, 2011, all of which are hereby incorporated by reference in its entirety for all purposes.

FIELD OF THE INVENTION

The present invention relates to the field of power electronics. More specifically, the present invention relates to reducing distortion and noise of power delivered to or generated by a load and improving power factor.

BACKGROUND OF THE INVENTION

Power factor correction is an important component of increasing efficiency of modern day power delivery systems. Due to reactive components in the loads that consume power such as appliances that include a motor, a phase shift develops between a current and a voltage component of a power signal. The power factor of an AC electric power system is defined as the ratio of the real power flowing to the load to the apparent power and is a number between 0 and 1 (frequently expressed as a percentage, e.g. 0.5 pf=50% pf). Real power (P) is the capacity of the circuit for performing work in a particular time. Apparent power (S) is the product of the current and voltage of the circuit. The Reactive Power (Q) is defined as the square root of the difference of the squares of S and P. Where reactive loads are present, such as with capacitors or inductors, energy storage in the loads result in a time difference between the current and voltage waveforms. During each cycle of the AC voltage, extra energy, in addition to any energy consumed in the load, is temporarily stored in the load in electric or magnetic fields, and then returned to the power grid a fraction of a second later in the cycle. The "ebb and flow" of this nonproductive power increases the current in the line. Thus, a circuit with a low power factor will use higher currents to transfer a given quantity of real power than a circuit with a high power factor. A linear load does not change the shape of the waveform of the current, but may change the relative timing (phase) between voltage and current. Generally, methods and apparatus to correct power factor have involved coupling a fixed corrective load having a known reactive value to a power line. The fixed capacitive reactive load counteracts the reactive effect of inductive loads vice versa, improving the power factor of the line. However, a fixed reactive load is only able to correct the power factor of a power line by a fixed amount to a certain extent because the power factor may be dynamic due to the changing nature of loads that are coupled and decoupled to the power line. To that end, later developments included several fixed reactive loads that may be selectively coupled to a power line in order to correct power factor. However, such systems require monitoring by an operator who must continually monitor the power factor in order to couple and decouple fixed reactive loads in order to counteract the ever changing power factor of the power line.

The changing landscape of electronics has introduced other inefficiencies in the delivery of power. The increased use of personal electrical appliances has caused an increase in the use of wall mounted AC-DC converters to supply power to devices and recharge the batteries of everyday items such as laptops, cellular telephones, cameras, and the like. The ubiquity of such items has caused users to have several of these converters, known as "wall warts" to be coupled into power systems. The two most common AC-DC converters are known as linear converters and switched mode converters. Linear converters utilize a step down transformer to step down the standard 120V power available in US residences to a desired AC voltage. A bridge rectifier rectifies that voltage. The bridge rectifier is generally coupled to a capacitor. Generally, this capacitor is of a high value. The capacitor forms a counter electromotive force. The capacitor forms a near DC voltage as it is charged and discharged. However, as it is charged, the capacitor draws current only a fraction of the cycle by the non linear bridge rectifier. As a result, the current waveform does not match the voltage and contains a heavy harmonic distortion component. Total harmonic distortion (THD) is the sum of the powers of all harmonic components to the power of the fundamental frequency. This harmonic distortion may be reflected back into the power network.

A switching power supply works on a different principle but also injects harmonics into a power delivery network. In general, a switched mode power supply operates by rectifying the 120V voltage available in US residences. The rectification against a counter electro motive force, such as a big reservoir capacitor, again adds harmonics and distortion. Also, the widespread adaptation of various types of linear or switch mode integrated circuits cause the system to create electrical noise. Furthermore, reactive components in the alternating current network degrades power factor, and integrated circuits cause harmonics and noise to be reflected into the power line. These harmonics manifest as harmonic distortion in the current component of a power signal. Because the power network has a nonzero impedance, distortion along the current component may also translate to amplitude distortion.

Amplitude distortion is distortion occurring in a system, subsystem, or device when the output amplitude is not a linear function of the input amplitude under specified conditions. Other undesirable effects are also formed, such as power factor distortion and overall reduction of energy transfer. Such effects decrease efficiency and reduce quality in the delivery of power. To that end, what is needed are methods and apparatus capable of not only correcting a power factor in a power delivery network, but also reducing or eliminating distortion in a power line, thereby allowing for maximum efficiency and quality in power delivery. As a result, overall energy consumption may be reduced.

SUMMARY OF THE INVENTION

The invention provided herein allows for increasing efficiency and quality of power delivery over a power network to a load. The person of ordinary skill having the benefit of this disclosure will appreciate that the methods and apparatus discussed herein may be applied to a great variety of loads having reactive and non linear components that cause a less than perfect power factor and cause distortion and noise and the like to be injected back into the power network. In some applications, the load is a family residence. The load is a parallel combination of all appliances drawing power within the residence. To the grid, through a power meter, the residence appears to be one dynamic load having changing reactive and non linear properties as users within the residence activate and deactivate appliances. Advantageously, the invention provided herein overcomes prior art solutions inherent drawbacks such as prohibitive cost, complicated installation at multiple locations, fixed PF compensation that may over or under compensate and reduce PF, and poor performance. The invention provided herein is able to correct a power factor to a load by dynamically measuring a reactive power component of the load, and coupling at least one corrective reactive load. As the reactive power changes, such as when a washing machine is activated, the invention is able to recognize that the characteristic of the load has changed, and is able to couple or decouple other corrective reactive loads to the load causing the poor power factor. Furthermore, the invention provided herein is able to correct distortion, noise, and the like in the power delivered by a network to a load, thereby improving the quality of the power. The invention provides for comparing an electrical signal having distortion, noise, or the like to a reference signal. The electrical signal may be the current component of the power delivered to a load through a network. The reference signal may be derived from a voltage component of the power delivered to a load, or be synthesized separately but synchronized with the voltage waveform. A corrective signal is derived by comparing, or subtracting, the reference signal from the signal having distortion. The corrective signal comprises the distortion. Current is sunk or sourced from the signal having distortion according to the corrective signal, resulting in reduced distortion. Advantageously, the invention is able to correct distortion caused by all non linear loads in a residence at one point. The invention is able to be coupled between a utility meter and the residence. As a result, the invention is agnostic to the number of appliances in the residence, their location, or any other parameter. Also, the invention is energy efficient since it improves distortion and PF as necessary without increasing PF or distortion and without the addition of any other electrical load within the property network.

In one aspect of the invention, a method of reducing distortion in an electrical signal having distortion comprises sensing a distortion in the electrical signal having distortion and combining a factor of the distortion with the electrical signal having distortion. In some embodiments, the sensing step comprises comparing the electrical signal having distortion to a reference signal to obtain a difference signal and scaling the difference signal to form the factor of the distortion. The combining step comprises subtracting the factor of the distortion from the electrical signal having distortion if the factor of the distortion is positive and adding the factor of the distortion to the electrical signal having distortion if the factor of the distortion is negative. In some embodiments, the subtracting step comprises applying the factor of the distortion to a first controlled current source coupled to the electrical signal having distortion and the adding step comprises applying the factor of the distortion to a second controlled current source coupled to the electrical signal having distortion. Applying the factor of the distortion to a first controlled current source further comprises applying a power factor corrected positive power signal to the first controlled current source and applying the factor of the distortion to a second controlled current source further comprises applying a power factor corrected negative power signal to the second controlled current source.

In some embodiments, the combining step comprises modulating the factor of the distortion. The factor of the distortion is then added to the electrical signal having distortion if the factor of the distortion is negative and subtracting the factor of the distortion from the electrical signal having Distortion if the factor of the distortion is positive. The adding and subtracting step are able to be achieved by applying the factor of the distortion to a first switch coupled to the electrical signal having Distortion and applying the factor of the distortion to a second switch coupled to the electrical signal having Distortion. Modulating the factor of distortion can include pulse width modulation, delta-sigma modulation, pulse code modulation, pulse density modulation, or pulse position modulation. Applying the factor of the distortion to a first switch includes applying a power factor corrected positive power signal to the first switch and applying the factor of the distortion to a second switch includes applying a power factor corrected negative power signal to the second switch. Advantageously, the use of modulation techniques allows for highly efficient control of the switches. In some embodiments, analog or digital filters may be included for filtering away the modulating signal.

In some applications, an impedance of the power network may be far lower than the impedance of the load that the power network is delivering power to. In such circumstances, it will be appreciated by persons having the benefit of this disclosure that the direction of sourcing or sinking current may need to be reversed. By way of example, a negative distortion is regularly corrected by injecting or sourcing current into the power line. However, if the impedance of the load is greater than the impedance of the network, the current will be injected into the network rather than the load. As a result, the opposite function may be done. This leads to adequate distortion correction of the total current waveform drawn from the grid.

In another aspect of the invention, a method for reducing distortion in a power line comprises correcting a power factor in the power line such that the power factor is substantially one, comparing a current portion of the power line to a desired reference signal, thereby forming a corrective signal, and selectively sinking and sourcing current to the power line according to the corrective signal. Correcting a power factor comprises any known method of power factor correction or any method described herein. In some embodiments, selectively sinking or sourcing current comprises applying the corrective signal to at least one controlled current source, wherein the controlled current source couples a current supply with the power line according to the corrective signal. Alternatively, selectively sinking or sourcing current comprises modulating the corrective signal and applying the modulated corrective signal to at least one switch, wherein the switch couples a current supply with the power line and filtering modulation noise. Modulating the corrective signal comprises any among pulse width modulation, delta-sigma modulation, pulse code modulation, pulse density modulation, or pulse position modulation.

In some applications, an impedance of the power network may be far lower than the impedance of the load that the power network is delivering power to. In such circumstances, it will be appreciated by persons having the benefit of this disclosure that the direction of sourcing or sinking current may need to be reversed. By way of example, a negative distortion is regularly corrected by injecting or sourcing current into the power line. However, if the impedance of the load is greater than the impedance of the network, the current will be injected into the network rather than the load. As a result, the opposite function may be done. This leads to adequate distortion correction of the total current waveform drawn from the grid.

In operation, distortion in electrical signals, such as the power being delivered to a residence, is reduced. The distortion may be harmonic distortion, amplitude distortion, noise, elevated spectral noise, or the like. The power being delivered to a residence comprises a voltage and a current. Generally, the current component of the power delivered to a load will display distortion due to non linearities in the load. The distortion is able to be ascertained by comparing the current to a perfect sine wave, such as the voltage component of the power. This perfect sine wave is able to function as a reference signal. In cases where the voltage sinewave is less than perfect, such as when amplitude distortion has distorted the voltage sinewave, a near perfect sinewave is able to be created locally by synchronizing with the voltage sinewave. For example, zero crossing transitions may be utilized as markers to form a near perfect sinewave. By subtracting the reference signal from the signal having distortion, a corrective signal is formed. The corrective signal comprises a factor of the distortion. A positive portion of the distortion is applied to a current sink coupled to the lines delivering power to the residence. The current sink sinks current out of the line according to the distortion. Similarly, a negative portion of the distortion is applied to a current source that is also coupled to the lines delivering power to the residence. When the distortion is negative, the current source sources current into the line according to the distortion. As a result, the distortion is removed from the current being drawn from the grid.

In some embodiments, the corrective signal may be modulated in order to enhance efficiency. Methods such as pulse width modulation, delta-sigma modulation, pulse code modulation, pulse density modulation, or pulse position modulation. The modulated corrective signal is applied to an active switch, such as a MOSFET, that conducts current into or away from the line providing power to the house according to the distortion.

In some embodiments, the method of reducing distortion further comprises correcting a power factor. A method of dynamic power factor correction comprises determining the reactive power of the first load, determining a power factor resulting from that reactive power, determining an optimum corrective reactive load to be coupled to the first load to bring the ratio to substantially one and coupling the optimum corrective reactive load to the first load.

In some embodiments, coupling the optimum reactive load to the first load includes selecting a quantization level for a desired accuracy, the quantization level having an MSB and an LSB, determining an MSB reactive load determining an LSB reactive load, and closing switches associated with any bit required to achieve the desired accuracy, wherein the switches electrically couple any among the MSB reactive load and LSB reactive load to the first load. Generally, the desired accuracy comprises determining an acceptable value for the ratio. The quantization level is able to further comprise at least one bit between the MSB and LSB. Determining a value for the LSB reactive load, MSB reactive load, and a bit reactive load of the at least one bit includes determining a maximum reactive component of the first load. The MSB reactive load, LSB reactive load, and bit reactive load of the at least one bit is generally, a capacitor and may be coupled to the reactive load via any among a switch, an active switch, a MOSFET, an IGBT transistor, a pair of MOSFETs, a pair of IGBT transistors, a TRIAC, a relay, a thyristor, and a pair of thyristors. In some embodiments, the reactive power is continually monitored and a new optimum corrective reactive load to be coupled to the first load to bring the reactive power to substantially zero, and the power factor to substantially one, is dynamically determined.

In another aspect of the invention, a system for reducing distortion in an electrical signal having distortion comprises a power factor correcting module for bringing a power factor in the signal having distortion to substantially one, a substracter for comparing a current portion of the power line to a desired reference signal, thereby forming a corrective signal, and an electric circuit for selectively sinking and sourcing current to the power line according to the corrective signal. The power factor correcting module comprises a sensor for measuring the reactive power of a first load coupled to power line and a plurality of bit reactive loads for coupling with the first load to counteract a reactive component of the first load. In some embodiments, the electric circuit for selectively sinking or sourcing current is configured to apply the corrective signal to at least one controlled current source, wherein the controlled current source couples a current supply with the power line according to the corrective signal. Alternatively, the electric circuit for selectively sinking or sourcing current comprises a modulator for modulating the corrective signal and applying the modulated corrective signal to at least one switch, wherein the switch couples a current supply with the power line and a filter for filtering modulation noise. The modulator comprises any among a pulse width modulator, delta-sigma modulator, pulse code modulator, pulse density modulator, or pulse position modulator.

In operation, an electrical circuit for reducing distortion in a current signal having distortion comprises a first input for receiving the current signal having distortion, a second input for receiving a reference signal, a substracter coupled to the first input and second input for subtracting the current signal having distortion from the reference signal thereby forming a first corrective signal, and a circuit for selectively combining a positive portion of the first corrective signal and a negative portion of the first corrective signal with the current signal having distortion. The substracter is able to be an analog circuit, such as an operational amplifier configured to subtract one input from another. Alternatively, the substracter may be a digital system, such as a A/D converter capable of digitally subtracting one converted bitstream input from another, and a D/A converter for converting the result to an analog signal comprising the corrective signal.

In some embodiments, the circuit for selectively combining is able to be a positive rectifier coupled to an output of the substracter for determining the positive portion of the corrective signal and a first controlled current source, and a negative rectifier coupled to an output of the substracter for determining the negative portion corrective signal and a second controlled current source. Both controlled current sources are coupled to a positive power supply and a negative power supply respectively in order to selectively sink or source current to or from a main power line in order to correct distortion. In operation, when the distortion is negative, current is sourced to a power supply line according to the negative distortion to compensate. Likewise, when the distortion is positive, current is sunk away according to the positive distortion, thereby compensating.

Alternatively, the circuit for selectively combining is able to be a positive trigger comparator coupled to an output of the substracter for determining a positive portion of the corrective signal, a negative trigger comparator coupled to the output of the substracter for determining a negative portion of the corrective signal and a modulator. The modulator is able to be any useful type of modulator, including a pulse width modulator, a delta-sigma modulator, a pulse code modulator, a pulse density modulator, or a pulse position modulator. The modulator is able to be coupled to an output of the positive trigger comparator and an output of the negative trigger comparator for modulating any among the positive portion of the corrective signal and the negative portion of the corrective signal. In some embodiments, a first switch is coupled to positive trigger comparator. The first switch is able to selectively couple current from a negative DC power supply according to the positive portion of the corrective signal, thereby reducing distortion. Likewise, the second switch is able to selectively couple current from a positive DC power supply according to the positive portion of the corrective signal, thereby reducing distortion.

In some applications, an impedance of the power network may be far lower than the impedance of the load that the power network is delivering power to. In such circumstances, it will be appreciated by persons having the benefit of this disclosure that the direction of sourcing or sinking current may need to be reversed. By way of example, a negative distortion is regularly corrected by injecting or sourcing current into the power line. However, if the impedance of the load is greater than the impedance of the network, the current will be injected into the network rather than the load. As a result, the opposite function may be done. By sinking current from the power line, current is injected in the opposite direction.

In some embodiments, the electrical circuit for reducing distortion further comprises a power factor correction circuit for bringing the power factor between the current and the voltage being delivered to substantially unity. A system for power factor correction comprises means for determining the reactive power of a load, means for determining an optimum corrective reactive load to be coupled to the first load to bring the power factor to substantially one and the reactive power to substantially zero, and means for coupling the optimum reactive load to the first load. In some embodiments, the means for coupling the optimum reactive load to the first load comprises means for selecting a quantization level for a desired accuracy, the quantization level having an MSB and an LSB, means for determining an MSB reactive load, means for determining an LSB reactive load, and means for closing switches associated with any bit required to achieve the desired accuracy, wherein the switches electrically couple any among the MSB reactive load and LSB reactive load to the first load. The quantization level further comprises at least one bit between the MSB and LSB. More bits between the MSB and LSB will result in greater accuracy of power factor correction, or a power factor substantially closer to one. The bit reactive loads are generally a capacitor, and may be coupled to the reactive load via a switch, an active switch, MOSFET, an IGBT transistor, a pair of MOSFETs, a pair of IGBT transistors, a TRIAC, a relay, a thyristor, and a pair of thyristors.

In another embodiment of the invention, a system for reducing distortion in an electrical signal having distortion comprises an electric circuit for comparing at least a portion of the electrical signal having distortion in a power line to a desired reference signal, thereby forming a corrective signal; and an electric circuit for selectively sinking and sourcing current from one of a DC rectifier and a solar panel to the electrical signal having distortion according to the corrective signal to correct the distortion; and selectively injecting additive current from the solar panel into at least one of a load or a power grid. Preferably, the system further comprises a processor for determining when the solar power is generating current and a processor for switching between the DC rectifier and the solar panel for sinking and sourcing current, which may be the same processing unit. Also, the system comprises a transformer, the transforming having a primary winding and a secondary winding, for galvanically isolating the electric circuit for selectively sinking and sourcing from the power line, wherein the secondary may be coupled in series or in parallel. Preferably, the electric circuit for selectively sinking or sourcing current comprises a positive DC power supply selectively coupled to one of the DC rectifier and the solar panel or providing a positive DC current, a negative DC power supply selectively coupled to one of the DC rectifier and the solar panel for providing a negative DC current, a processor for selectively sourcing current into the power line from one of the positive DC power supply in response to a negative distortion; or sinking current from the power line to the negative DC power supply in response to a positive distortion, which again can the same processor mentioned above.

Similarly, a method of correcting a harmonic distortion in a power line comprises generating a corrective signal as discussed above, generating positive DC current from one of a rectifier and a solar power system, generating a negative DC current by inverting the positive DC current, selectively sourcing the positive DC current into a load according to the corrective signal to correct a negative distortion, selectively sourcing the negative DC current into a load according to the corrective signal to correct a positive distortion, and injecting additional available power into at least one of the load and the power line from the solar power system, thereby increasing total current. Preferably, the method also comprises galvanically isolating the load from the positive DC power supply and negative DC power supply. In some embodiments, generating positive DC current from one of a rectifier and a solar power system comprises determining whether the solar power system is generating current, and sourcing current from the solar power system if the solar power system is generating, or sourcing current from the rectifier if the solar power system is not generating current. Advantageously, the method and apparatus mentioned allow for injection of current from a solar power system without the use of a costly and inefficient inverter, as will be explain in detail below.

In another aspect of the invention, a system for correcting harmonic distortion comprises means for determining the harmonic energy in a power line means for storing the harmonic energy, and means for selectively releasing the harmonic energy to counter harmonic energy of an opposite magnitude. Preferably, the means for determining the harmonic energy in a power line is as described above, including a sensor for measuring a current component in a power line, an oscillator for generating a reference signal, and a comparator for comparing the current component to the reference signal there by generating a corrective signal, wherein the corrective signal represents harmonic energy in the power line. The means for storing energy can be a capacitor or inductor. The energy is released by a switch, which selectively couples the means for storing harmonic energy between any among a positive power supply, a negative power supply, and a load. Preferably, the system further comprises a modulator to modulate the corrective signal to drive a transistor to selectively charge the means for storing energy.

Likewise, a method of correcting harmonic distortion in a signal having harmonic distortion comprises determining the harmonic energy in a power line, storing the harmonic energy, and selectively releasing the harmonic energy to counter harmonic energy of an opposite magnitude. The corrective signal is generated as described above, and the energy is stored and released as described above. As can be appreciated, using harmonic energy to correct future harmonic error saves from using an external power source to correct the energy, or drawing greater current from a power line.

In another embodiment, modulation of the power supplies is contemplated. Such an embodiment comprises means for comparing at least a portion of the electrical signal having distortion in a power line to a desired reference signal, thereby forming a corrective signal, means for selectively sinking and sourcing current to the electrical signal having distortion from a negative power supply and a positive power supply respectively, means for modulating the positive power supply according the corrective signal, and means for modulating the negative power supply according to the corrective signal. In analog electronics, such a power supply is referred to as a Class H amplifier. Class H amplifiers enjoy greater efficiency since the power supply closely tracks the current stage of an amplifier. In this implementation, the power supply tracks the corrective signal. Preferably, the means for comparing comprises a sensor for sensing the signal having distortion, an oscillator for generating a reference signal, and a comparator for comparing the signal having distortion to the reference signal thereby generating a corrective signal. The means for selectively sinking and sourcing current comprise a first transistor coupled to the positive power supply for sourcing current to correct a negative harmonic according to the corrective signal, and a second transistor coupled to the negative power supply for sinking current to correct a positive harmonic according to the corrective signal. The means for modulating the power supplies comprises a first transistor for receiving the corrective signal and an LC-flywheel network for deriving a positive and a negative average of the corrective signals respectively.

The corresponding method for the above embodiment comprises forming a corrective signal as previously discussed, selectively sinking and sourcing current to the electrical signal having distortion from a negative power supply and a positive power supply respectively, and modulating the power supplies according to the corrective signal.

Advantageously, the embodiments summarized above are able to be implemented on the scale of a family residence. The systems and circuits summarized above are able to be produced inexpensively, allowing average homeowners access to such devices. Prior art solutions generally include devices that are either targeted for industrial applications, and therefore are configured to correct power factor in networks of far greater current carrying capacity. As a result, they are very large and cost many thousands of dollars and are not amenable to residential applications. Other solutions merely correct power factor and must be applied to individual devices within a home. Furthermore, they are generally fixed capacitor power factor correction units that do not adequately correct a power factor, and may in some instances degrade power factor. Still other solutions are systems wherein a central control unit drives power factor and harmonic correction units that must be coupled to individual appliances, wherein each coupling is an installation step. Such systems also attempt to correct current waveforms by drawing and dissipating current in a purely resistive load, such as an individual appliance. Conversely, the systems and circuits and methods implemented therein are generally to be coupled between a main utility meter and the home, allowing for simple, one step installation.

DETAILED DESCRIPTION OF THE DRAWINGS

In the following description, numerous details and alternatives are set forth for the purpose of explanation. However, one of ordinary skill in the art having the benefit of this disclosure will realize that the invention can be practiced without the use of these specific details. In other instances, well-known structures and devices are shown in block diagram form in order not to obscure the description of the invention with unnecessary detail.

Power Factor Correction Methods and Apparatus

Figure 1:
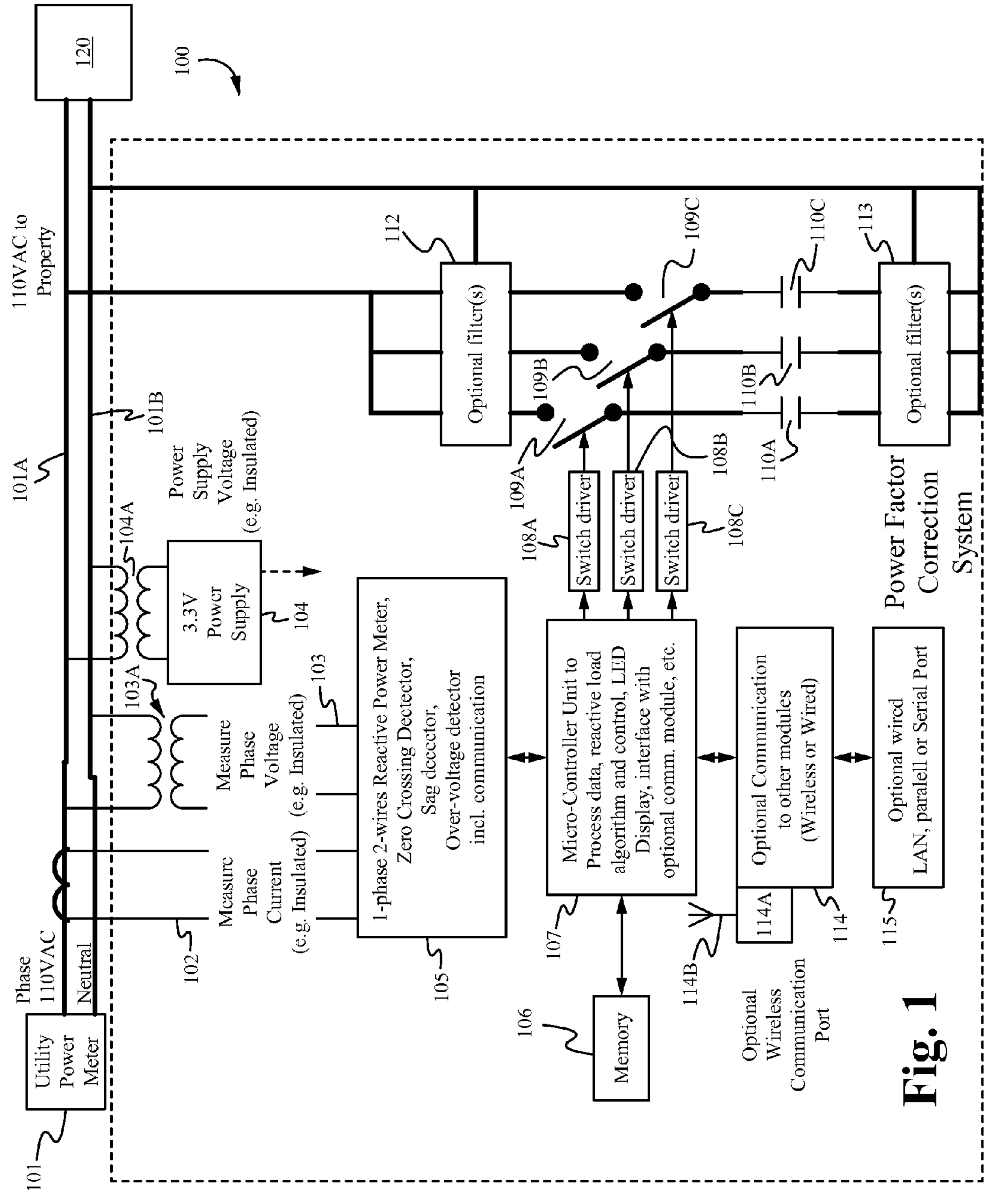
FIG. 1 is a schematic block diagram of a power factor correction circuit per an embodiment of this invention.

FIG. 1 is a block schematic diagram of a power factor correction circuit (PFC) 100 per an aspect of the present invention. Power factor (PF) is defined as the ratio of the real power flowing to the load to the apparent power, and is a number between zero and one. It may also be expressed as a percentage, i.e. a PF of 0.5 is 50%. Real power is the capacity of the circuit for performing work in a particular time. Apparent power is the product of the current and voltage of the circuit. A load with a PF substantially closer to zero draws more current than a load with a PF closer to one for the same amount of useful power transferred. It is generally understood that a PF closer to zero is considered to be a low PF and a PF closer to one is considered to be a high PF. It is highly desirable to optimize the PF and bring it close to one especially when and if the utility energy meter records only the apparent power consumed over time and not the active power. In general, utility companies prefer to have a good power factor in a grid network in order to optimize the infrastructure and maximize the active energy it can deliver to its customers. Bad power factor such as 0.9 and lower, will generate excessive apparent current loss in the lines and stress the grid due to higher currents.

In the example of FIG. 1, the PFC 100 is configured to correct the power factor of power being delivered to a residence or a home, represented by a load 120. The PFC 100 is generally coupled to a 110VAC line 101A and a neutral line 101B. The PFC 100 is coupled between a standard power meter 101 and the load 120. Most homes have several electronic appliances that all represent a load that consumes power. Usually, each load has a reactive component. This reactive component is generally the result of inductive properties of the most common loads found in a household, such as the motor of a washing machine, dryer HVAC unit, or dishwasher, and the like. The combination of all these loads appears as a single load 120 to a utility power meter 101. However, as different appliances are activated and deactivated, the reactive and real components of the load 120 seen by the power meter 101 change dynamically. To that end, the dynamic PFC 100 is able to correct a PF of a load 120 dynamically. In some embodiments, a reactive power measuring module 105 is electrically coupled to a 110 VAC power line (also referred to as a phase line) 101A and a neutral line 101B by a first insulated set of conduits 102 and a second set of conduits 103. The example shown, the first set of conduits 102 are able to be wires coupled to the 110VAC power line 101A. The first set of contacts 102 measures a phase current component of the power being delivered to a load. A second set of contacts 103 is coupled across the 110VAC power line 101A and the neutral line 101B to measure the phase voltage. A step down transformer 103A may be included to lower the amplitude of the voltage allowing for more simplicity in the PFC 100, as lower voltage electronics are more cost effective and allow for greater ease of design. The reactive power measuring module 105 is able to determine the reactive power of the load through conduits 102 and 103. By way of example, the reactive power measuring module 105 is able to comprise a processor unit, such as the Analog Devices ADE 7878. The measuring module 105 is further able to communicate with an external processor 107.

In some embodiments, the controller 107 is able to selectively couple a number of reactive loads having differing values, for example capacitors 110A-110C in parallel with the load 120 in order to compensate for the reactive component of the load 120. A binary implementation is used to couple the loads 110A-110C with the load 120. In order to determine a value for the loads 110A-110C, it is advantageous to first ascertain a minimum and maximum reactive power compensation range. In a binary implementation, it can be shown that the accuracy of the PFC 100 is able to be precise as half the value of the reactive power of the lowest value among the loads 110A-110C, where each load corresponds to a bit or quantization level. The lowest value among the loads 110A-110C is a lowest bit reactive load and smallest component of the desired quantization. The exemplary implementation of the PFC 100 shows a quantization level of 3. Stated differently, there are three bit reactive loads, the lowest being the LSB, or least significant bit reactive load and the highest being the MSB, or most significant bit reactive load. The accuracy of the PFC 100 may be represented as:

$$Err_{MAX}=LSB/2$$

where the LSB is chosen optimally by the equation:

$$LSB=\mathrm{VAR}_{MAX}/(2^N-0.5)$$

Where $\mathrm{VAR}_{MAX}$ is maximum reactive value of the load 120 to be compensated and N is the level of quantization. It can be appreciated that the level of quantization is directly proportional to the accuracy of the compensation of the reactive portion of the load 120. A desired quantization level may be determined as a balancing of desired accuracy versus cost and complexity. Simulations of approximately 50 samples of minimum and maximum reactive power of the load 120 to be corrected are shown in Table 1:

TABLE 1

| | N = 1 | N-2 | N = 3 | N = 4 |
|---|---|---|---|---|
| Accuracy vs. 1 LSB | 49.1% LSB | 47.9% LSB | 45.5% LSB | 46.8% LSB |
| Inaccuracy vs. $\mathrm{VAR}_{MAX}$ | 32.7% | 13.7% | 6.1% | 3.0% |

A corrective reactive power value $Q_{CORR}$ is determined by the following algorithm:

$$\text{IF } (\text{round}(Q/LSB))>(2^N-1)$$

$$\text{Then } Q_{CORR}=LSB*(2^N-1)$$

$$\text{Else } Q_{CORR}=LSB*\text{Round}(Q/LSB)\text{, all values in VAR}$$

where Q is the reactive value of the load 120 to be compensated. As mentioned above, the reactive value of the load 120 is changing dynamically as household appliances are being activated and deactivated and their individual reactive loads are being coupled into the load 120. To that end, it is advantageous for the reactive power measuring module 105 to be configured to measure a reactive power for the load 120 and communicate the reactive power to the controller 107. Alternatively, the controller 107 may be directly coupled to the load 120 in order to determine the reactive power instantaneously. If Q is zero or positive, the reactive portion of the load 120 is inductive. Less commonly, a negative Q indicates that the reactive portion of the load 120 is capacitive. Table 2 shows an example of the impact of quantization on the PFC 100 accuracy.

TABLE 2

| | N = 1 | N = 2 | N = 3 | N = 4 |
|---|---|---|---|---|
| Maximum correctable reactive power with max. error, MAEFS | 2000 VAR | 2000 VAR | 2000 VAR | 2000 VAR |
| Reactive power of ½ LSB | 666.7 VAR | 285.7 VAR | 133.3 VAR | 64.5 VAR |
| Reactive power of bit 1 = LSB | 1333.3 VAR | 571.4 VAR | 266.7 VAR | 129.0 VAR |
| Reactive power of bit 2 | NA | 1142.9 VAR | 533.3 VAR | 258.1 VAR |
| Reactive power of bit 3 | NA | NA | 1066.7 VAR | 516.1 VAR |
| Reactive power of bit 4 | NA | NA | NA | 1032.3 VAR |
| Total Active Load Power P | 10-3000 W | 10-3000 W | 10-3000 W | 10-3000 W |
| Total Reactive Load Power Q | 8-2000 VAR | 8-2000 VAR | 8-2000 VAR | 8-2000 VAR |
| MAEFS, Maximum simulated Absolute Error for QMIN to QMAX | 655 VAR | 274 VAR | 121 VAR | 60 VAR |
| Power Factor | 0.667 | 0.667 | 0.667 | 0.667 |
| Minimum simulated Power Factor after compensation | 0.782 | 0.909 | 0.96 | 0.98 |
| Average simulated Power Factor after compensation | 0.89 | 0.953 | 0.978 | 0.989 |

By way of example, the active power consumed is assumed to be between 10 and 3000 watts and the reactive power of the load 120 is assumed to be between 8 and 2000 VAR in a single phase, 2 wire network configuration. In this example, the PF is fixed at 0.67 for illustrative purposes. As can be seen from Table 2, an implementation of two or three bits (i.e. N=2 or N=3) generally optimizes a power factor to be substantially close to one while minimizing cost and complexity. For an instance in a 110V system such as in the US, and where N=3, and for the example set forth in Table 2, the reactances of the two reactive bits $Q_{LSB}$ and $Q_{MSB}$ and the middle bit Q are calculated as:

$$ZQ_{LSB}=U^2/Q_{LSB}=110V^2/266.7\text{ VAR}=45.37\text{ Ohm (Purely Capacitive)}$$

$$ZQ=U^2/Q=110V^2/533.3\text{ VAR}=22.68\text{ Ohm (Purely Capacitive)}$$

$$Z\,Q_{MSB}=U^2/Q=110V^2/1066.7\text{ VAR}=11.34\text{ Ohm (Purely Capacitive)}$$

Referring back to FIG. 1, Capacitors 110A-110C, where 110A is the LSB bit reactive load and 110C is the MSB bit reactive load, the capacitor values are calculated as:

$$C_{LSB}=1/(2\pi F\,ZQ_{LSB})=1/(2\pi*60\text{ Hz}*45.37\text{ Ohm})=58\text{ uF}$$

$$C=1/(2\pi F\,ZQ)=1/(2\pi*60\text{ Hz}*22.68\text{ Ohm})=117\text{ uF}$$

$$C_{MSB}=1/(2\pi F\,ZQ_{MSB})=1/(2\pi*60\text{ Hz}*11.34\text{ Ohm})=234\text{ uF}$$

As a result, the LSB bit reactive load 110A is 58 uF, the bit reactive load 110B is 117 uF, and the MSB bit reactive load 110C is 234 uF in this example. Each bit reactive load 110A-110C is coupled to the load 120 in parallel via switches 109A-109C. Each switch is enabled by a switch driver 108A-108C. Each switch driver in turn is controlled by the controller 107. As mentioned above, the controller 107 either is able to measure the reactive power of the load 120 to be compensated or has that information communicated to it by the reactive power measuring module 105. The controller is able to be coupled to a memory 106. Alternatively, the memory 106 may be integral to the controller 107. The memory 106 is able to store the values of the maximum reactive power of load 120 to be compensated and the bit reactive values of the loads 110A-110C. Additionally, the memory 206 is able to store power factor correction records in order to give a user, such as a homeowner, useful data on the power consumption characteristics of the residence. Therefore, the controller 107 is able to selectively activate the switch drivers 108A-108C to enable or disable switches 109A-109C thereby selectively coupling the bit reactive loads 110A-110C to the load 120 in parallel, thereby dynamically compensating for the reactive power of the load 120.

In some embodiments, the controller 107 is coupled to a communications module 114. The communications module 114 is able to communicate with other PFC units 100. Also, the communications module 114 is able to communicate with a user apparatus such as a laptop or a cell phone in order to notify a user, such as the homeowner, of the status of the PFC 100 and the amount of correction that the PFC 100 is doing. The communications module 114 is able to communicate wirelessly through a wireless module 114A. The wireless module comprises an antenna 114B to make use of a local WiFi network such as IEEE 802.11. In some embodiments, the wireless module 114A is able to communicate with a cellular telephone network via standard technologies such as CDMA or GSM. A user, such as the owner of a residence, is able to track their home's dynamic power consumption in order to make informed decisions regarding energy use. Alternatively, the communications module 114 is able to communicate via wired networks through a port 115 able to connect via LAN, Serial, Parallel, IEEE 1394 Firewire, or any other known or application specific wired communications standard. The PFC 100 further comprises a DC power supply 104 coupled to the 110VAC power line 101A and the neutral line 101B via a step down transformer 104A. The DC power supply is able to convert power from the power line 101A to a desired DC voltage to provide power to the electronics such as the reactive power measuring module 105, controller 106, and the rest of the modules within the PFC 100.

In some embodiments, the switches 109A-109C are able to be one or more transistors. A transistor may include any combination of bipolar transistors, MOS transistors, IGBT transistors, FET transistors, BJT transistors, JFET transistors, IGFET transistors, MOSFET transistors, and any other type or subset of transistor. With respect to bipolar and IGBT transistors, some considerations in the selection of bipolar or IGBT transistor are the weak zero collector—emitter voltage of the transistor in ON state and driving requirements. Furthermore, transistors are generally unidirectional, meaning that current generally flows from a drain to a source or from a collector to an emitter. To that end, it may be advantageous to arrange two transistors, one for each direction of current flow, each having its own bit reactive load to be coupled to the 120. Another implementation consideration when using transistors as switches 109A-109C is that transistors generally require an additional protection diode against reverse voltage. For example, if the transistor is rated for more than 110 or 220VAC, the maximum emitter to base voltage is approximately 5-10V. As a result, it may be advantageous to implement a protection diode in series with the emitter to protect the transistor during the reverse half sine wave voltage. Due to energy lost as heat dissipation, transistors may require one or more heat sinks. The power dissipated by the transistor in a conducting state for half the sine wave may be approximated as $$\text{Power}=U_{CE}*I_{CE}/2=UCE*(U_{AC}-U_{CE})/(2*Z)$$

Assuming $U_{CESAT}$=2 Volts at 10 A, such as the ON Semiconductor 2N3773, $U_{AC}$=110 Volts for a common US residential power line, Z=10.59 ohm, the power dissipated as heat per transistor can be approximated as $$\text{Power}=2\text{V}*(110\text{VAC}-2\text{V})/(2*10.59)=10.2\text{ W per transistor}$$

A 2 bit reactive power correction system would require 4 transistors, 4 capacitors and 4 power diodes. The total power dissipated as heating the switches 109A-109C may be approximated as $$\text{Power}=2*10.2\text{ W(bit 2)}+2*5.1\text{ W (bit }2=LSB)=30.6\text{ W}$$

As a result, it may be advantageous to couple the switches 109A-109C to a heat sink, adding cost and complexity to the PFC 100.

MOS and MOSFET transistors are generally lower power dissipation devices. However, MOS and MOSFET devices are unidirectional as well and need protection against excess reverse $V_{GS}$ voltages. The power dissipated by a MOS or MOSFET switch in a conducting state for half the sine wave voltage may be approximated as:

$$\text{Power}=R_{DS\_ON}*I_{DS}/2=(R_{DS\_ON}/2)*(U_{AC}/Z)2$$

Assuming $R_{DS\_ON}$=0.13 Ohm at 10 A, such as a ST Microelectronics STF20N20, $U_{AC}$=110 Volts for a common US residential power line, and Z=10.59 ohm, the power dissipated as heat in the switch may be approximated as:

$$\text{Power}=0.13\text{ ohm}/2*(110\text{VAC}/10.59\text{ ohm})2=7.01\text{ W}$$

A 2 bit reactive power correction system would require 4 transistors, 4 capacitors and 4 power diodes. The total dissipated power in the switches can be approximated as $$\text{Power}=2*7.01\text{ W(bit 2)}+2*3.5\text{ W(bit }2=LSB)=21.0\text{ W}$$

Although the use of MOS or MOSFET devices in the switches 109A-109C reduce the power dissipated as heat by approximately one third, a heat sink my still be needed to dissipate the waste heat. Although MOS or MOSFET devices having a very low $R_{DS\_ON}$ are commercially available, they generally carry a higher cost.

Figure 2:
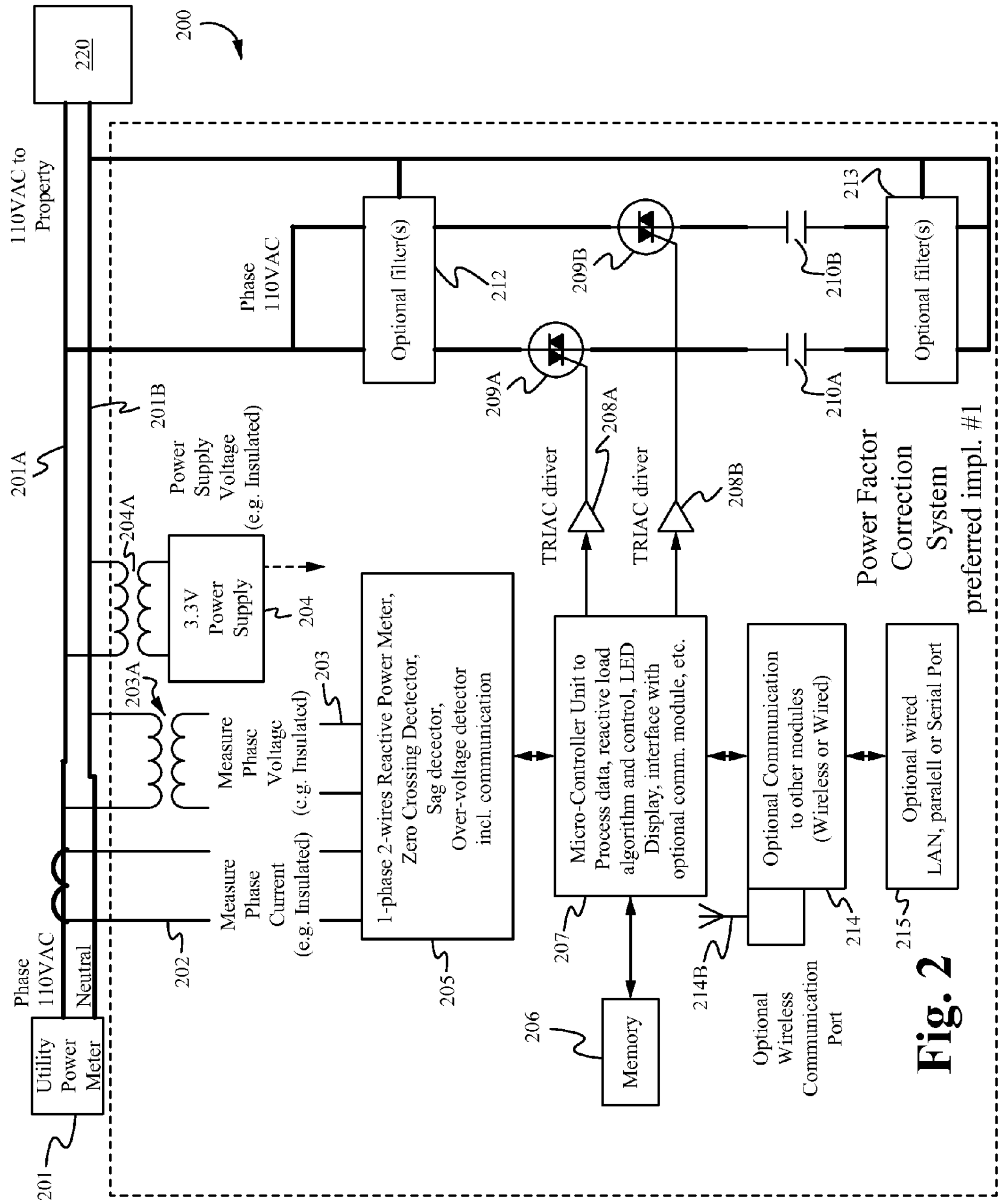
FIG. 2 is a schematic block diagram of a power factor correction circuit per an embodiment of this invention.

FIG. 2 shows a PFC 200 per an embodiment of the present invention. Similar to the PFC 100 of FIG. 1, the PFC 200 is configured to correct the power factor of power being delivered to a residence or a home, represented by a load 220. The PFC 200 is generally coupled to a 110VAC line 201A and a neutral line 201B. The PFC 200 is coupled between a standard power meter 201 and the load 220. In some embodiments, a reactive power measuring module 205 is electrically coupled to a 110 VAC power line 201A and a neutral line 201B by a first insulated set of contacts 202 and a second set of contacts 203. The example shown, the first set of contacts 202 are able to be wires coupled to the 110VAC power line 201A. The first set of contacts 202 measures a phase current component of the power being delivered to a load. A second set of contacts 203 is coupled across the 110VAC power line 201A and the neutral line 201B to measure the phase voltage. A step down transformer 103A may be included to lower the amplitude of the voltage allowing for more simplicity in the PFC 200, as lower voltage electronics are more cost effective and allow for greater ease of design. By way of example, the reactive power measuring module 105 is able to comprise a processor unit, such as the Analog Devices ADE 7753. In some embodiments, the module 205 is able to communicate sags or over voltage conditions to a micro controller 207.

A controller 207 is coupled to the reactive power measuring module 205. The controller 207 is coupled to a plurality of TRIAC drivers 208A and 208B. The triac drivers 208A and 208B in turn are configured to selectively activate and deactivate a plurality of TRIACs 209A and 209B. In the example shown, 10 mA is utilized to drive the TRIACs. However, other driving signals may be utilized to drive the TRIACs depending on its specifications. A TRIAC, or Triode for Alternating Current, is an electronic component approximately equivalent to two silicon-controlled rectifiers coupled in an inverse parallel configuration with their gates electrically coupled together. This results in an electronic switch that is able to conduct current bidirectionally and thus doesn't have any polarity. It can be activated by either a positive or a negative voltage being applied to a gate electrode. Once activated, the device continues to conduct until the current through it drops below a certain threshold value known as the holding current. As a result, the TRIAC is a very convenient switch for AC circuits, allowing the control of very large power flows with milliampere-scale control currents. TRIACs are generally understood to belong to a greater category of components known as thyristors. Thyristors include but are not limited to: silicon controlled rectifiers (SCR), gate turn off thyristors (GTO), static induction thyristors (SIT), MOS controlled thyristor (MCT), distributed Buffer—gate turn-off thyristor (DB-GTO), integrated gate commutated thyristor (IGCT), MOS composite static induction thyristor (CSMT), reverse conducting thyristor (RCT), Asymmetrical SCR (ASCR), Light Activated SCR (LASCR), Light triggered thyristor (LTT), Breakover Diode (BOD), modified anode gate turn-off thyristor (MA-GTO), distributed buffer gate turn-off thyristor (DB-GTO), Base Resistance Controlled Thyristor (BRT), field controlled thyristor (FCTh), and light activated semiconducting switch (LASS). A person of ordinary skill having the benefit of this disclosure will be able to recognize that the embodiment of the PFC 200 of FIG. 2 may be readily modified to use any known or application specific thyristor to realize particular design or application requirements to implement the PFC 200.

The controller 207 is able to implement an algorithm as described in FIG. 1 above to enable or disable the TRIACs 209A and 209B through the TRIAC drivers 208A and 208B. Advantageously, TRIACs enjoy a lower logic threshold to enable them. As a result, smaller and more cost effective components are able to be used as drivers 208A and 208B. When enabled, the TRIACs 209A and 209B couple bit reactive loads 210A and 210B in parallel with the load 220 in order to compensate for poor power factors. Optionally, filters 212 and 213 may be implemented to reduce switching noise or hum introduced by the TRIACs.

In some embodiments, the controller 207 is coupled to a communications module 214. The communications module 214 is able to communicate with either PFC units 200. Also, the communications module 214 is able to communicate with a user apparatus such as a laptop or a cell phone in order to notify a user, such as the homeowner, of the status of the PFC 200 and the amount of correction that the PFC 200 is doing. The communications module 214 is able to communicate wirelessly through a wireless module 214A having an antenna 214B to make use of a local WiFi network such as IEEE 802.11. Also, the wireless module 214A is able to communicate with a cellular network, such as CDMA or GSM so that a user may use a cellular phone in order to track and make educated decisions regarding the energy consumption of their home. Alternatively, the communications module 214 is able to communicate via wired networks through a port 215 able to connect via LAN, Serial, Parallel, IEEE 1394 Firewire, or any other known wired communications standard. A memory module 206 is coupled to the controller 207. The memory module 206 is able to store information such as the maximum expected reactive component that may be expected from the load 120, the corrective action history of the PFC 200, or any other useful data collected by or used by the PFC 200. The PFC 200 further comprises a DC power supply 204 coupled to the 110VAC power line 201A and the neutral line 201B via a step down transformer 204A. The DC power supply is able to convert power from the power line 201A to a desired DC voltage to provide power to the electronics such as the reactive power measuring module 205, controller 207, and the rest of the modules within the PFC 200.

A person of ordinary skill having the benefit of this disclosure will be able to appreciate that the PFC 100 and PFC 200 in FIGS. 1 and 2 respectively show a 2 wire, 2 phase system. The implementation of the PFC 100 or PFC 200 for three phase 3-wire or 4-wire network configuration follows the implementation of FIGS. 1 and 2 except that the bit reactive loads 110A-110C and 210A-210B, switches 109A-109C, TRIACs 209A and 209B, filters 112, 113, 212, 213 and associated driver circuits are tripled and connected from phase 1 to 2, phase 2 to 3, and phase 3 to 1. If the neutral is available, a star connection may be implemented; i.e. connection from phase 1 to neutral, phase 2 to neutral, and phase 3 to neutral. The PFC 100 and PFC 200 will be able to compensate independently for any reactive loads up the total maximum correctible value. By way of example, a property with an air conditioning unit of 300-600VAR connected between the 3 phases, a washing machine of 100-400VAR connected between phase 2 and neutral and a dryer of 100-250VAR connected between phase 3 and neutral will all be fully corrected up to the maximum correctable reactive value.

Distortion Correction Methods and Apparatus

A power factor that is less than perfect is the most common weakness to be corrected in an electrical network. Another and more common weakness and source of problem is distortion in a power line due to non linear loads and the growing proliferation of electronics devices with affordable but less than perfect power adapters. Generally, when no special effort is provided in the design the power adapter, the AC power signal is generally first fully rectified on both sine periods and then roughly filtered by a big capacitor, followed by isolated DC-DC power supply electronics, such as integrated circuits. This affordable and non-energy star solution generates current harmonics that are fed back onto the network. The result is a current waveform is that is close to a truncated parabolic shape rather than a sine wave. Distortion is able to comprise harmonic distortion resulting from the various characteristics of the loads that absorb and reflect power, noise, or any other form of distortion.

Figure 3A:
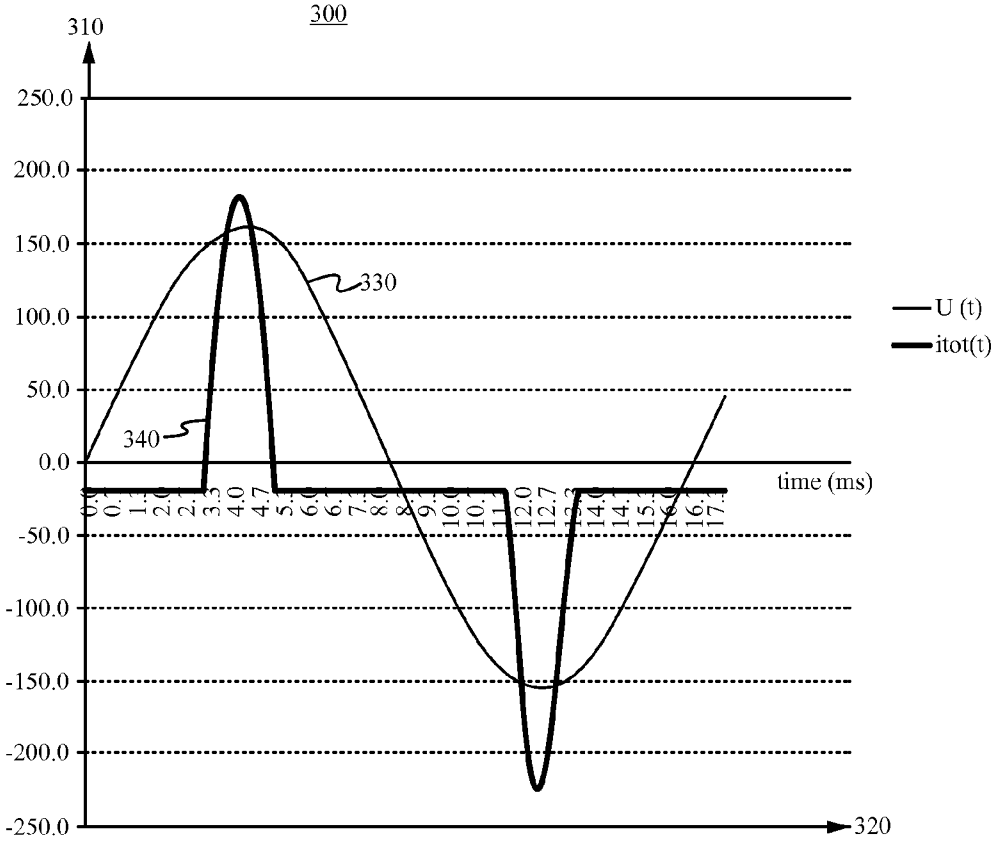
FIG. 3A is a time vs. amplitude graph of a power factor corrected power signal having distortion.
Figure 3B:
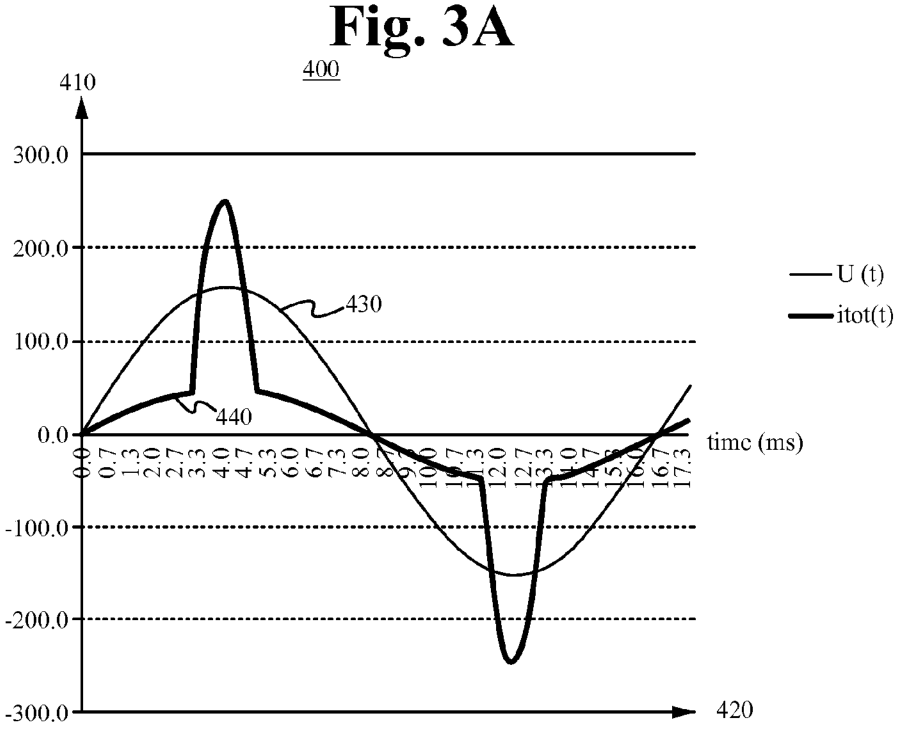
FIG. 3B is a time vs. amplitude graph of a power factor corrected power signal having distortion.
Figure 3C:
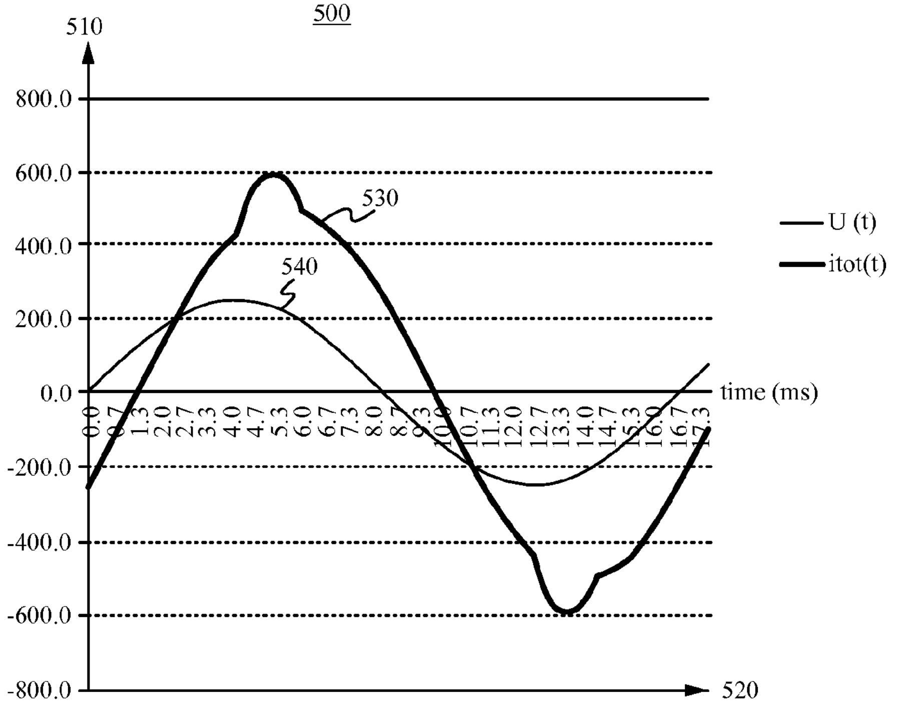
FIG. 3C is a time vs. amplitude graph of a power factor corrected power signal having distortion.
Figure 3D:
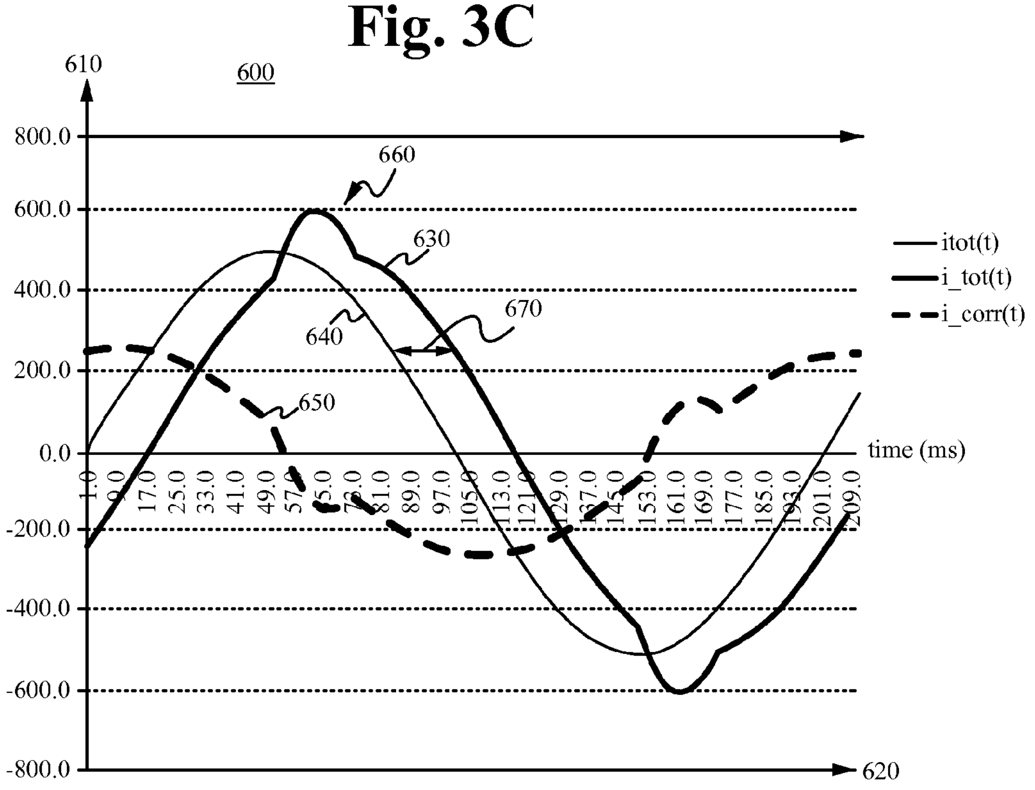
FIG. 3D is a time vs. amplitude graph of a power signal having a poor power factor, distortion and methods of correction of distortion.

FIG. 3A shows a time versus amplitude graph 300 of a power factor corrected power signal having distortion. The first axis 320 represents time in milliseconds and the second axis 310 is a generic amplitude scale to show the amplitudes of both the current and the voltage. The voltage U(t) 330 appears as a perfect 60 Hz sine wave. However, the current $i_{TOT}(t)$ is heavily distorted to the point where it no longer resembles a corresponding sine wave. FIG. 3B shows a similar graph 400 having a time axis 420 and an amplitude axis 410. A voltage waveform 430 closely tracks a perfect sine wave. However, the current waveform 440 is heavily distorted. In a residence, heavy use of ubiquitous and low quality power adaptors along with standard resistive loads may cause a current waveform 440 to display such distortion: some resemblance to a sine wave but still greatly distorted. FIG. 3C shows a similar graph 500 having a time axis 520 and an amplitude axis 510. Here, the current waveform 530 is even more greatly distorted versus the voltage waveform 540 due to the introduction of one or more heavy reactive loads such as air conditioning and dryer units. Finally, FIG. 3D is a graph 600 of a common current waveform 630 versus a voltage waveform 640. Not only are heavy reactive loads, resistive loads, and AC-DC power adaptors causing significant distortion in the current 630, there is also a phase shift 670 between the current 630 and voltage 640. In this example, the distortion is shown as a peak 660 in the distorted current signal 630. In this example, the phase shift is approximately 30 degrees, corresponding to a PF of 0.67. In order to correct the distortion, it is advantageous that the PF first be corrected. PF correction may be achieved by the methods or apparatus discussed above in FIG. 1 and FIG. 2 or any other convenient method. A corrective signal 650 is derived by comparing the distorted current waveform 630 to the near perfect sine wave approximation voltage waveform (not shown). The corrective signal 650 comprises a factor of the distortion within the current waveform 630. The factor may be one, but the factor may be any necessary multiplicand to achieve a desired amplitude ratio of the current waveform. By way of example, the multiplicand may be a factor to convert a voltage to a current or a current to a voltage. When the corrective signal 650 is selectively coupled to the current signal 630, the result is a corrected current signal 640 having greatly reduced or eliminated distortion.

Figure 4:
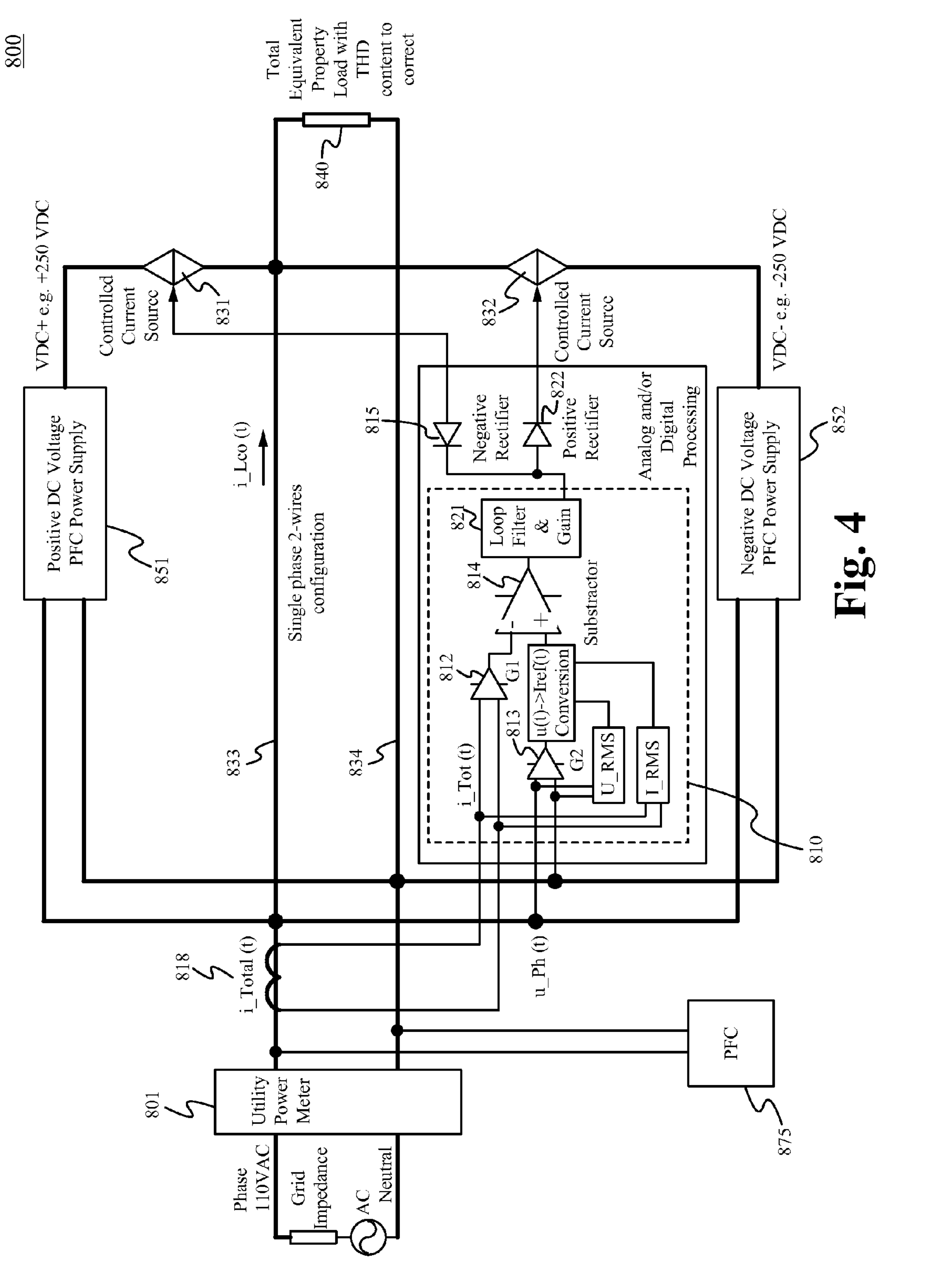
FIG. 4 is a schematic block diagram of a distortion reducing circuit per an embodiment of this invention.

FIG. 4 shows a schematic block diagram of a circuit 800 for suppressing or eliminating distortion as described in FIG. 3D. The circuit 800 is coupled between a utility power meter 801 and a load 840. The load 840 may be any load, but in this application and example it is a residential dwelling. The load 840 comprises all electrical devices within the dwelling that together appear as one load 840 to a utility power meter 801. The characteristics of the load 840 change dynamically as appliances are activated and deactivated within the residence thereby coupling and decoupling their individual loads to the load 840. A PFC 875 is able to correct a power factor in a power line 833 to substantially one. A processor 810 is able to detect a current by sensing the power line 833. In this exemplary embodiment, the processor 810 is an analog device. However, a person of ordinary skill having the benefit of this disclosure will recognize that digital processing may be substituted. The processor 810 is also able to detect a voltage by sensing both the power line 833 and a neutral line 834. The power line 833 is also referred to as a phase line. In this exemplary implementation, the processor 810 comprises two differential inputs. Each input is coupled to a multiplier G1 812 and G2 813. The multipliers 812 and 813 are able to scale the current or the voltage by any factor desired or required by a particular application or implementation of the circuit 800. G1 is configured to receive the current from the power line 833. In this embodiment, the multiplier G2 is able to convert the voltage sensed into a current signal. Both the voltage and the current are scaled by their respective RMS values. The multipliers 812 and 813 are able to be standard analog operational amplifiers or any other useful circuit. The outputs of the multipliers 812 and 813 are coupled to a substracter 814. In some embodiments, the substracter 814 is configured to compare the scaled outputs of G1 812 and G2 813, thereby deriving a corrective signal, such as the signal 650 of FIG. 3D. Advantageously, converting both inputs to a current allow for the use of a simple substracter 814. However, both inputs may be converted into a voltage signal as well. In some embodiments, it may be desirable to include a block loop gain and loop filter 821 to control the process and optimize system control such as dynamic behavior, stability, gain margin, phase margin, and the like. It should be noted that the substracter 814 is able to be configured to compare the total current to a reference signal by subtracting the total current having distortion from the reference signal, or subtract the reference signal from the total current having distortion. The configuration may be made to suit particular implementation or application requirements. As a result, the corrective signal may be directly or inversely proportional to the distortion in the total current.

The corrective signal is combined with the current to form a corrected current signal having greatly reduced or eliminated distortion, such as the signal 640 in FIG. 3D. In the embodiment shown in FIG. 4, the output of the loop filter 821 is coupled to a negative rectifier 815 and a positive rectifier 822. The negative rectifier 815 is in turn coupled to a first controlled current source 831 and the negative rectifier is coupled to a second controlled current source 832. In certain applications, such as the example of FIG. 4, the impedance of the network downstream from the power meter 801 may have a very small impedance compared to the load 840. As a result, when current is injected to correct a negative distortion, the current will be sourced towards the grid rather than the load 840. As a result, distortion will be amplified. To that end, the embodiment of FIG. 4 sinks current from the power line 833 in response to a negative distortion and sources current in response to a positive distortion. Due to the imbalance of the impedances of the grid and the load 840, the selectively sourced and sunk current will correct the distortion. When a corrective signal is negative, meaning that the distortion component is subtractive to the total current, the positive rectifier 822 enables the second controlled current source 832. The second controlled current source 822 is coupled to a negative DC power supply 852. When the second controlled current source 832 is enabled, current is sunk from the power line 833. In an embodiment wherein the grid impedance is lower than the impedance of the load 840, current will be sunk from the grid rather than the load, causing an additive effect to the load 840. When a corrective signal is positive, meaning the distortion is additive to the total current, the negative rectifier 815 enables the first controlled current source 831. The first controlled current source 831 is coupled to a positive DC power supply 851. When the first controlled current source 831 is enabled, current is sourced from the positive DC power supply 851 to the power line 833. Again, in applications where the grid impedance is lower than the load 840, current will be sourced into grid rather than the load, causing a subtractive effect on the load 840. In operation, a corrective signal such as the signal 650 in is combined with a current signal having distortion such as the waveform 630 of FIG. 3C by selectively sinking or sourcing current according to the corrective signal into the power line. One of a positive portion of the corrective signal and a negative portion of the corrective signal is selectively coupled to one of the controlled current sources 831 and 832. This is able to be done dynamically as the distortion component of the power line 833 changes with changes in the load 840 since the processor 810 continually compares the voltage to the current and continually derives a corrective signal. Alternatively, the processor 810 is able to generate its own reference signal to compare the distorted current signal to. For example, power in the United States is delivered at 60 Hz. Therefore, a 60 Hz function generator within the processor 810 would be able to generate a perfect sine wave to compare the distorted current signal to and thereby derive a corrective signal. Alternatively, phase locked loops may be implemented to lock on zero crossing times of the voltage in order to derive a near perfect reference signal. As mentioned above, the substracter 814 may be configured to form a corrective signal that is directly or inversely proportional to the distortion in the total current. If the substracter 814 is configured to form a corrective signal that is directly proportional to the distortion, then a positive portion of the distortion should cause current to be sunk from the power line 833 accordingly. Likewise, a negative portion of the distortion should cause current to be sourced into the power line accordingly. The inverse is also true. In embodiments wherein the corrective signal is inversely proportional to the distortion in the total current, a negative portion of the corrective signal should cause current to be sunk away from the power line 833. Likewise, a positive portion of the corrective signal should cause current to be sourced into the power line 833.

While the embodiment shown in FIG. 4 utilizes components that are widely available and cost effective, it can be appreciated that the controlled current sources 831 and 832 are not very energy efficient. Assuming the positive DC power supply 851 is 250V, the instantaneous voltage in the power line 833 is 150V, and that the corrective current signal is 10 A, the power dissipated and lost to waste heat may be hundreds of watts.

Figure 5:
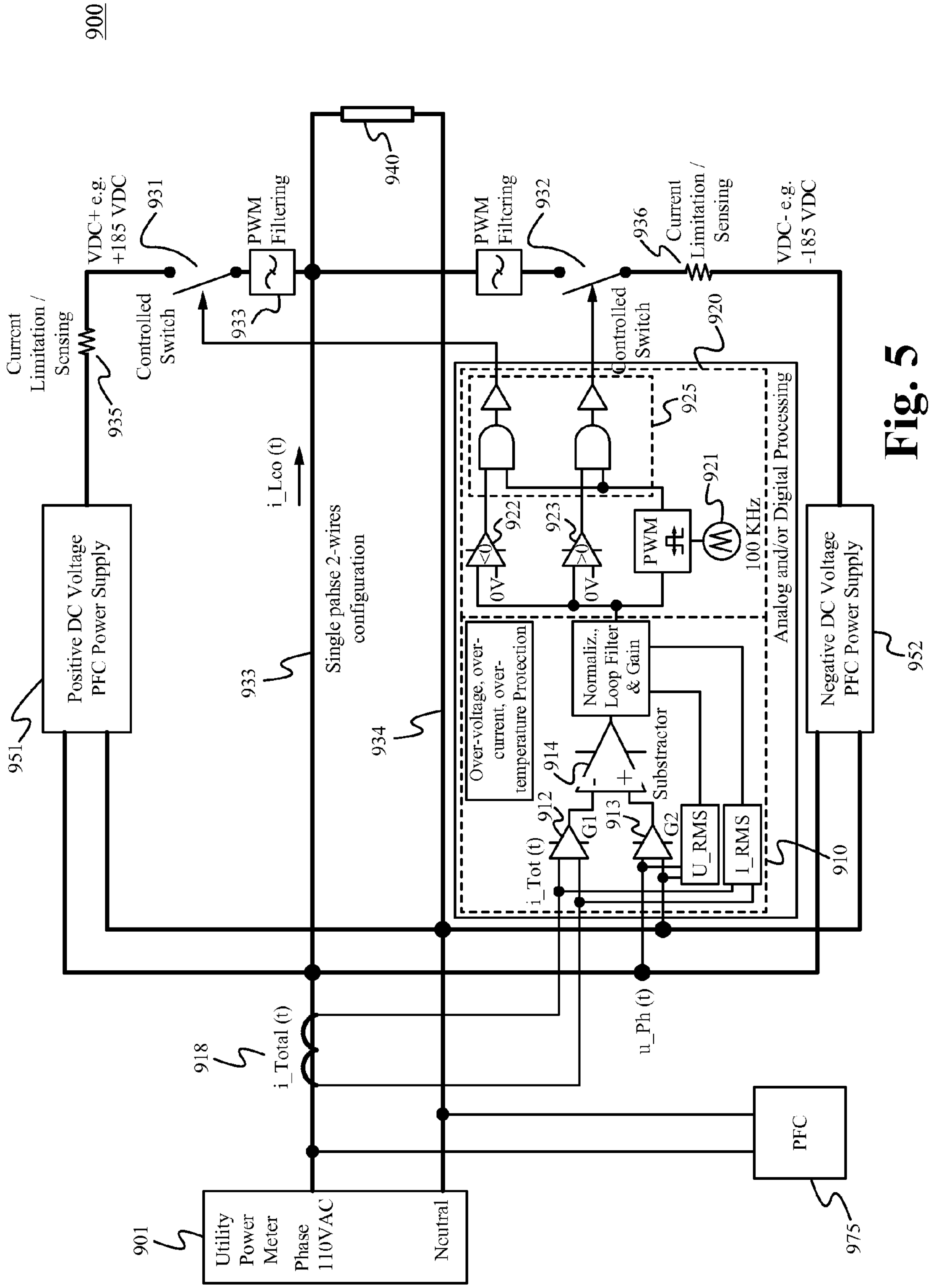
FIG. 5 is a schematic block diagram of a distortion reducing circuit having modulation per an embodiment of this invention.

To that end, FIG. 5 shows a distortion reduction circuit 900 having a modulator 920. Similar to the circuit 800 of FIG. 4, The circuit 900 is coupled between a utility power meter 901 and a load 940. The load 940 may be any load, but in this application and example it is a residential dwelling. The load 940 comprises all electrical devices within the dwelling that together appear as one load 940 to a utility power meter 901. A PFC 975 is able to bring a power factor of the power line 933 to substantially one. The PFC 975 may be according FIG. 1 or 2 or any other convenient PFC. As mentioned above, the characteristics of the load 940 change dynamically. A processor 910 is able to detect a current by sensing a power line 933. In this exemplary embodiment, the processor 910 is an analog device. However, a person of ordinary skill having the benefit of this disclosure will recognize that there are many off the shelf digital processors capable of executing the functions described below. The processor 910 is also able to detect a voltage by sensing both the power line 833 and a neutral line 934. In this exemplary implementation, the processor 910 comprises two differential inputs. Each input is coupled to a multiplier G1 912 and G2 913. G2 913 is able to convert a voltage to a current signal in a similar fashion to G2 813 of FIG. 4 and is shown in a simplified manner. The multipliers 912 and 913 are able to be standard analog operational amplifiers or any other useful circuit. The outputs of the multipliers 912 and 913 are coupled to a substracter 914. In some embodiments, the substracter 914 is configured to subtract the output of G1 912 from the output of G2 913, thereby deriving a corrective signal, such as the signal 650 of FIG. 3D. In some embodiments, it may be desirable to multiply this corrective signal by a scaling factor. By way of example, a loop gain filter is included to control the process in a similar fashion as shown in FIG. 4 and in some embodiments combines the corrective signal by an RMS value of the current 811.

The output of the loop filter is coupled to a modulator 920. In this exemplary embodiment, the modulator 920 is a pulse width modulator (PWM). However, any method or scheme of modulation may be implemented as specific implementation and design restrictions require, including but not limited to PWM, delta-sigma modulation, pulse code modulation, pulse density modulation, pulse position modulation, or any other known or application specific modulation scheme. The modulator 920 comprises a positive trigger comparator 822 and a negative trigger comparator 823 that signal a high logic level when the corrective signal emitted from the multiplier 915 is positive and a low logic level when the corrective signal is negative. In some embodiments, the low logic level is able to be a negative value. A pulse generator 921 generates a triangle wave that is combined with the positive portion of the corrective signal emitted from the negative trigger comparator 922 and the negative portion of the corrective signal emitted from the positive trigger comparator 923 by combinational logic 925. As a result, what is formed is a PWM corrective signal divided between positive and negative portions. The combinational logic 925 is configured to selectively couple a positive portion of the PWM corrective signal with a first controlled switch 932. The first controlled switch 932 is coupled to a negative DC power supply 952. The combinational logic 925 is also configured to selectively couple a negative portion of the PWM corrective signal with a second controlled switch 931. The second controlled switch is coupled to a positive DC power supply 952.

In operation, the switches 931 and 932 are selectively controlled by the PWM corrective signal depending on whether the PWM corrective signal is positive or negative. In some embodiments, a positive PWM corrective signal means that the distortion to be corrected in the power line 933 is negative, and vice versa. To correct a negative distortion in the power line 933, the second controlled switch 831 is enabled according to a negative portion of the PWM corrective signal. The second controlled switch, when enabled, couples sources from the positive DC power source 951 with the power line 933 according to the PWM corrective signal.

In the embodiment of FIG. 5, an embodiment is shown wherein the impedance of the utility power meter 901 (and the grid that is downstream) has a lower impedance than the load 940. As a result, if a positive distortion is attempted to be corrected by a negative PWM corrective signal, the current sunk from the power line 933 will be sunk from the grid rather than the load 940. As a result, the distortion will be amplified. To that end, a positive PWM corrective signal is used to correct a positive distortion and a negative PWM corrective signal is used to correct a negative distortion in applications where the impedance of the load 940 is greater than the impedance of the grid downstream from the power meter 901.

In some embodiments, it may be advantageous to filter the modulating signal. To that end, a filter 933 is included. Similarly, to correct a positive distortion in the power line 933, the first controlled switch 832 is enabled according to a negative portion of the PWM corrective signal. The first controlled switch, when enabled, sinks current to the negative DC power source 952 from the power line 933 according to the PWM corrective signal. As a result, distortion is substantially decreased from the current in the power line 933. Also, a second filter 934 may be advantageous to filter PWM noise from the power line 933. Each of the positive DC power source 951 and negative DC power source 952 comprise current limiting and sensing module 935 and 936 for communication any over current or under current conditions to the processor 910.

Figure 6:
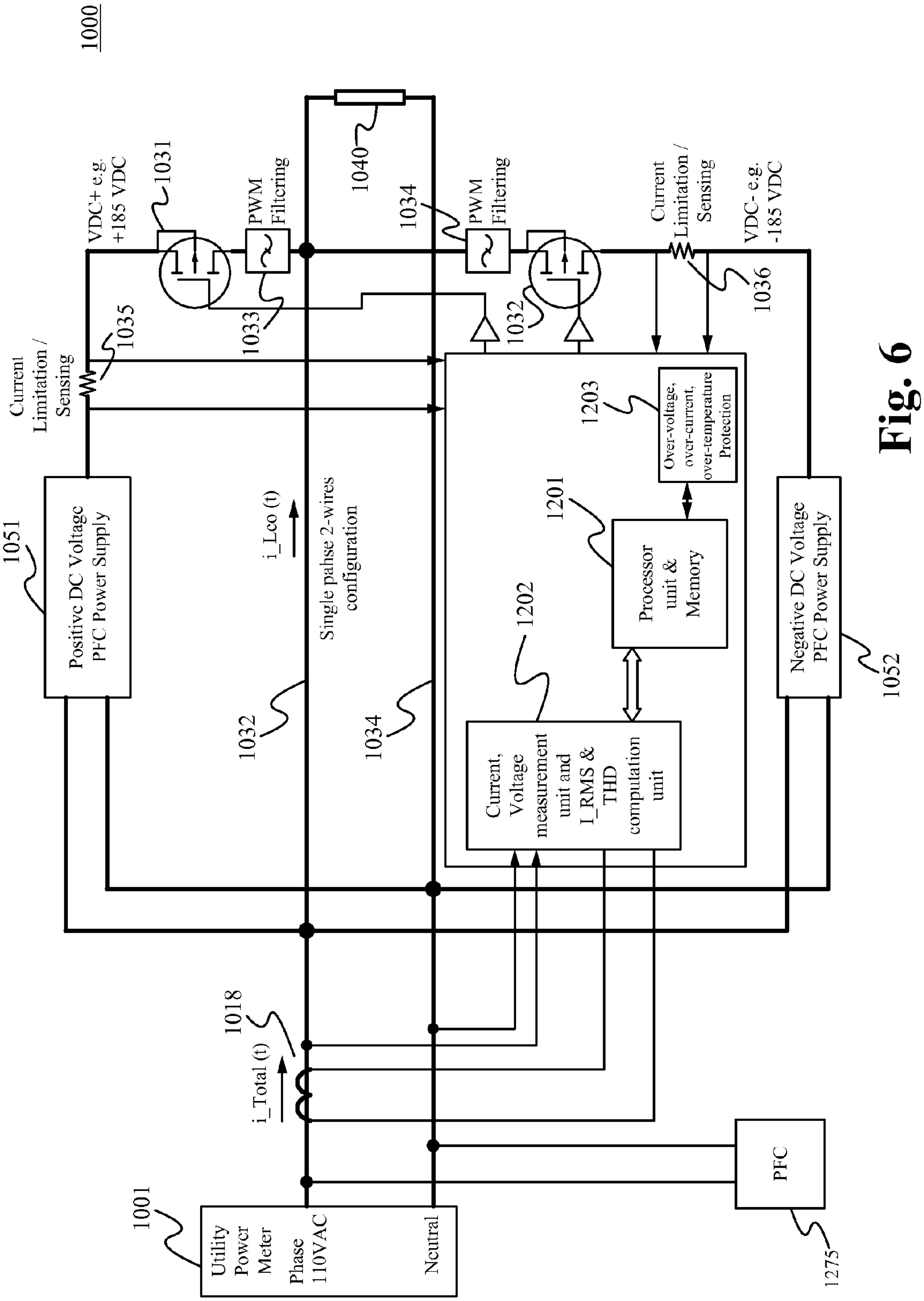
FIG. 6 is a schematic block diagram of a distortion reducing circuit having modulation per an embodiment of this invention.

FIG. 6 shows another embodiment of a distortion correction circuit 1000. Again, the circuit 1000 is coupled to a power line 1032 and a neutral 1034 in a two wire, one phase power system between a utility power meter 1001 and a load 1040. The load 1040 comprises all appliances and other electronic devices within a residence that appear as one load 1040 having reactive properties. In this embodiment, the current is measured by a processor unit 1200. A PFC 1275 is able to correct a power factor in the power line 1032 as described above. The processor unit 1200 comprises a current and voltage measurement module 1202. The module 1202 is also configured to do RMS and distortion computation. The module 1202 is able to be a digital processing module. In some embodiments, the module 1202 comprises one or more analog to digital converters for converting data, such as amplitude, phase, and distortion into digital bitstreams upon which mathematical operations may be done digitally. The processor 1200 is also able to have a memory module 1201. The memory module 1201 is able to store information relating to the dynamic harmonic correction, such as during what times of day correction is most active. The memory 1201 may be removed and inserted into a device such as a computer so that a user may make informed decisions regarding energy use. Alternatively, the processor 1200 comprises a communications module (not shown). The communications module may be connected to the internet through wires, such as by LAN cable, or wirelessly via a convenient standard such as IEEE 802.11 or BlueTooth. Furthermore, the communications module may communicate through cellular standards such as GSM or CDMA. A protection module 1203 integral to the processor 1200 is able to power down the circuit 1000 in any defined fault condition, such as over voltage, over current, and over temperature. Such fault conditions are able to be stored in the memory 1201.

The processor 1200 is able to compute the total current having distortion within the power line 1032 and generate a reference signal. A digital to analog converter is able to convert digital bitstreams representing a total current and a reference signal into analog waveforms. Similar to the embodiments of FIGS. 4 and 5, the total current signal may be subtracted from the reference signal by a substracter. Alternatively, the processor 1200 is able to digitally subtract the total current from the reference signal, thereby forming a digital corrective signal. The processor 1200 is also able to modulate the digital corrective signal by any convenient known or application specific means of modulation. The modulated corrective signal may then be selectively coupled with a first transistor 1031 or a second transistor 1030 depending on whether current must be sunk or sourced into the line 1032 to correct distortion in the total current. The first and second transistors 1031 and 1030 operate as switches, that when enabled by the modulated corrective signal, source or sink current to or from the line 1032 from a positive DC source 1051 or a negative DC source 1052. In some embodiments, it may be advantageous to include a first filter 1033 and a second filter 1034 to filter PWM noise from the first transistor 1031 and the second transistor 1030 respectively.

Figure 7:
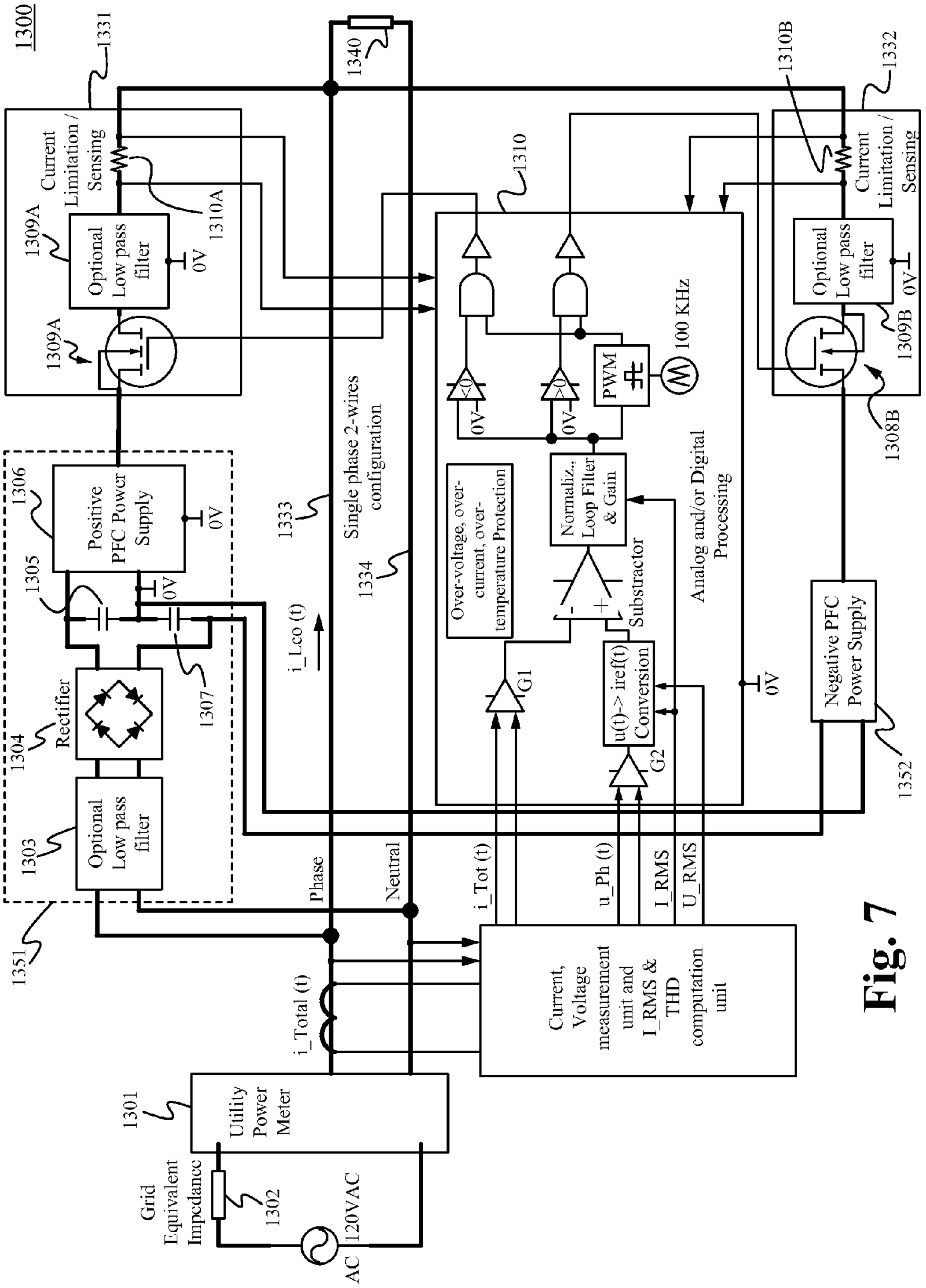
FIG. 7 is a schematic block diagram of a distortion reducing circuit having modulation and enhanced filtering per an embodiment of this invention.

FIG. 7 shows a further detailed embodiment of the invention of FIGS. 4, 5 and 6. The power factor and distortion correction module 1300 is coupled between a utility power meter 1302 and an equivalent property load 1340. The load 1340 is a representation of a dynamic load that changes as appliances within the residence as activated and deactivated. The positive DC power source 1351 comprises an optional low pass filter 1303 for filtering any noise and harmonics that may be present across the phase line 1333 and neutral 1334. AC power from the grid 1301 is rectified by a bridge rectifier 1304 and passed through a reservoir capacitor 1305. A PFC module 1306 is provided for correcting a less than ideal power factor. The PFC module 1306 is able to utilize any of the methods or apparatus described in FIGS. 1 and 2 and accompanying description. A first switching circuit 1331 comprises a first transistor 1308A coupled to the processing unit 1310. The processing unit 1310 drives the transistor 1308A by utilizing a modulated signal. The transistor 1308A couples current from the positive DC power source 1351 to the phase line 1333 in response to a corrective signal as described in the previous embodiments in FIGS. 5 and 6. An optional low pass filter 1309A is provided for filtering a modulating signal. A current limitation and sensor 1310A is able to communicate overcurrent conditions to the processor 1310. The sensor 1310A is represented by a resistor, but may be any useful sensing module for sensing an overcurrent condition. The positive DC power source is further coupled to a negative PFC module 1352 through an inverting power supply capacitor 1307. The inverting reservoir capacitor 1307 provides negative DC power proportional to the power supplied by the DC power source 1351. The negative PFC module 1352 is able to correct a power factor on the phase line 1333 according to the methods and apparatus described in FIGS. 1 and 2. The negative PFC module 1352 is coupled to a second switching circuit 1332. The second switching circuit 1332 comprises a second switching transistor 1308B also for receiving a modulated corrective signal from the processing unit 1310 as described in the embodiment of FIGS. 5 and 6. The processing unit 1310 comprises scaling multipliers G1 and G2. In this embodiment, G2 is coupled to a voltage to current converter. A substracter is able to compare one voltage signal to another to derive a corrective signal, as described in previous embodiments. A modulator is coupled to the output of the substracter for modulating the corrective signal. In this embodiment, PWM is shown. However, any known or application specific modulation scheme may be utilized. In some embodiments, a loop filter is coupled between the substracter and modulator for controlling the process and optimize system control such as dynamic behavior, stability, gain margin, phase margin, and the like. Furthermore, external processing may contribute to current measurement, voltage measurement, RMS and distortion computations and include memory such as RAM or ROM.

Figure 8:
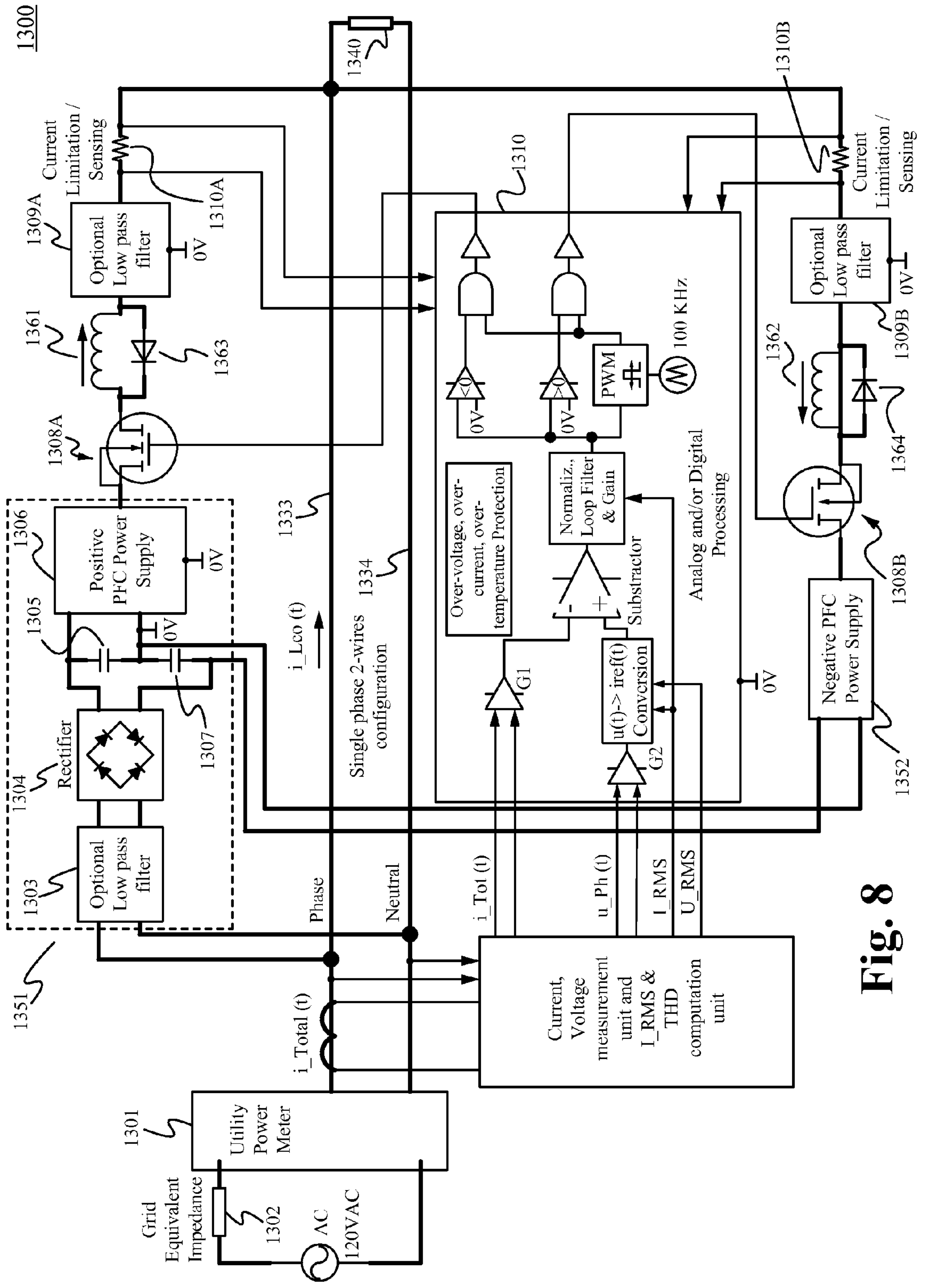
FIG. 8 is a schematic block diagram of a distortion reducing circuit having modulation and enhanced filtering per an embodiment of this invention.

FIG. 8 shows another embodiment wherein the source and sink current paths include an inductance 1360 and 1361 each to smooth and filter out the modulation that may generate spikes of voltages and currents. The first and second switching transistors 1308A and 1308B may charge the inductors 1360 and 1361 respectively in a quasi linear ramp up and when either the transistors 1308A and 1308B are disabled, and let the current charge decrease to zero in a quasi linear fashion. A free wheel diode 1363 is needed to avoid for the current to shut off rapidly to avoid destructive high voltage spikes due to the inductance. A second freewheel diode 1364 is coupled in parallel to the second inductor 1362. The current waveform formed is similar to seesaw shape and allows for simpler filters 1309A and 1309B. In some embodiments, the inductors 1361 and 1362 are integrated into the filters 1309A and 1309B. Advantageously, losses in the paths sinking and sourcing current are diminished. In some embodiments, capacitors may be included in parallel to recycle any lost energy by the free wheel diodes 1363 and 1364. In the embodiment of FIG. 8, the inductors 1361 and 1362 are coupled between the switching transistors 1308A and 1308B and the low pass filters 1309A and 1309B respectively.

Figure 9:
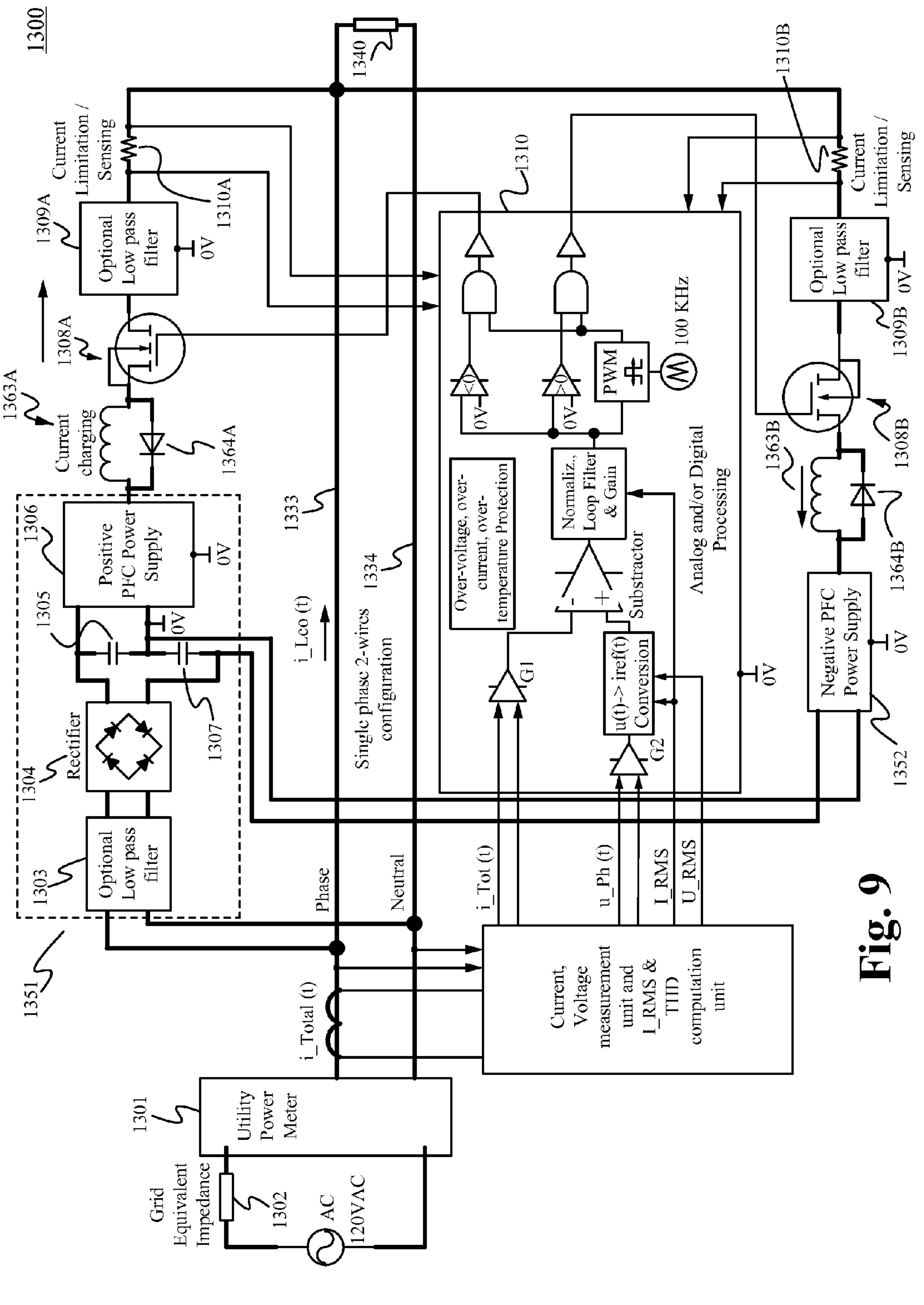
FIG. 9 is an alternate schematic block diagram of a distortion reducing circuit having modulation and enhanced filtering per an embodiment of this invention.

In some applications, it may be advantageous to couple the inductors 1361 and 1362 between the PFC modules 1351 and 1352 and the transistors 1308A and 1308B so that the inductance are not directly coupled with the load 1340, and the impedance measured from the grid 1301 is improved. FIG. 9 shows such an implementation. FIG. 9 shows a first current charging inductor 1363A coupled between the positive PFC module 1351 and the first transistor 1308A. Also, there is provided a second charging inductor 1363B coupled between a negative PFC module 1362 and the second transistor 1308B. Advantageously, when measured with from the grid equivalent impedance 1302, the first and second charging inductors 1363A and 1363B do not form additive inductance or reactance to the equivalent property load 1340, thereby easing any power factor correction requirements. Similarly to FIG. 8, the first and second charging inductors 1363A and 1363B each have coupled in parallel thereto a freewheel diode 1364A and 1364B. As discussed above, a flywheel diode is a diode that protects a transistor, switch, relay contact etc. when switching DC powered inductive loads (relays, motors etc) is called a flywheel (or flyback) diode. A flywheel diode is often desirable because there are instances when the current through an inductive load is suddenly broken. In such instances, a back electro motive force (EMF) will build up as the magnetic field breaks down, and if there is no path for the current, a high voltage builds up. The high voltage can damage a transistor or cause arcing across the transistor. The flywheel diode is connected in reverse across the inductive load, and provides a path for the current so the magnetic field and current can safely decline.

Figure 10:
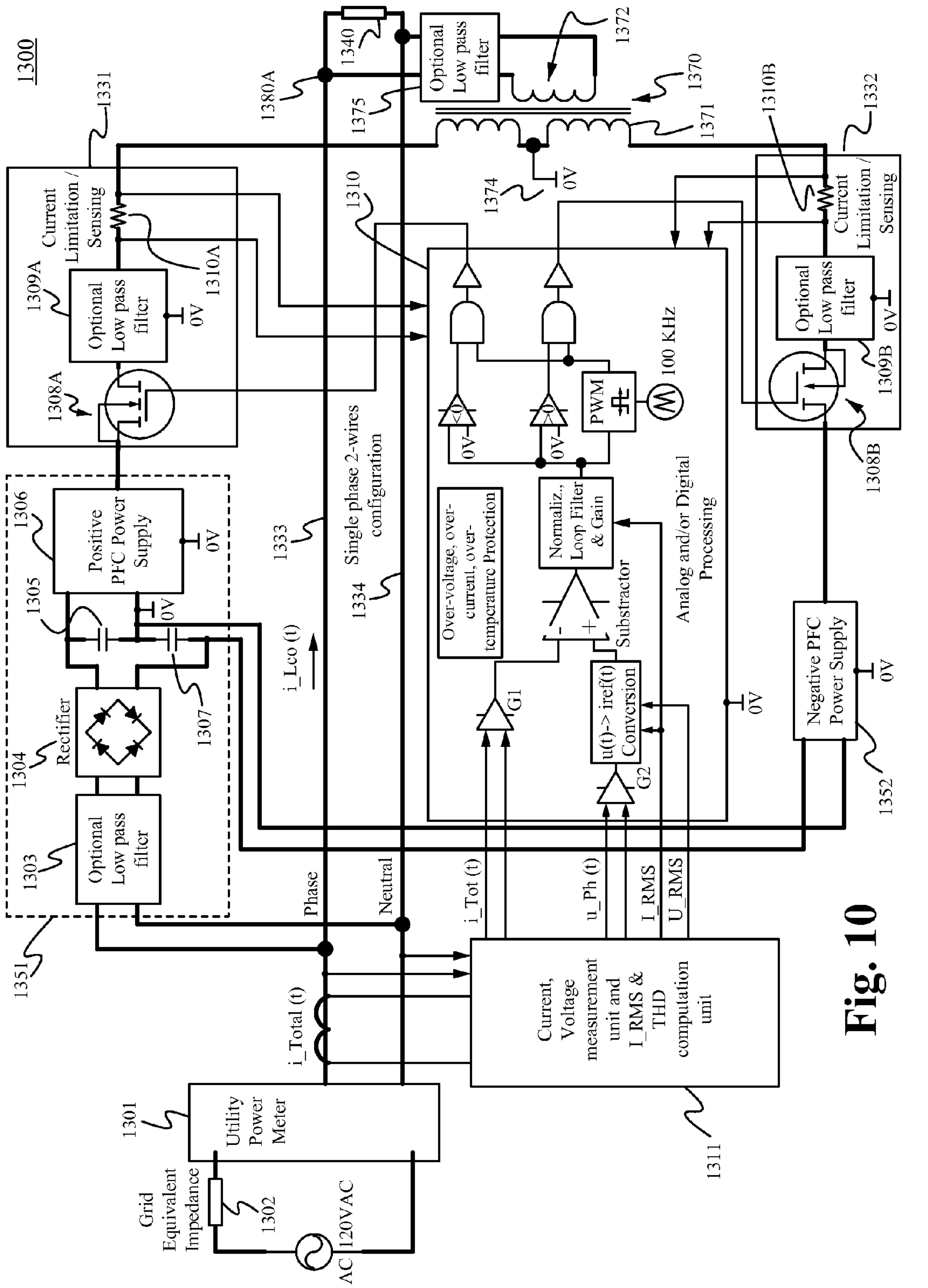
FIG. 10 is a schematic block diagram of a distortion reducing circuit having modulation and enhanced filtering and galvanic isolation per an embodiment of this invention.

FIG. 10 shows yet another alternate embodiment of a circuit for distortion correction in a power line. It is desirable, and in some places required, to galvanically isolate electronics from a power supply line. Galvanic isolation is the principle of isolating functional sections of electrical systems preventing the direct conduction of electric current from one section to another. Energy and/or information can still be exchanged between the sections by other means, e.g. capacitance, induction, electromagnetic waves, optical, acoustic, or mechanical means. Galvanic isolation is used in situations where two or more electric circuits or two section of one system must communicate or transfer energy, but their grounds may be at different potentials, or one section is more susceptible to current spikes than another section, or any host of protection reasons. It is an effective method of breaking ground loops by preventing unwanted current from traveling between two units sharing a ground conductor. Galvanic isolation is also used for safety considerations, preventing accidental current from reaching the ground (the building floor) through a person's body.

FIG. 10 shows a harmonic distortion correction system 1300 wherein the electronics are galvanically isolated on the output side from the equivalent property load 1340. In FIG. 10, the output of the first switching transistor 1308A and second transistor 1308B are coupled to the first winding 1371 of a transformer 1370. Preferably, the transformer 1370 is a high frequency, high power transformer. The secondary 1372 of the transformer 1370 is coupled to the equivalent property load 1340 in parallel. Optionally, a low pass filter 1375 can be disposed between the secondary 1372 and the equivalent property load 1340 for filtering out any artifacts remaining from switching. When the circuit 1300 is correcting a negative harmonic, meaning that current is being sourced into the equivalent property load 1340, current is sourced from the center tap 1374 (coupled to ground) according to the switching signal provided by the processing unit 1310 to the transistor 1308A. Accordingly, the voltage generated across the primary 1371 is reflected to the secondary 1372 and a corresponding current is sourced into the equivalent property load 1340. Similarly, when a positive harmonic is to be corrected, meaning current is to be sunk from the equivalent property load 1340, a switching signal is provided the transistor 1308B from the processing unit 1310. A negative voltage is formed across the primary 1371 which reflects to the secondary 1372. Advantageously, none of the electronics such as the processing unit 1310, the current and voltage measurement module and processor and memory 1305, PFC modules 1351 and 1352, are directly coupled with the equivalent property load 1340. Optionally, a full galvanic isolation for the system 1300 can be achieved by inserting an isolation transformer between the optional low pass filter 1303 and the rectifier 1304, and adding a transformer for the phase voltage measurement feeding the computation unit 1311. However, as can be appreciated, in sourced or sunk current will follow the path of least resistance. As a result, current sourced to the equivalent property load 1340 or sunk from the equivalent property load to correct a negative or positive harmonic respectively will not necessarily be applied to the equivalent property load. The nodes 1380A and 1380B form current dividers between the equivalent property load and the grid equivalent impedance 1302. Generally, the grid equivalent impedance can be quite low, on the order of the equivalent property load 1340 or even lower. It follows naturally that current sourced to the equivalent property load 1340 will instead be sourced to the grid equivalent impedance 1302, and back to the power grid in general. Similarly, current that was intended to be sunk from the equivalent property load 1340 will instead be drawn from the grid equivalent impedance 1302. What will result is incomplete correction of harmonic distortion in the power line.

Figure 11:
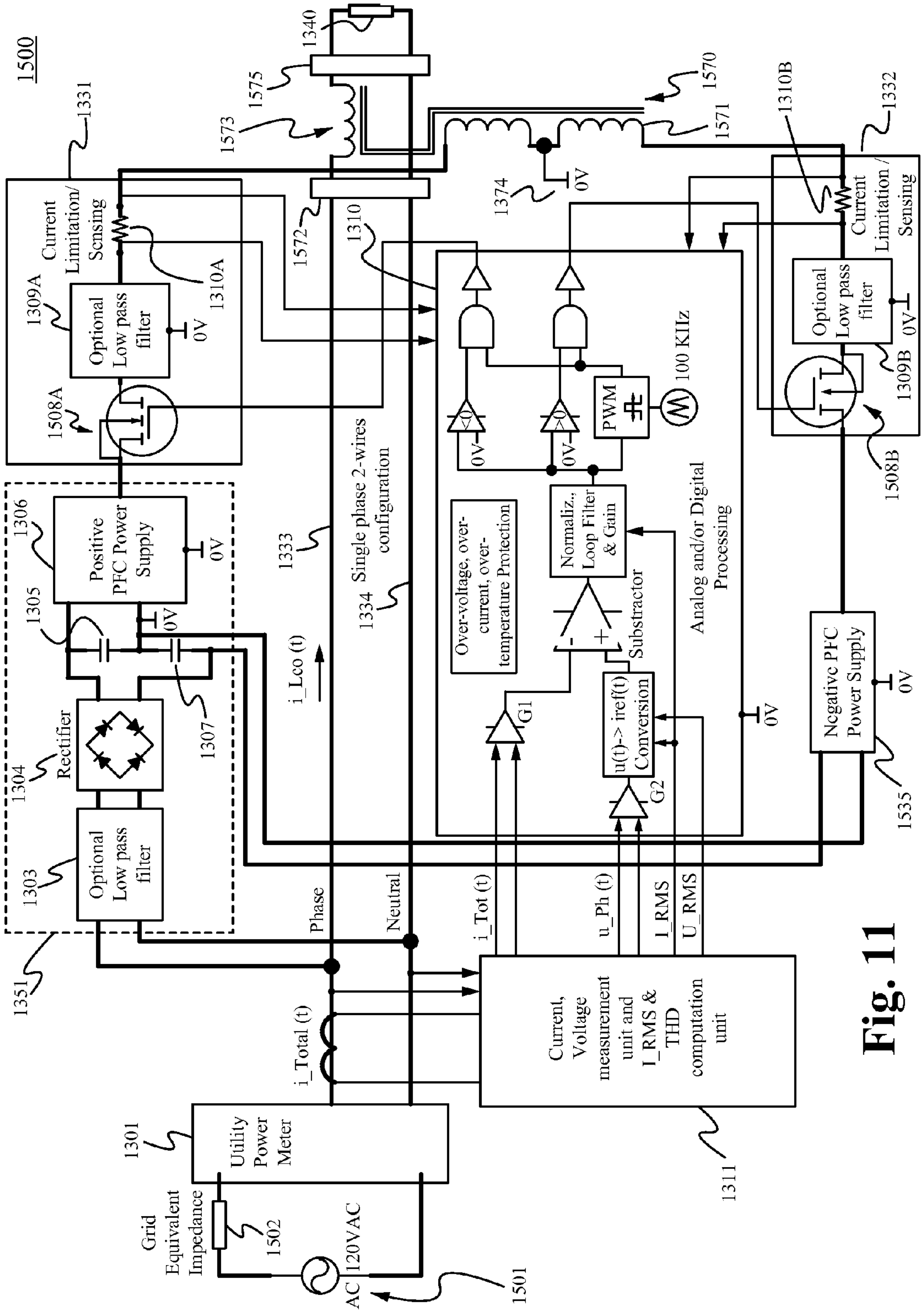
FIG. 11 is a schematic block diagram of a distortion reducing circuit having modulation and enhanced filtering and galvanic isolation coupled in series with a load, per an embodiment of this invention.

To that end, FIG. 11 shows a total harmonic distortion correction system 1500 wherein the current is selectively sunk or sourced to the equivalent property load 1540 in a series configuration, thereby eliminating the current divider that was formed at nodes 1380A and 1380B of FIG. 10. As in FIG. 10, the outputs of the transistors 1508A and 1508B are coupled to the primary of a transformer 1570 having a center tap 1574 to ground. However, in the configuration of FIG. 11, the secondary 1573 is coupled in series with the equivalent property load 1540. Optional low pass filters 1572 and 1575 are coupled between the secondary 1573 and the grid equivalent resistance 1502, and the secondary and the equivalent property load 1540 respectively for filtering out any artifacts of switching or any other high frequency artifacts from the grid 1501. In this exemplary implementation, to correct a positive harmonic, the processing unit sends PWM signal to the transistor 1508B coupled to the negative PFC module 1535. When a corresponding voltage signal is formed across the primary 1571, it is reflected to the secondary 1573. Since the secondary 1573 is in series with the equivalent property load 1540, there is nowhere for the current to be sunk from than the equivalent property load 1540 because there is no current divider to offer a path of less resistance. Similarly, when a negative harmonic is to be corrected, meaning current is to be sourced into the equivalent property load 1540, current has only one direction in which to flow. What results is a more complete harmonic correction.

Figure 12A:
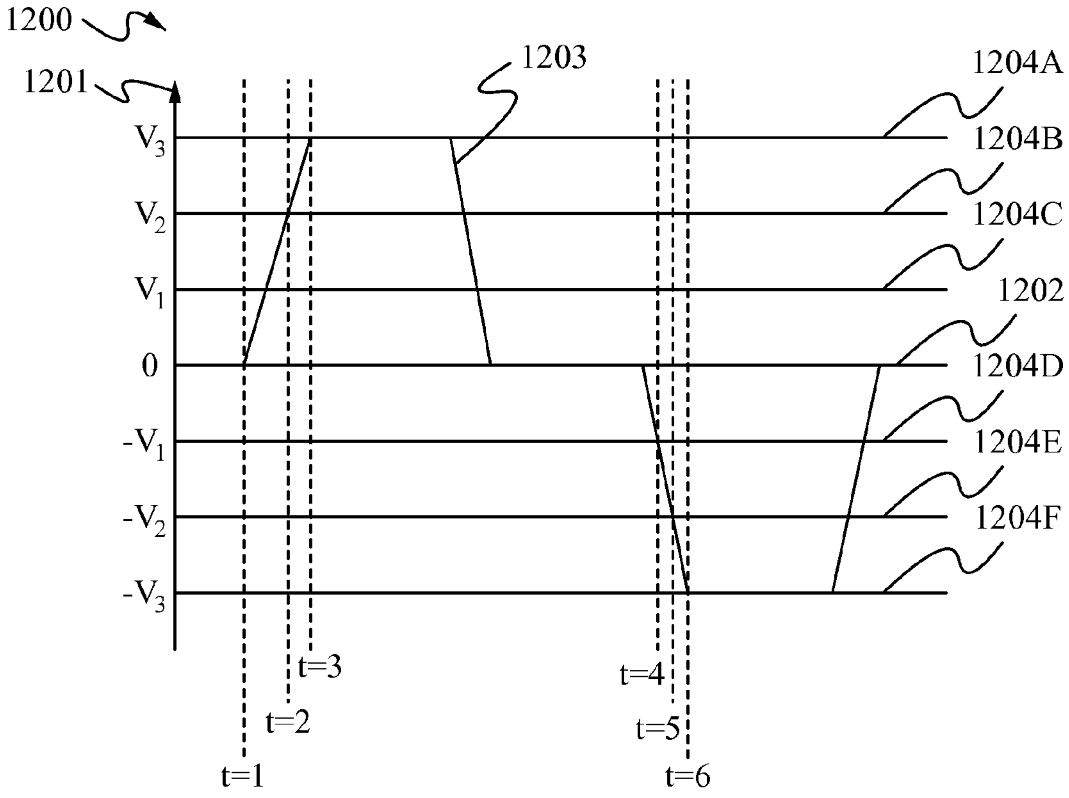
FIG. 12A is an example of a Class G power supply waveform.

In some applications, the EMI resulting from the switching outputs (such as the transistors 1508A and 1508B) is undesirable or not acceptable. To that end, the positive and negative power supplies that provide sinking and sourcing current can be modulated or otherwise more carefully manipulated to obviate a need for modulation. To that end, Class G and Class H power supplies can be incorporated into the systems described in FIGS. 6-11. Class G power supplies use "rail switching" to decrease power consumption and increase efficiency. There are a plurality of power rails available, and a different rail is used depending upon the instantaneous power consumption requirement. As a result, there is less area between the signal to be drive and the power rail. Thus, the amplifier increases efficiency by reducing the wasted power at the output transistors. Class G power supplies are more efficient than class AB but less efficient when compared to a switching solution, without the negative EMI effects of switching. FIG. 12A shows an output graph 1200 with a voltage axis 1201 and a time axis 1202, representing a modulated signal 1203 and multiple voltage rails 1204A-1204F. From a time t=0 to t=1, the amplitude of the modulated signal 1203 is less than V1. As a result, a Class G power supply synchs to voltage rail V1 1204C. When the switching transistor is being turned on thus causing the rising slope seen starting near t=1, the driver (for example, current sources 831 and 832 of FIG. 4) dissipates power as heat and thereby loses efficiency. Since the rail V1 1204C is of a low magnitude compared with the amplitude of the modulated signal 1203 at the time t=1, the overall inefficiency is greatly reduced. As the amplitude of the modulated signal 1203 increases between time t=1 and t=2, a greater magnitude voltage rail is required to drive the modulated signal. To that end, the rail V2 1204B is switched to. Similarly, V3 1204A is used after time t=3 since the amplitude of the modulated signal 1203 has increased again. Similarly, in a negative cycle, negative rails 1204D-1204F are switched to in sequence as the negative amplitude of the modulated signal 1203 increases from time t=4 to t=6.

Figure 12B:
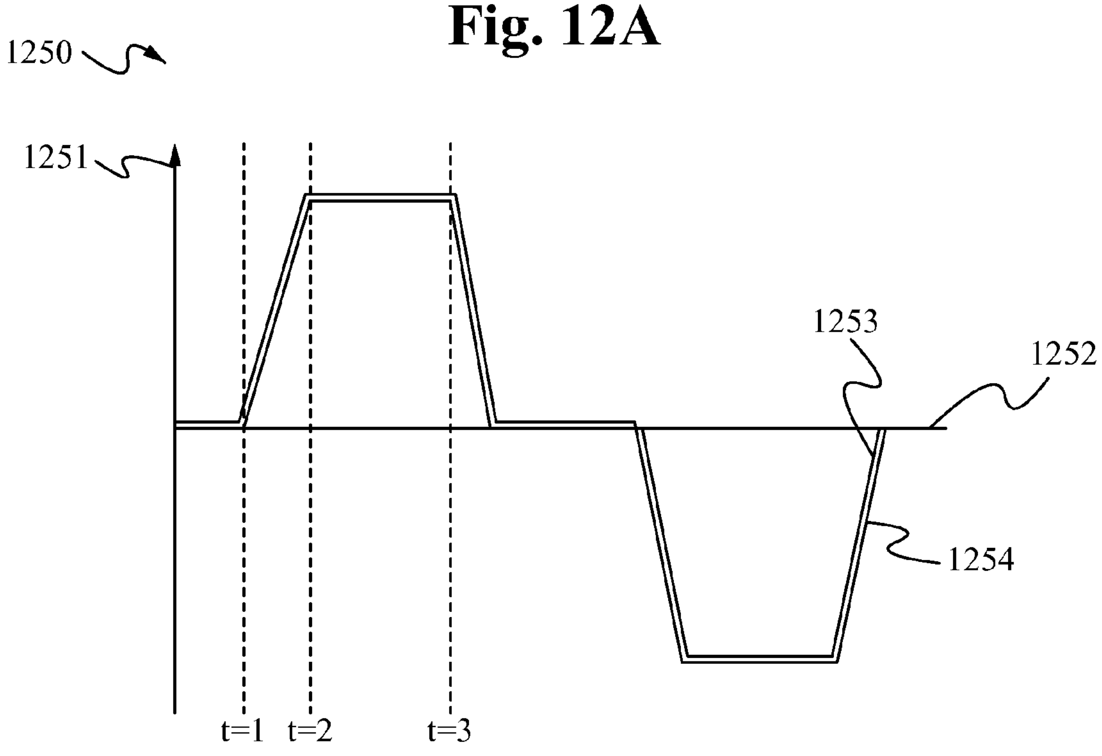
FIG. 12B is an example of a Class H power supply waveform.

FIG. 12B shows the output 1250 of a Class H power supply. Class H amplifiers modulate the power supply rail like in the case of a Class G power supply, but go one step further by continuously modulating a supply rail to form an infinitely variable supply rail. This is done by modulating the supply rails so that the rails are only relatively slightly larger in absolute magnitude than the output signal at any given time.

As a result, the output stage operates at its maximum efficiency all the time. The graph 1250 has a voltage axis 1251 and a time axis 1252. For simplicity, the same modulated signal 1253 as shown in FIG. 12A is used. In a Class H amplifier, the power supply rail voltage 1254 closely traces the modulated signal 1253. Therefore, the delta between the modulated signal 1253 and the rail voltage 1254 is continuously minimized. As a result, the driving devices (for example, current sources 831 and 832 of FIG. 4) are efficiently driven.

Figure 12C:
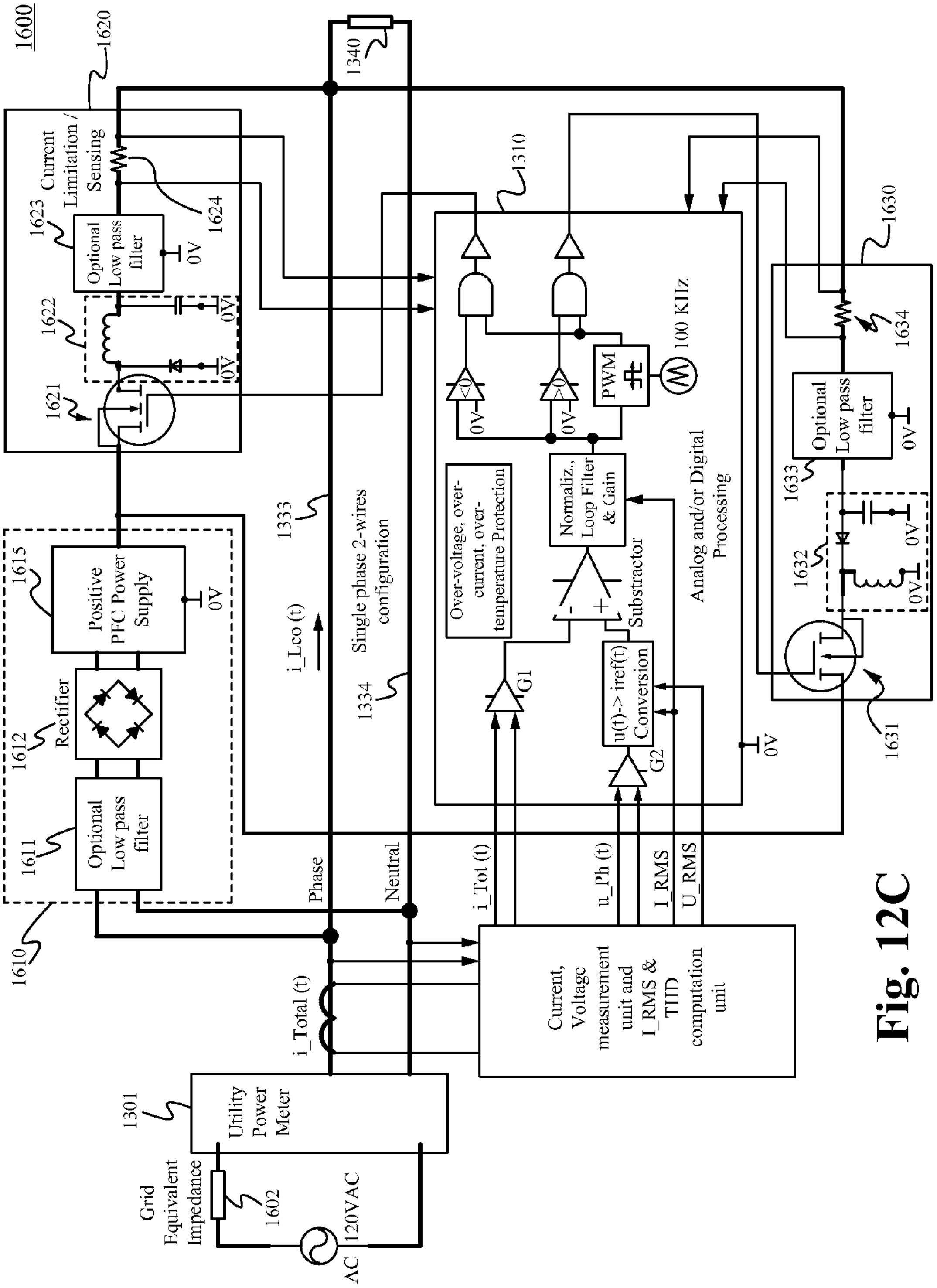
FIG. 12C is a schematic block diagram of a distortion reducing circuit having Class H power supplies.

FIG. 12C shows an implementation of a Class H power supply in a harmonic distortion reduction system 1600. The Class H power supply comprises a rectifier 1610 that provides DC voltage to a positive switching power supply 1620 and a negative switching power supply 1630. The rectifier 1610 is electrically coupled to the phase 1603 and neutral 1604 lines and receives an AC power source therefrom. An optional low pass filter 1611 can filter out any unwanted noise or artifacts in the AC power. A rectifier 1612 rectifies the filtered AC power into DC power. Any known, convenient or application specific rectification circuit will suffice such as a bridge rectifier. In some embodiments, a PFC module 1615 is provided to bring the power factor of the power provided to substantially one. By way of example, a power factor correction circuit as described in FIGS. 1 and 2 and corresponding text can be used. The positive switching supply 1610 comprises a switching transistor 1611. The switching transistor 1611 receives a control signal from a processing unit 1650 that operates as described in FIGS. 6-11 to form a corrective signal by subtracting a sample of the phase line 1603 from a reference signal. According to the control signal, the switching transistor 1611 forms a PWM signal which passes through an LC-Flywheel network 1622 which takes a positive average of the PWM signal. Any artifacts or noise are filtered by an optional low pass filter 1623. An overcurrent sensor 1624 is provided for controlling or limiting current surge situations. Similarly, the negative switching supply 1630 comprises a switching transistor 1631. Again, the switching transistor 1631 receives a control signal from a processing unit 1650. In the case of the negative switching power supply 1630 the processing unit 1650 only sends a control signal if there is a positive harmonic to be corrected, as explained in the several drawings and corresponding text above. According to the control signal, the switching transistor 1631 forms a PWM signal which passes through another LC-Flywheel network 1632 which takes a negative average of the PWM signal. Any artifacts or noise are filtered by an optional low pass filter 1633. An overcurrent sensor 1634 is provided for controlling or limiting current surge situations.

Figure 12D:
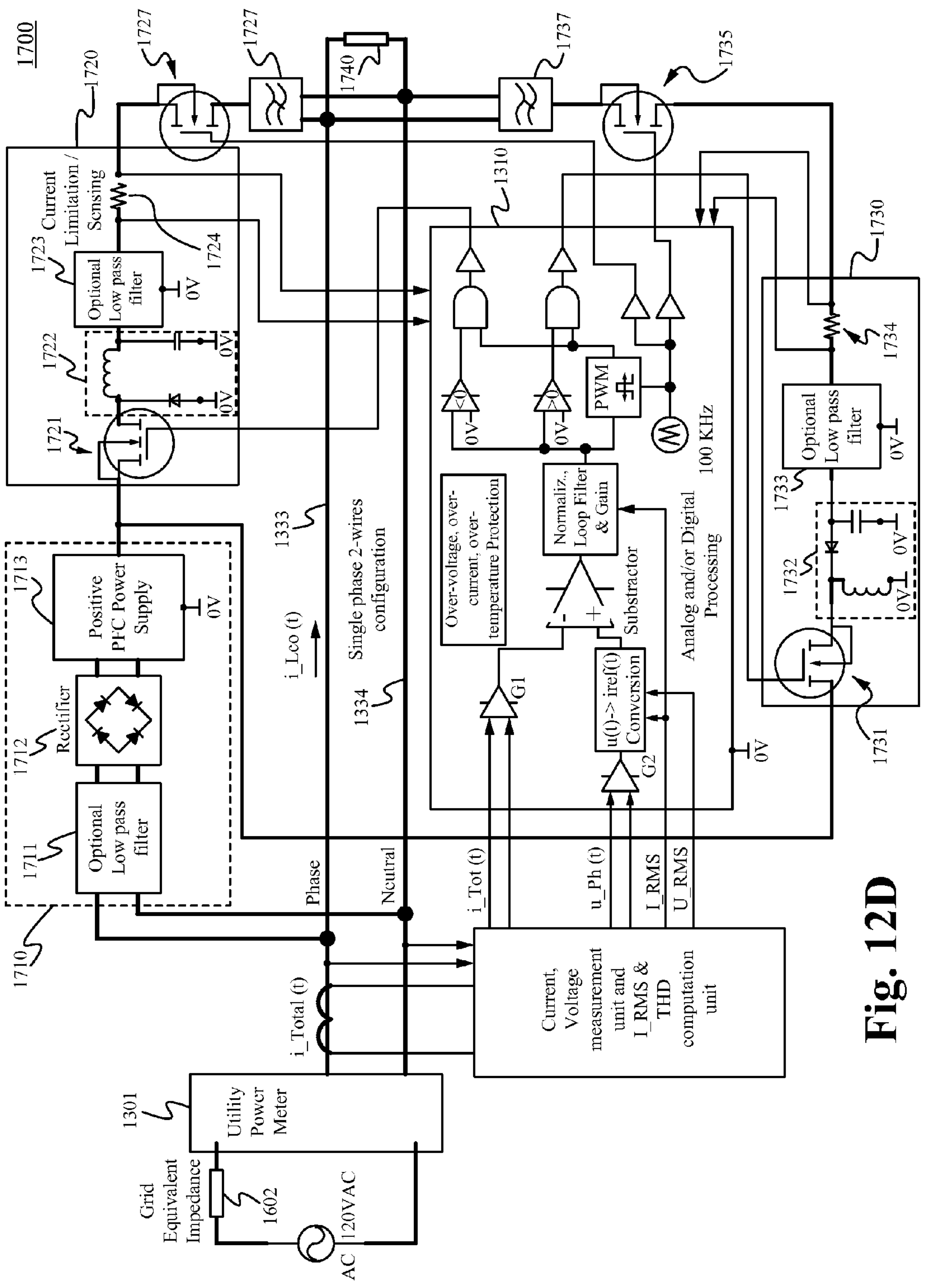
FIG. 12D is an enhanced schematic block diagram of a distortion reducing circuit having Class H power supplies.

FIG. 12D shows another embodiment of a harmonic distortion reduction system 1700 having a class H power supply. Similarly to the embodiment of FIG. 16, the rectifier 1710 is electrically coupled to the phase 1703 and neutral 1704 lines and receives an AC power source therefrom. A low pass filter 1711 is provided to filter out any unwanted artifacts in the AC power. A bridge rectifier 1712 rectifies the filtered AC power into DC power. Although a bridge rectifier is mentioned, any known, convenient or application specific rectification circuit will suffice such as a bridge rectifier. In some embodiments, a PFC module 1715 is provided to bring the power factor of the power provided to substantially one. By way of example, a power factor correction circuit as described in FIGS. 1 and 2 and corresponding text can be used. The positive switching supply 1710 comprises a switching transistor 1721. The switching transistor 1721 receives a control signal from a processing unit 1750 that operates as described in FIGS. 6-11 to form a corrective signal by subtracting a sample of the phase line 1703 from a reference signal. According to the control signal, the switching transistor 1721 forms a PWM signal which passes through an LC-Flywheel network 1722 which takes a positive average of the PWM signal. Any artifacts or noise are filtered by an optional low pass filter 1723. An overcurrent sensor 1724 is provided for controlling or limiting current surge situations. The modulated positive power provided by the positive switching power supply 1710 feeds a second positive switching transistor 1725. The second positive switching transistor 1725 is also controlled by the processing unit 1750. Advantageously, the modulated power provided by the positive switching power supply 1710 closely tracks the PWM signal received by the second positive switching transistor 1725. As a result, very little headroom exists between the power supply and the power demand, as demonstrated in the output graph of FIG. 12B. The negative switching transistor 1731 also receives a control signal from a processing unit 1750. The negative switching transistor 1731 is only activated by the processing unit 1750 when a positive harmonic is detected, meaning current must be sunk from the equivalent property load 1740. According to the control signal, the negative switching transistor 1731 forms a PWM signal which passes through an LC-Flywheel network 1732, thereby forming a negative average of the PWM signal. An optional low pass filter 1723 filters any artifacts or noise. An overcurrent sensor 1734 is provided for controlling or limiting current surge situations. The modulated positive power provided by the negative switching power supply 1730 feeds a second negative switching transistor 1735. The second negative switching transistor 1735 is also controlled by the processing unit 1750. Advantageously, the modulated power provided by the negative switching power supply 1720 closely tracks the PWM signal received by the second positive switching transistor 1725. As a result, very little headroom exists between the power supply and the power demand, as demonstrated in the output graph of FIG. 12B.

Figure 13A:
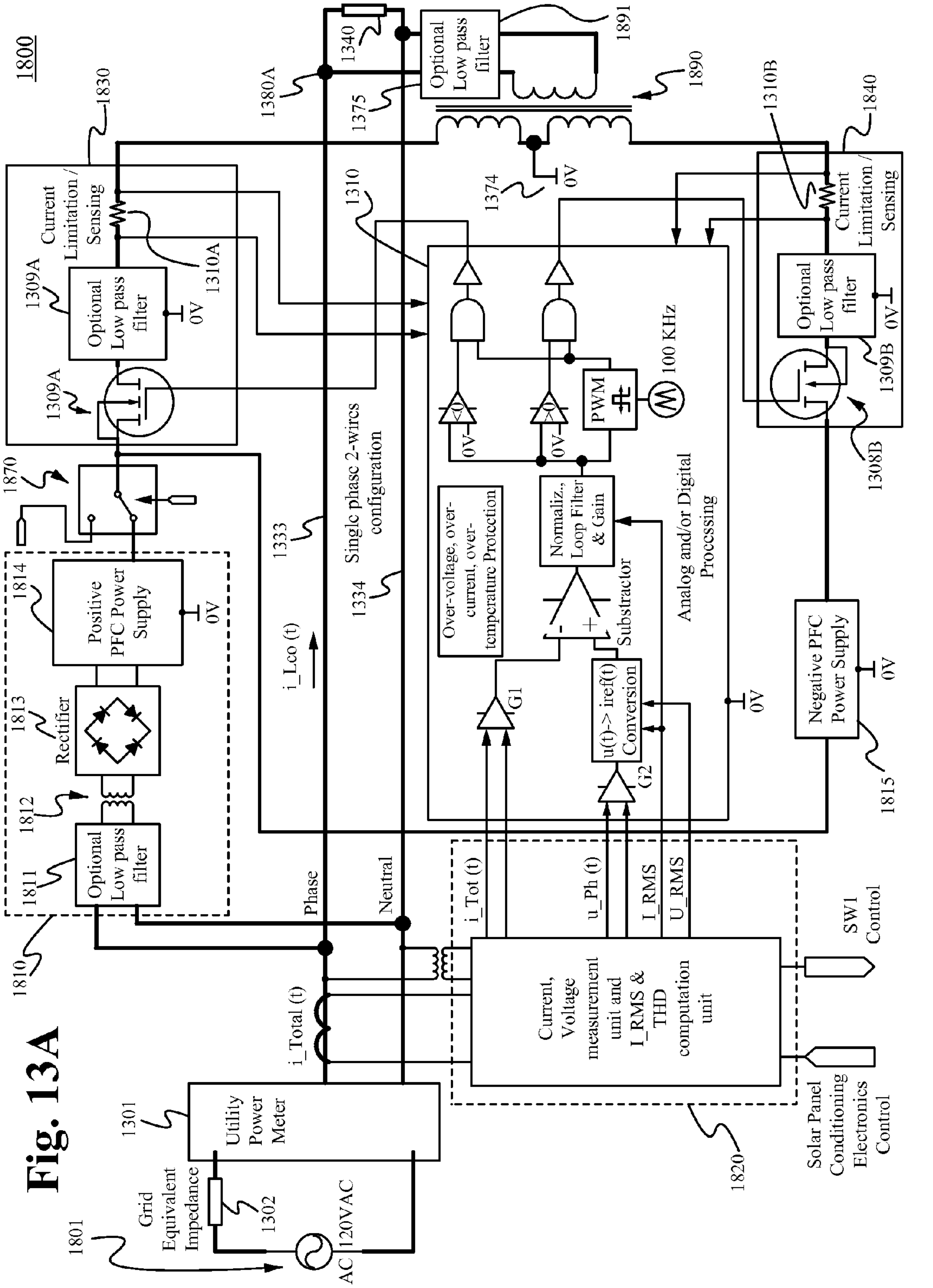
FIG. 13A is a schematic block diagram of a distortion reducing circuit having a solar power system.
Figure 13B:
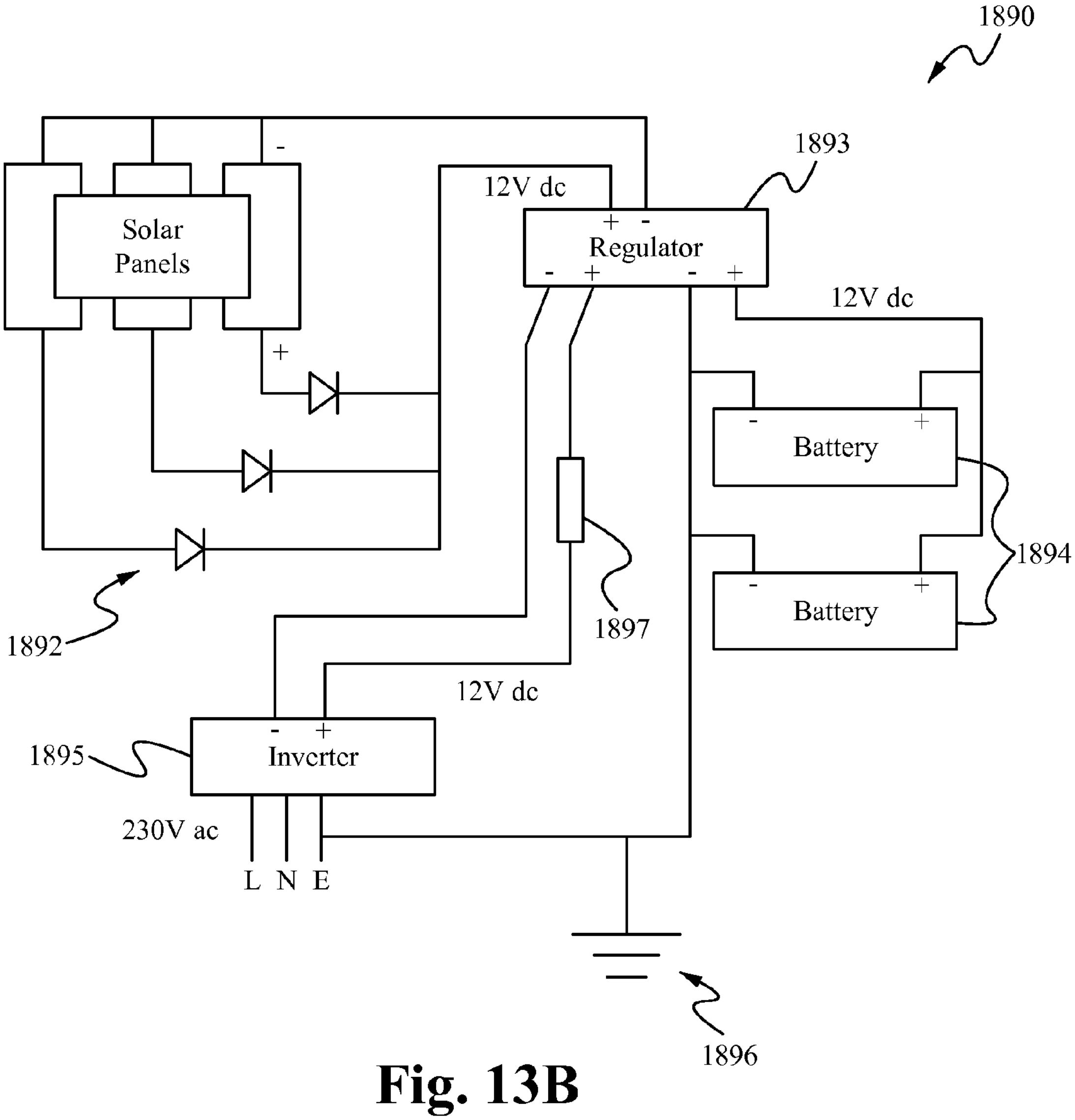
FIG. 13B is a schematic block diagram of a prior art solar power system.

FIG. 13A shows another implementation of a harmonic distortion reduction system 1800 incorporating a solar power system (not shown) through a selector 1870. Before discussing the advantages and values of the system shown in FIG. 13A, it is useful to understand a prior art solar power delivery system. FIG. 13B shows a standard prior art solar power delivery system 1890. Solar panels 1891 are mounted such that they receive the greatest sunlight. The solar panels 1891 are electrically coupled to a regulator 1893 via diodes 1892 that protect the solar panels 1891 from reverse current. The regulator 1892 divides the available current from the solar panels 1891 while maintaining a 12VDC (or any other desired voltage) to batteries 1894 and an inverter 1895. The batteries 1894 act as a buffer to keep current flowing to the inverter 1895 if the solar panels 1891 were to quit generating current because of lack of sunlight. Because the solar panels 1891 generate only DC current, the inverter must also convert the DC current into AC current so the power is compatible with a residential equivalent load. The inverter is coupled to the Line (or Phase) and Neutral lines such as 1603 and 1604 of FIG. 12C. The inverter 1895 is also protected by a fuse 1897 coupled between the inverter 1895 and regulator 1893. All of the regulator 1893, inverter 1895 and batteries 1894 are also coupled to ground through an earth spike 1896, which is generally a long metal rod which is inserted into the ground below the residence that the system 1890 is mounted on. However, DC-AC inverters are well known to be inefficient. The most efficient designs reach approximately 85% efficiency, meaning that 15% of the energy generated by the solar panels 1891 is wasted to heat or mechanical vibration.

Figure 13C:
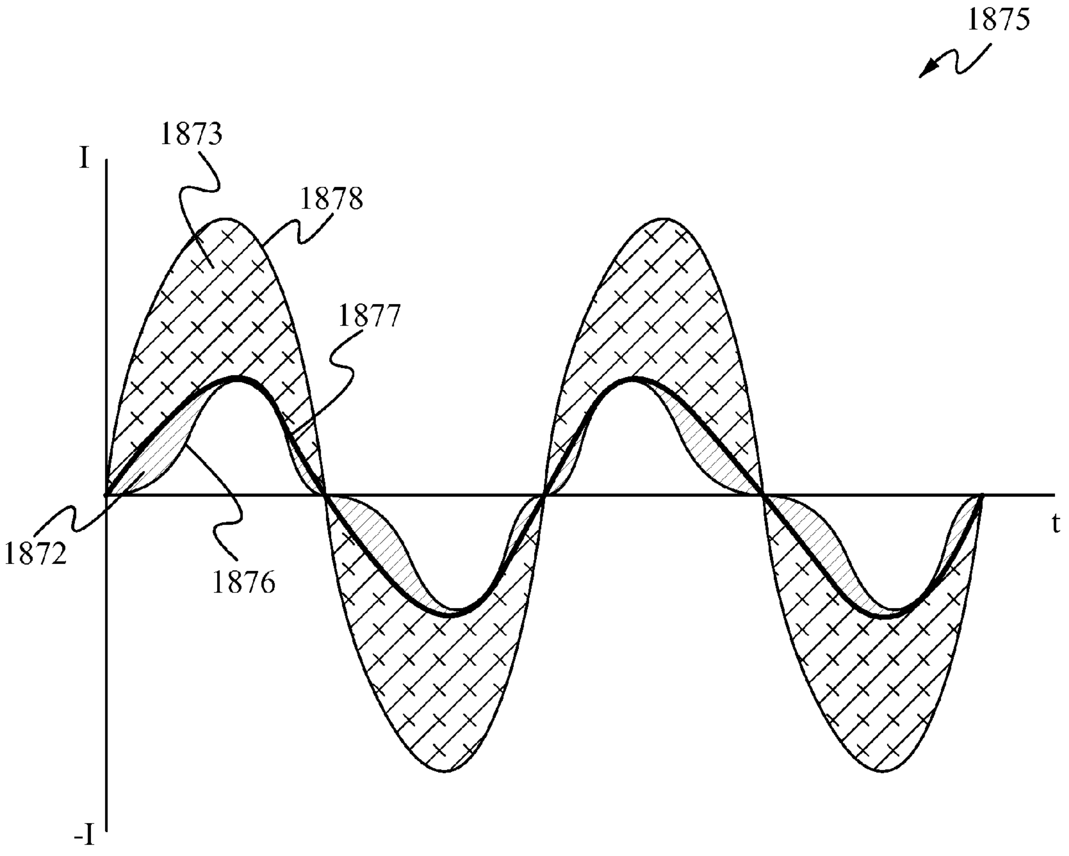
FIG. 13C is a graphical representation of current generated by a solar power system injected into a property load or AC power grid.

To that end, FIG. 13A shows a harmonic distortion reduction system 1800 having the ability to inject solar power either into an equivalent property load 1850 or back into the power grid 1801 without the use of an inefficient and cumbersome inverter. The harmonic distortion reduction system 1800 comprises a DC power source 1810. The DC power source 1810 is coupled to the phase 1803 and neutral 1804 lines to receive AC power therefrom. An optional low pass filter 1811 filters out any harmonics or artifacts in the phase line 1803. Preferably, an isolation transformer 1812 is provided to galvanically isolate the phase and neutral lines 1803 and 1804 from the solar power system (described later). Then, a bridge rectifier 1813 converter rectifies the AC power to DC power. Although a bridge rectifier 1813 is shown, any rectification circuit or means can be used. Optionally, a PFC modules 1814 and 1815 can correct current distortion in the power supplies 1814 and 1815 and bring the current harmonic distortion to substantially zero. The DC power source 1810 is coupled to a switch 1870. The switch 1870 selectively couples either the DC power source 1810 or a solar power system (not shown) as an external DC power source. The switch 1870 is controlled by the measurement, processing and memory unit 1820. The unit 1820 can be programmed to automatically switch between the DC power source 1810 and the solar power system based upon the time of day and pre-programmed sunrise and sunset schedules. Alternatively, the unit 1820 can instruct a switch to either the DC power source 1810 or the solar power system depending upon the instantaneous current generation capability of the solar power system. If the solar power system is generating sufficient power to correct harmonic errors measured, then the solar power system can be switched into the system 1800. Any excess power provided by the solar power system can be used by the equivalent property load 1850 The switch 1870 is coupled to a positive switching circuit 1830 and a negative power supply 1815 which inverts the positive DC power supplied by the either the DC power source 1810 or the solar power system. A negative switching circuit 1840 modulates the negative DC power provided by the negative power supply 1815. The positive switching circuit 1830 and the negative switching circuit 1840 are controlled by the processing unit 1825 as described in the several embodiments above; a positive PWM signal is generated to correct a negative harmonic error, and vice versa. Preferably, galvanic isolation is provided by a high frequency transformer 1880. The high frequency transformer isolates the equivalent property load 1850 and the grid 1801 from any potential spikes in current caused by the solar power system. In fact, such isolation can be required by regulation in solar power systems. An optional low pass filter 1881 is provided to filter out any artifacts or noise. Advantageously, the solar power system 1890 as shown in FIG. 13B, leaving aside the inverter 1895, can be implemented with the harmonic distortion reduction system 1800 with extremely high efficiency. Furthermore, the secondary 1882 HF transformer 1880 is shown coupled in parallel with the equivalent property load 1850. The person of ordinary skill having the benefit of this disclosure One advantage of the system described in FIG. 13A is shown graphically in FIG. 13C. FIG. 13C shows a graph 1875 having a current axis I and a time axis t. A first output curve 1876 represents a current waveform that is heavily distorted. Through the means and methods described in the several drawings and corresponding text, it has been shown that the harmonic distortion 1872, represented by the single hatched area, can be corrected by selectively sinking and sourcing current to correct positive and negative harmonic errors respectively. What is formed is a corrected current waveform 1877. However, with the implementation of the system 1800 of FIG. 13C, it becomes possible to inject additional energy from a solar power system. As a result, new current waveform 1878 is formed by the additional injected current 1873 represented by the double cross hatched area. As discussed above, PWM modulation is a highly efficient method of controlling the current sources, such as transistors 1308A and 1308B of FIG. 8. In operation, DC current generated by the solar power system is converted into AC power used by an equivalent property load without losses due to an inverter found in prior art solar power systems.

FIG. 13A is a preferred implementation for solar self generation and harmonic correction distortion for a 2-wire or 3-wire 1 phase power network configuration. In other embodiments, the solar self generation and harmonic correction distortion can be implemented for cases of 3-wire or 4-wire split phase power network configuration (phase, split phase, neutral and optionally earth). In such cases, the transformer 1890 is replaced by a transformer with same dual windings at the input and output. Input configuration is same as FIG. 13A. The 2 output windings are connected at middle point to the neutral while each other access of the windings connected to the phase and resp. the split phase. Two optional low pass filters similar to 1891 can be used to filter out the PWM modulation on the wire attached to phase and to the one attached to split-phase.

Still alternatively, a preferred configuration for solar self generation and harmonic correction distortion for a 4-wire or 5-wire tri phase power network configuration (3 phases, neutral and optionally earth). In this case the transformer 1890 is replaced by a transformer with same dual windings at the input but 3 windings at the output. Input configuration is same as FIG. 13A. Configuration of the output windings can be delta or star configuration. In a start configuration the common node is connected at middle point to the neutral while each other access of the windings connected to each of the 3 phases. Three optional low pass filters similar to 1891 can be used to filter out the PWM modulation on the wire attached to each phase while the common output node is connected to neutral. Several additional details and schematic diagrams relating to multi phase/multi wire systems and circuits are listed in U.S. Provisional Application No. 61/435,921, filed Jan. 25, 2011 and incorporated in its entirety.

Figure 14A:
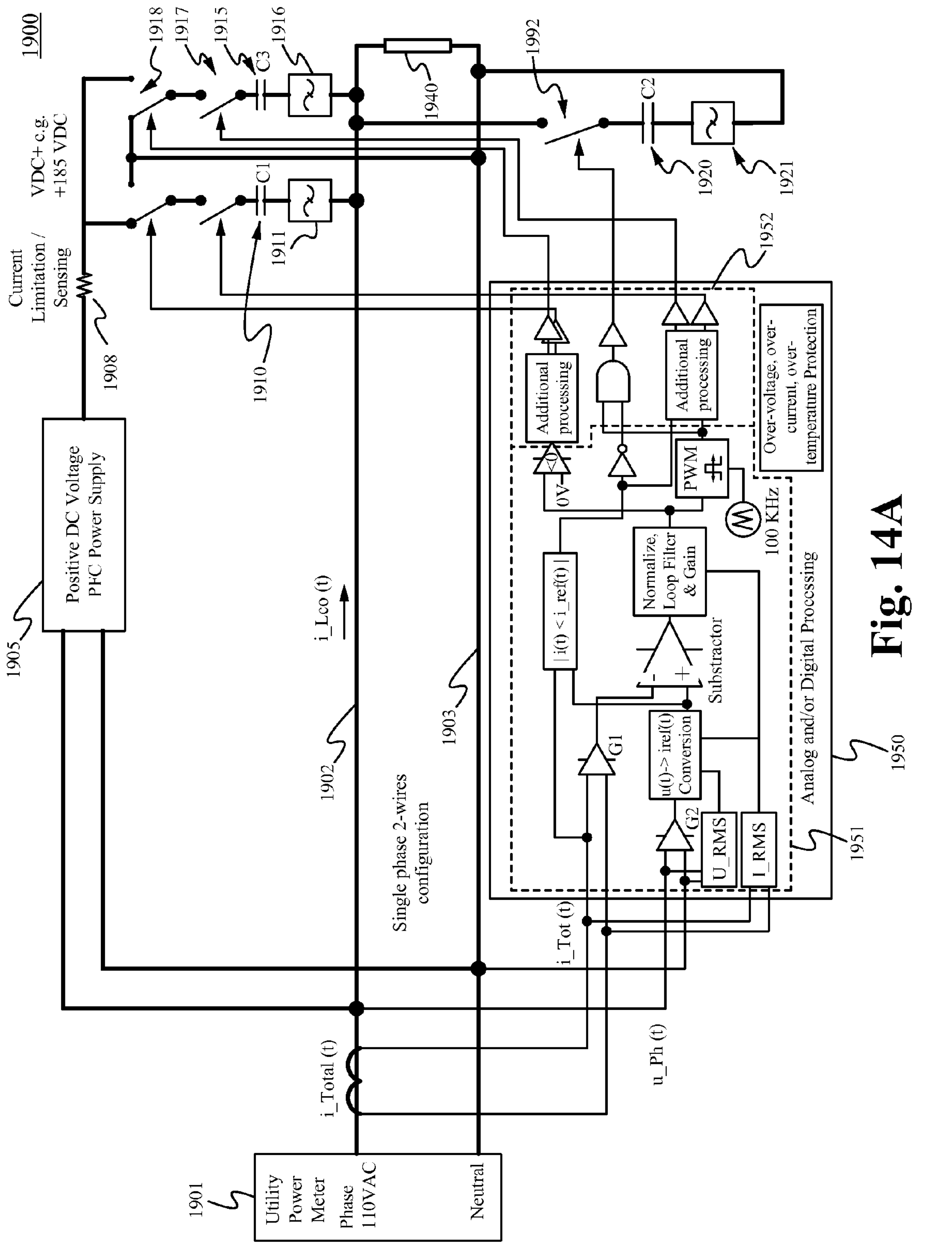
FIG. 14A is a schematic block diagram of a distortion reducing circuit having the ability to recycle harmonic energy and use it to correct later harmonic distortion.

FIG. 14A shows another example of a harmonic distortion correction system 1900. In this embodiment, the harmonic distortion correction system 1900 is able to capture and use the energy in harmonic distortion to correct later distortion. Because distortion is not a dissipative process, i.e. the energy in distortion is not dissipated as heat, it is possible to reshape the current waveform with its own distortion energy when the power network has an average or DC value of substantially zero. Generally, the system 1900 stores distortion energy in a reactive component and releases it at a later time to correct distortion of similar or smaller energy value but of opposite magnitude. Reactive components may be capacitors or inductors. Although capacitors are described herein, the person of ordinary skill having the benefit of this disclosure will readily appreciate that similar implementations replacing capacitors with inductors can be realized. It is helpful to first look at distorted current waveforms for a graphical representation of the energy that is to be harvested and recycled to correct distortion in later cycles. To that end, FIG. 14B and shows a current versus time output graph 1980. The graph 1980 has a current amplitude axis 1981 and a time axis 1982. Three waveforms are represented: a current waveform having harmonic distortion 1986, a reference current 1987 and the difference signal 1988. Three areas under the curve of the difference signal 1988 are of particular interest as they represent distortion energy that can be harvested, stored and later used to correct same or lesser distortion of an opposite amplitude. The first area E1 1983 is negative sum distortion energy, the second area E2 1984 is a positive sum distortion energy, and the third area E3 1985 is again negative sum energy. As this portion of the waveforms represent half a corrective cycle T, identical and opposite harmonic energy appears in the second half of the corrective cycle T. As a result, E4 1983', E5 1984' and E6 1985' are equal and opposite magnitude errors to E1 1983, E2 1984 and E3 1985 respectively and can be corrected by injecting the stored energy of E1 1983, E2 1984 and E3 1985.

Referring back to FIG. 14A, storage elements C1 1910, C2 1915 and C3 1920 are provided to store and release the harmonic energy. As in previous embodiments, the system 1900 is coupled between an equivalent property load 1940 and a utility power meter 1901. Processing unit 1920 controls whether the capacitors C1 1910, C2 1915 and C3 1920 are coupled into the system 1900 according to when positive or negative harmonic energy is to be harvested. The processing unit 1920 comprises an averaging and subtracting portion 1921 which is substantially similar to the several embodiments discussed in detail above; i.e. the averaging and subtracting portion 1921 compares the current in the phase line 1902 with a reference signal and generates a corrective signal accordingly. Additional processing circuitry 1922 is provided to activate either C2 1915 or C3 1920 as they charge or discharge energy and simultaneously charge or discharge corresponding inverse energy from the next half cycle. Each capacitor is charged or discharged by switches 1912, 1917 and 1922. The switches 1912, 1917 and 1922 are controlled by the processing unit 1920 which generates PWM signals according to the error signal 1986 of FIG. 14B. The capacitors C1 1910 and C2 1915 can be selectively coupled between a positive voltage line V+ 1907 that carries DC current generated by a positive DC power supply 1905 and the phase line 1902, or between the phase line 1902 and the neutral line 1903 by switches 1913 and 1918 respectively. The capacitor C2 remains coupled in parallel with the equivalent property load 1940. Table 3 shows an exemplary coupling scheme for charging and discharging the capacitors C1 1910, C2 1915 and C3 1920 with respect to the error 1986 of FIG. 14B. Table 3 displays the event sequence, which capacitor is being charged or discharged, what the capacitor is coupled to, its status, the energy with which it is charged, and the result of the discharge. Furthermore one more principle must be kept in mind: A capacitor can be charged only by a difference of electrical potential, therefore to charge a capacitor during the half positive cycle it should be connected between a positive high DC voltage such as V+ 1907 for one electrode and the neutral N 1903, the phase P, or a high negative DC voltage V− for the other electrode. The same principle applies for charging it negatively: the capacitor should be connected to V− on one electrode and to N, P, or V+ on the other electrode. In the example of FIG. 14A, a negative power supply is not shown for the sake of clarity. However, the person of ordinary skill having the benefit of this disclosure will appreciate that a negative DC voltage can be generated as described, for example, in FIGS. 4-12D and the corresponding text.

TABLE 3

| Sequence | Capacitor | Coupling | Status | Energy | Result |
|---|---|---|---|---|---|
| 1 | C1 | P and V− | charged by V− | E1 | Cancel distortion E1 and store energy for canceling E4 |
| 2 | C2 | P and N | charged by P | E2 | Cancel distortion E2 and store energy for canceling E5 |
| 3 | C3 | P and V− | charged by V− | E3 | Cancel distortion E3 and store energy for canceling E6 |
| 4 | C1 | P and N or P and V+ | discharged to N or discharged to P | E4 | E1 energy cancels distortion E4 and capacitor depletes its energy to zero. |
| 5 | C2 | P and N | discharged to N | E5 | E2 energy cancels distortion E5 andcapacitor depletes its energy to zero. |
| 6 | C3 | P and N or P and V+ | discharged to N or discharged to P | E6 | E3 energy cancels distortion E6 and capacitor depletes its energy to zero. |

The current flowing through C1 1910, C2 1915 and C31920 can flow in any direction. The respective PWM controlled switches 1912, 1917 and 1922 are preferably bi-directional switches, for example implemented with two transistors coupled in parallel and reverse (i.e. drain to source and vice versa). Any transistor can be used, including but not limited to bipolar, MOS, IGBT or JFET. Optionally, each capacitor C1 1910, C2 1915 and C3 1920 are respectively coupled to a PWM filter 1911, 1916 and 1921 to filter out the modulating signal generated by the processing unit 1920.

Figure 14B:
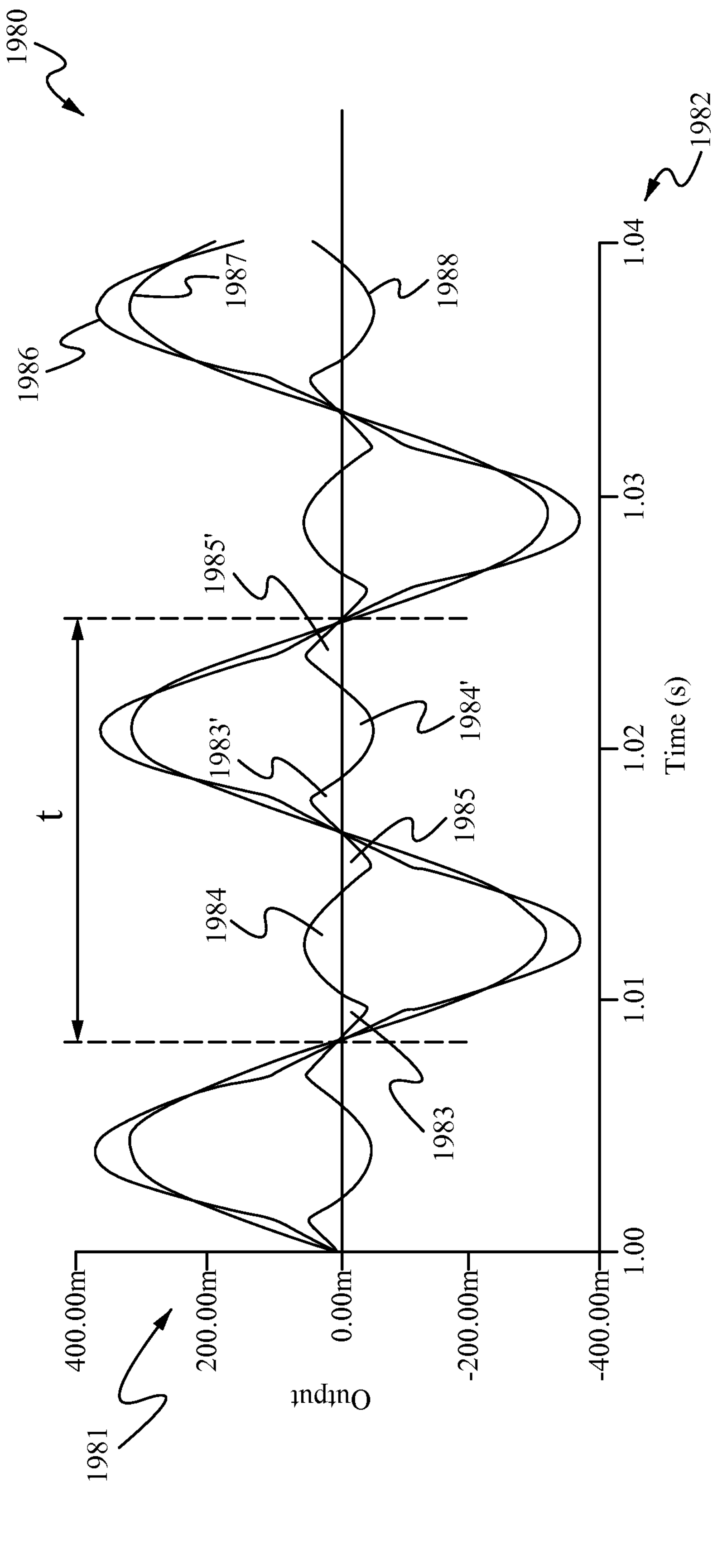
FIG. 14B is a graphical representation of energy in a distorted current signal that can be recycled for later use to correct harmonic distortion.
Figure 14C:
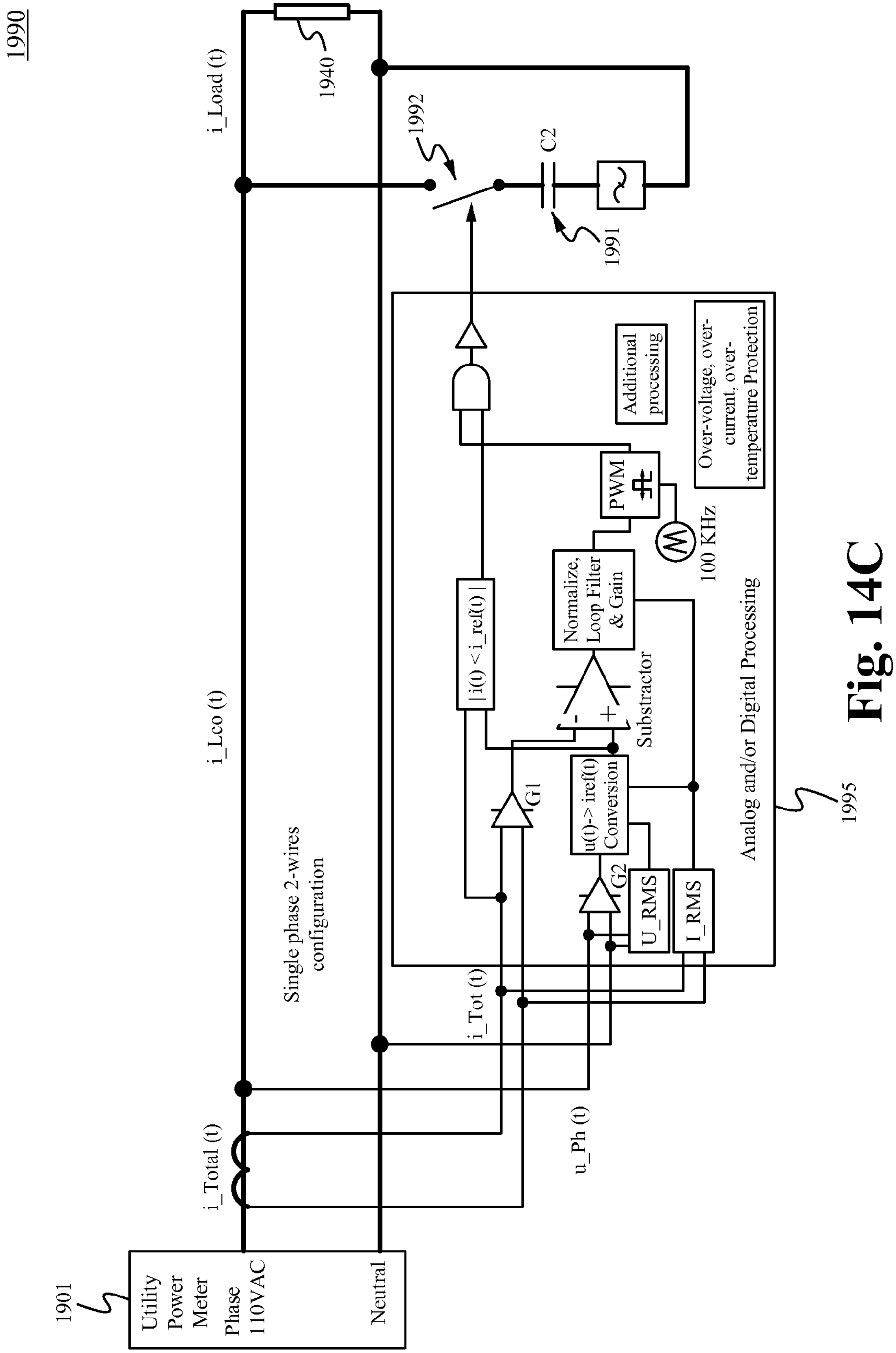
FIG. 14C is a schematic block diagram of a distortion reducing circuit having the ability to recycle harmonic energy and use it to correct later harmonic distortion.

In some applications, it is desirable to have simpler topology while simultaneously having the ability to use harmonic energy to correct future harmonic content. To that end, FIG. 14C shows a simplified harmonic distortion correction system 1990. The harmonic distortion correction system 1990 corrects a part of all distortion in a power line. In the embodiment shown, distortion correction is effective during the periods of time where the errors E2 1984 and E5 1984' are generated. Stated differently, when the current in the power line is greater than a reference current in absolute value. In some applications, where distortion is otherwise accounted for by, for example, the systems of FIGS. 4-13, a more simple embodiment such as the embodiment of FIG. 14C will suffice. The system 1990 is again coupled between a utility power meter 1901 and an equivalent property load 1940 to a phase line 1902 and a neutral line 1903. One capacitor 1991 is selectively coupled in parallel with the equivalent property load 1940 by a switch 1992. The switch 1992 is controlled by a processing unit 1995. During the half positive period (for example when the error E2 1984 of FIG. 14B is formed) when the current in the phase line 1902 is distorted and larger than a reference signal, the capacitor 1991 charges and stores the excess energy that is the distortion content. During the half negative period, the same happens but with the inverse current sign and the capacitor 1991 discharges and acts as a positive supply that counters the negative harmonic energy. Advantageously, the capacitor 1991 is coupled between the phase 1902 and neutral 1903 lines and no other current is flowing to any other potentials or nodes, thereby increasing efficiency. Although single capacitors are generally referred to in the embodiments of FIGS. 14A and 14C, it is understood that a bank of capacitors can be used.

Figure 14D:
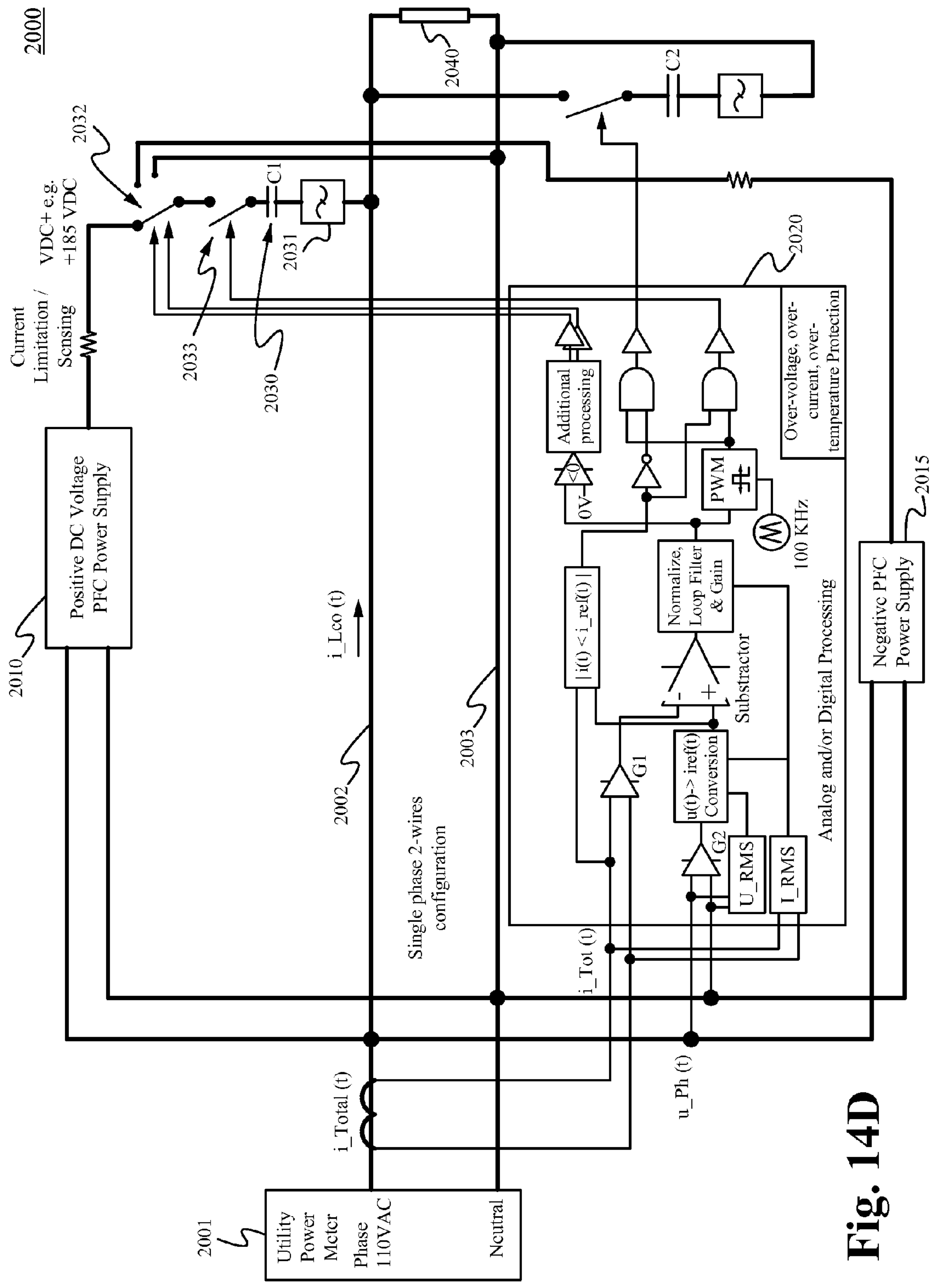
FIG. 14D is a schematic block diagram of a distortion reducing circuit having the ability to recycle harmonic energy and use it to correct later harmonic distortion.

FIG. 14D shows another embodiment of a harmonic distortion reduction system 2000 having the capability of recycling harmonic energy to correct later harmonic distortion. The system 2000 is coupled between a utility power meter 2001 and an equivalent property load The system 2000 comprises a negative DC power supply 2015 and a positive DC power supply 2010 which are each coupled to the phase 2002 and neutral 2003 lines. A first capacitor 2030 is selectively coupled to the positive DC power supply 2010, negative DC power supply 2015 or the neutral line 2003 by a three position switch 2032. The first capacitor 2030 is also coupled to the phase line 2002. The first capacitor's 2030 charging and discharging is controlled by a switch 2033 which is in turn controlled by a PWM signal generated by the processing unit 2020. Optionally, a PWM filter 2031 filters the PWM modulating signal generated by the processing unit 2020. A second capacitor 2040 is selectively coupled in parallel with the equivalent property load 2040. Similarly, the second capacitor's 2040 charging and discharging is controlled by a switch 2043 which is in turn controlled by a PWM signal provided by the processing unit 2020. Although PWM control signals are described herein as they are well known and understood to be a highly efficient, any method or means of controlling the switches 2033 and 2043 can be used. A PWM filter 2041 filters out the PWM modulating signal provided by the processing unit 2020. Advantageously, the system 2000 provides a path from at least one energy storage element, in this example the first capacitor 2030, to neutral 2003 so that the element can discharge into the neutral line 2003, effectuating greater efficiency since the storage element is not coupled to the positive DC power supply 2010 or the negative DC power supply 2020 while discharging into the neutral line 2002. Additional embodiments and examples of harmonic distortion correction systems and circuits are listed in U.S. Provisional Patent Application No. 61/435,658, filed Jan. 19, 2011, and incorporated in its entirety.

Alternate Methods of Processing

In the several embodiments above, analog processing to arrive at a corrective signal has generally been discussed. Stated differently, in all of the embodiments, analog components compare, subtract, and modulate to arrive at a corrective signal that controls switches for either selectively sinking or sourcing current or controlling the charge of capacitors for storing and using harmonic energy. However, processing can also be done in the digital domain with the use of Fourier Transforms. The analog signals such as current, voltage, active power, reactive power, phase (current to voltage), zero crossing event, active power THD, reactive power THD, voltage THD, current THD, I_RMS, U_RMS, power factor, or any other useful component of a signal. are digitized by one or more analog to digital converters (ADC). The person of ordinary skill having the benefit of this disclosure will ready appreciate that implementation of digital processing can be done with a DSP processor or ASIC or FPGA, and memory. Several off the shelf processors or arrays are available from Xilinx, Analog Devices, and other providers. Advantageously, such processors are flexible and allow for partial digital and partial analog processing for greatest efficiency. Then, the output analog signals are generated by one or more digital to analog converters (DAC) or derived internally from digital or pseudo-digital signals such as PWM or otherwise modulated analog signals. Such implementations could also comprise a protection circuit against over-voltage, over-current, over-power, over temperature and other relevant input/output parameter values. As is well known, analog signals can be digitized into digital signals and be manipulated digitally.

In an exemplary method, total current in a phase line having PF and THD impairments is measured for a number of cycles, quantified and transformed in the frequency domain with a FFT or other transform, such as a DFT. An FFT can be processed on a number of points along the measured total current once per signal period (for instance 1/60 Hz), or multiple times a fraction of the times in the period. Both real and imaginary vector results can be derived. Windowing can be used to decrease the artifact generated in the FFT due to non-periodic FFT sampling. Any known window such as Hann, Hamming, Blackman, Cosine, Rectangle, etc. can be used. Preferably, the number of sample values inputted in the FFT matches an integer time of the current signal period. Doing so decreases and suppresses the artifacts created in the FFT and reduces the need for windowing, if any, that is desirable for easier processing and higher FFT frequency or amplitude discrimination. Alternatively, the number of sample values is equal to a number of periods of the current input signal, for instance 2 to 50. An ideal current frequency response Iref(f) can be used and rescaled with the RMS value of the input current. Both complex vectors of size n Iref(f) and Itot(f) are compared for each index (j=1, . . . , n) thereby generating a complex error vector denoted by Corr_I(f)=Real {Corr_I(f)}+Im {Corr_I(f)}. A gain, loop filter and other processing may be applied thereafter. The error vector signal Corr_I(f) can then be converted back to the time domain, and low pass filtered to avoid aliasing. The filtered error signal can be used as a modulating signal to modulate the corrective signal. At the same time the positive values of the error signal permits the modulated error signal to switch ON a sink/source power transistor. Similarly the negative values of the error signal permits the modulated error signal to switch ON a source/sink power transistor. The currents from the source and sink transistors (opposite sign) are added to the summation network power node such as to cancel the distortion in the power line and a less than ideal PF.

Another method based on digital processing uses the fact that the input signal, the total current, referred to as Itot(t), is essentially periodic and sufficiently deterministic as to deal with it as a periodic, deterministic signal. We can distinguish three cases: First, when the power network status is quiescent, no appliance is changing status: Current (and voltage) may include phase delay due to reactive loads PF or THD. The current error signal is periodic. Second, when the power network status is slowly varying (speed of change is much slower than the AC power network frequency): one or more appliance may change their status slowly such as a motor establishing to the full rate in 5 seconds. In this case, the signal is periodic in terms of zero-crossing period and in term of almost constant waveform amplitude from period to period. Third, power network status is varying at mid or high speed of change (speed of change is comparable of faster than the AC power network frequency): In this case one or more appliance may change their status such as switching ON or OFF and the signal is periodic in terms of zero-crossing period but is not periodic in terms of waveform shape and amplitude for the duration of the transition.

It is desirable to correct any effect that falls under the first two categories. Effects resulting from the third category can be corrected to the extent of the feedback loop reaction time.

By way of example, if the loop feedback reaction time is RT is 0.2 sec, any event shorter than RT seconds will fall into category 2 and be corrected. However if faster than RT, the event cannot be corrected for the period of time lower than RT. The current error signal is obtained from the comparison between an ideal current wave and the less than perfect measured current waveform that can be phased shifted and/or include various harmonic distortions. Indeed a standard proportional-integrator-derivative PID controller would not be able to control the loop if the input signal or error input signal varies with time all the time, being neither stationary nor convergent. To that end, a PLL or other zero-crossing detector is implemented to synchronize the process with the input current frequency/phase, for instance 60 Hz and in phase. Also, the current signal is quantized into n bits. Then, an error signal is created that is the difference between the input current and a current reference signal. The current reference must be synchronized with the input current signal and normalized with its RMS value. The current reference signal (pure sinewave) can be generated from the voltage input waveform and rescaled or created internally by a PLL locked with the input voltage waveform. The error input values are stored in a memory line by line such as to have one line being precisely equal to one cycle of the input current. A logic synchronization signal can be generated at each zero crossing event to reset the memory writing to column zero. The sync logic signal can be generated by a PLL or by a zero crossing detector. To capture a complete cycle, only negative to positive transitions may be used (or positive to negative).

A practical sampling rate is in the range of 10 to 50,000 faster than the current input frequency so for 60 Hz cycle, a value between 0.6 KSample/sec and 3 MSample/sec. A preferred value is a value such as to satisfy the following formula: $N*1/fs=T\_i(t)$, with N=number of samples in one period $T\_i(t)$, fs=sampling frequency, and $T\_i(t)$=period of the input signal i(t). As an example, with $T\_i(t)=1/60$ Hz, and N=100, sampling frequency becomes fs=6.0 KSample/sec. The key in this method is to read the memory column by column such as a control loop feedback mechanism (controller) can be used to control the signal for each column point by point. The process being digitally implemented, one controller per column can be used or else advanced methods of feedback control (a multi-controller) or even a master controller on one column used in conjunction with n−1 slave controllers for the other column of data. The controller can be in the form or involve a PID or any variation of it (P, I, D, PD, PI), linear control, Kalman filter, fuzzy logic, neuronal, genetic algorithm, adaptive control, AI, machine learning, optimal control, MPC, LQG, robust control, H-infinity loop shaping, and stochastic control. The output values are thereafter read line by line, processed by the controller, stored in a temporary register and output sample by sample and converted back to analog values. Anti aliasing filter follows. Once the corrective signal is generated, it can be used to sink or source current as described at length above. Several additional details and schematic diagrams for realizing digital processing of signals using FFT or DFT or the like are available in U.S. Provisional Patent Application No. 61/435,658, filed Jan. 19, 2011, and incorporated in its entirety.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims.

What is claimed is:

1. A system for reducing distortion in an electrical signal having distortion comprising:

a. an electric circuit for comparing at least a portion of the electrical signal having distortion in a power line to a desired reference signal, thereby forming a corrective signal; and b. an electric circuit for selectively sinking and sourcing current from one of a DC rectifier and a solar panel to the electrical signal having distortion according to the corrective signal to correct the distortion; and selectively injecting additive current from the solar panel into at least one of a load or a power grid.

2. The system of claim 1 further comprising a processor for determining when the solar power is generating current.

3. The system of claim 1 further comprising a processor for switching between the DC rectifier and the solar panel for sinking and sourcing current.

4. The system of claim 1 further comprising a transformer, the transforming having a primary winding and a secondary winding, for galvanically isolating the electric circuit for selectively sinking and sourcing from the power line.

5. The system of claim 4 wherein the secondary winding is coupled to the load in parallel.

6. The system of claim 4 wherein the secondary winding is coupled to the load in series.

7. The system of claim 1 wherein distortion comprises any among harmonic distortion, noise, elevated spectral noise, and amplitude modulation.

8. The system of claim 1 further comprising a power factor correction module for bringing a power factor of the electrical signal having noise to substantially one.

9. The system of claim 8 wherein the power factor correcting module comprises:

a. a sensor for measuring the reactive power of a first load coupled to power line; and b. a plurality of bit reactive loads for coupling with the first load to counteract a reactive component of the first load.

10. The system of claim 1 wherein the electric circuit for selectively sinking or sourcing current applies the corrective signal to at least one controlled current source, wherein the controlled current source couples one of the DC rectifier and the solar panel with the power line according to the corrective signal.

11. The system of claim 1 wherein the electric circuit for selectively sinking or sourcing current comprises:

a. a modulator for modulating the corrective signal and applying the modulated corrective signal to at least one switch, wherein the switch couples a current provided by one of the DC rectifier and the solar panel with the power line; and b. a filter for filtering a modulating signal.

12. The system of claim 11 wherein the modulator comprises any among a pulse width modulator, delta-sigma modulator, pulse code modulator, pulse density modulator, or pulse position modulator.

13. The system of claim 1 wherein the electric circuit for selectively sinking or sourcing current comprises:

a. a positive DC power supply selectively coupled to one of the DC rectifier and the solar panel for providing a positive DC current;

b. a negative DC power supply selectively coupled to one of the DC rectifier and the solar panel for providing a negative DC current;

c. a processor for selectively sourcing current into the power line from one of the positive DC power supply in response to a negative distortion; or sinking current from the power line to the negative DC power supply in response to a positive distortion.

14. An apparatus for reducing harmonic distortion in a power line, the system comprising:

a. a phase line and a neutral line coupled between a utility power meter and an equivalent property load;

b. a rectifier coupled to the phase and neutral lines for rectifying AC current to DC current;

c. a solar power system for generating DC current;

d. a two position switch for selectively coupling one of the rectifier and the solar power system;

e. a processing system determining harmonic distortion in the phase line, generating a corrective signal, modulating the corrective signal, and controlling the two position switch;

f. a first transistor coupled between the two position switch and the load for selectively coupling positive current to the load according to the corrective signal to correct a negative distortion;

g. a negative power supply coupled to the two position switch for inverting DC power into a negative DC current;

h. a second transistor coupled between the negative DC power supply and the load for selectively coupling negative current to the load according to the corrective to correct a positive distortion; and i. a transformer, comprising a primary winding and a secondary winding, for galvanically isolating the load from the first transistor and second transistor.

15. The apparatus of claim 14, wherein the secondary winding of the transformer is coupled to the load in parallel.

16. The apparatus of claim 14, wherein the secondary winding of the transformer is coupled to the load in series.

17. A method of correcting a harmonic distortion in a power line comprising:

a. measuring a current component in a power line;

b. generating a reference signal;

c. comparing the reference signal to the current component to generate a corrective signal;

d. generating positive DC current from one of a rectifier and a solar power system;

e. generating a negative DC current by inverting the positive DC current;

f. selectively sourcing the positive DC current into a load according to the corrective signal to correct a negative distortion;

g. selectively sourcing the negative DC current into a load according to the corrective signal to correct a positive distortion; and h. injecting additional available power into at least one of the load and the power line from the solar power system, thereby increasing total current.

18. The method of claim 17 further comprising galvanically isolating the load from the positive DC power supply and negative DC power supply.

19. The method of claim 17 wherein galvanically isolating the load from the positive DC power supply and negative DC power supply coupling a galvanic isolator in parallel with the load.

20. The method of claim 17 wherein galvanically isolating the load from the positive DC power supply and negative DC power supply coupling a galvanic isolator in series with the load.

21. The method of claim 17 wherein generating a corrective signal comprises mixing the corrective signal with a modulating signal.

22. The method of claim 17 wherein selectively sourcing a positive DC current comprises filtering out the modulating signal.

23. The method of claim 17 wherein selectively sourcing a negative DC current comprises filtering out the modulating signal.

24. The method of claim 17 wherein generating positive DC current from one of a rectifier and a solar power system comprises:

a. determining whether the solar power system is generating current, and b. sourcing current from the solar power system if the solar power system is generating, or sourcing current from the rectifier if the solar power system is not generating current.

25. A system for correcting harmonic distortion comprising:

a. means for determining the harmonic energy in a power line;

b. means for storing the harmonic energy; and c. means for selectively releasing the harmonic energy to counter harmonic energy of an opposite magnitude.

26. The system of claim 25 wherein the means for determining the harmonic energy in a power line comprises:

a. a sensor for measuring a current component in a power line;

b. an oscillator for generating a reference signal; and c. a comparator for comparing the current component to the reference signal there by generating a corrective signal, wherein the corrective signal represents harmonic energy in the power line.

27. The system of claim 25 wherein the means for storing energy comprises at least one capacitor.

28. The system of claim 25 wherein the means for selectively releasing the harmonic energy comprises a switch.

29. The system of claim 28 wherein the switch selectively couples the means for storing harmonic energy between any among a positive power supply, a negative power supply, and a load.

30. The system of claim 25 further comprising a modulator to modulate the corrective signal to drive a transistor to selectively charge the means for storing energy.

31. A method of correcting harmonic distortion in a signal having harmonic distortion comprising:

a. determining the harmonic energy in a power line;

b. storing the harmonic energy, and c. selectively releasing the harmonic energy to counter harmonic energy of an opposite magnitude.

32. The method of claim 31 wherein determining the harmonic energy in a power line comprises:

a. measuring a current component in a power line;

b. generating a reference signal; and c. comparing the current component to the reference signal there by generating a corrective signal, wherein the corrective signal represents harmonic energy in the power line.

33. The method of claim 31 wherein storing energy comprises charging at least one capacitor.

34. The method of claim 31 wherein selectively releasing the harmonic energy comprises activating a switch.

35. The method of claim 34 wherein activating the switch selectively couples the means for storing harmonic energy between any among a positive power supply, a negative power supply, and a load.

36. The method of claim 31 further comprising a modulating the corrective signal to drive a transistor to selectively charge the means for storing energy.

37. A system for reducing distortion in an electrical signal having distortion comprising:

a. means for comparing at least a portion of the electrical signal having distortion in a power line to a desired reference signal, thereby forming a corrective signal;

b. means for selectively sinking and sourcing current to the electrical signal having distortion from a negative power supply and a positive power supply respectively;

c. means for modulating the positive power supply according the corrective signal; and d. means for modulating the negative power supply according to the corrective signal.

38. The system of claim 37 wherein means for comparing comprises:

a. a sensor for sensing the signal having distortion;

b. an oscillator for generating a reference signal; and c. a comparator for comparing the signal having distortion to the reference signal thereby generating a corrective signal.

39. The system of claim 37 wherein means for selectively sinking and sourcing current comprises a first transistor coupled to the positive power supply for sourcing current to correct a negative harmonic according to the corrective signal, and a second transistor coupled to the negative power supply for sinking current to correct a positive harmonic according to the corrective signal.

40. The system of claim 37 wherein the means for selectively sinking and sourcing current further comprises a modulator for modulating the corrective signal.

41. The system of claim 37 wherein the means for modulating the positive power supply comprises:

a. a first transistor for receiving the corrective signal; and b. an LC-flywheel network for deriving a positive average of the corrective signal.

42. The system of claim 37 wherein the means for modulating the negative power supply comprises:

a. a second transistor for receiving the corrective signal; and b. an LC-flywheel network for deriving a negative average of the corrective signal.

43. A method for reducing distortion in an electrical signal having distortion comprising:

a. comparing at least a portion of the electrical signal having distortion in a power line to a desired reference signal, thereby forming a corrective signal;

b. selectively sinking and sourcing current to the electrical signal having distortion from a negative power supply and a positive power supply respectively;

c. modulating the positive power supply according the corrective signal; and d. modulating the negative power supply according to the corrective signal.

44. The method of claim 43 wherein comparing comprises:

a. sensing the signal having distortion;

b. generating a reference signal; and c. comparing the signal having distortion to the reference signal thereby generating a corrective signal.

45. The method of claim 43 wherein selectively sinking and sourcing current comprises:

a. controlling the gate of a first transistor coupled to source current from the positive power supply to correct a negative harmonic according to the corrective signal, and b. controlling the gate of a first transistor coupled to sink current to the negative power supply to correct a positive harmonic according to the corrective signal.

46. The method of claim 43 wherein the selectively sinking and sourcing current further comprises modulating the corrective signal.

47. The method of claim 43 wherein modulating the positive power supply comprises:

a. modulating the corrective signal;

b. receiving the corrective signal; and c. deriving a positive average of the corrective signal.

48. The method of claim 43 wherein modulating the negative power supply comprises:

a. modulating the corrective signal;

b. receiving the corrective signal; and c. deriving a negative average of the corrective signal.

49. A system for reducing distortion in an electrical signal having distortion in a power line, comprising:

a. an electric circuit for comparing at least a portion of the electrical signal having distortion to a desired reference signal, thereby forming a corrective signal; and b. an electric circuit for selectively sinking current from the power line and sourcing current to the power line in response to the corrective signal, wherein the system comprises a single current sensor.

* * * * *